CHROMATOGRAM OF NBUTYL ACETATE

```
THRESHOLDS     200       100                                    76
INST  1,    METHOD  9,    FILE  12         3:
WTS   10000,     1500:
TIMES   1.60,   17.00,   8.10,   327.67,   327.67,   327.67:
THRESHOLDS     ,        ,       :
UNK/AIR   1.0000,        .00:
TOL      .00,    1  ,    5.0:
REF   PK   1.000,   6.00,   7.50 :
STD    NBUTYL ACETATE
```

| TIME | AREA | RRT | RF | % | NAME |
|---|---|---|---|---|---|
| 2.26 | 1.0128 | .333, | 1.4360, | 9.0012 | METHYL ETHYL KETON: |
| 3.27 | 3.0774 | .483, | .9452, | 18.0016 | NBUTANOL: |
| 4.22 | 3.3908 | .623, | .5718, | 11.9992 | BENZENE: |
| 4.71 | 1.3859 | .695, | .6996, | 6.0004 | HEPTANE: |
| 6.77 | 2.4248 | 1.000, | .9996, | 15.0008 | NBUTYL ACETATE: |
| 8.10 | 2.1471 | 1.196, | 1.0536, | 14.0004 | OCTANE: |
| 9.73 | .0220 | 1.437, | 1.0000, | .1365 | ! UNKNOWN |
| 10.85 | 1.1348 | 1.602, | .9968, | 7.0008 | NONANE: |
| 14.29 | 2.7504 | 2.110, | 1.1164, | 19.0032 | DECANE: |

PROCESSOR COMPUTER BLOCK DIAGRAM

SIGNAL

UP INTEGRAL

DOWN INTEGRAL

| TRACKING BASELINE | TRACKING FORWARD SIDE OF PEAK | TRACKING REVERSE SIDE OF PEAK | TRACKING FORWARD SIDE OF PEAK |

SINGLE PRECISION

DOUBLE PRECISION
(TWO WORDS)

LOGICAL WORD

| FIELDS | | | |
|---|---|---|---|
| I | A | | |
| 5 | 6 | 7 | |
| 0 | 0 | 0 | DIRECT, ZERO PAGE |
| 0 | 0 | 1 | DIRECT, CURRENT PAGE |
| 0 | 1 | 0 | DIRECT, ZERO PAGE, INDEX BY $R_2$ |
| 0 | 1 | 1 | DIRECT, ZERO PAGE, INDEX BY $R_3$ |
| 1 | 0 | 0 | INDIRECT, ZERO PAGE |
| 1 | 0 | 1 | INDIRECT, CURRENT PAGE |
| 1 | 1 | 0 | INDIRECT, ZERO PAGE, INDEX BY $R_2$ |
| 1 | 1 | 1 | INDIRECT, ZERO PAGE, INDEX BY $R_3$ |

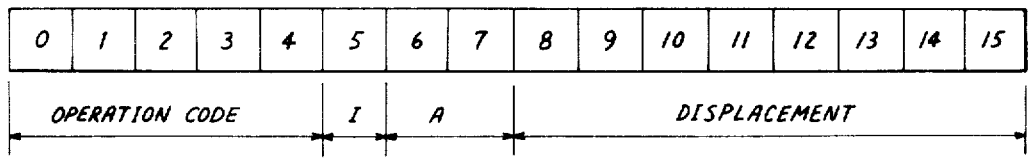

Fig. 18.

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| OPERATION CODE | | | | | I | A | | DISPLACEMENT | | | | | | | |

I & A FIELDS

| I<br>5 | A<br>6 | <br>7 | |
|---|---|---|---|
| 0 | 0 | 0 | DIRECT, ZERO PAGE |
| 0 | 0 | 1 | DIRECT, CURRENT PAGE |
| 0 | 1 | 0 | DIRECT, ZERO PAGE, INDEX BY $R_2$ |
| 0 | 1 | 1 | DIRECT, ZERO PAGE, INDEX BY $R_3$ |
| 1 | 0 | 0 | INDIRECT, ZERO PAGE |
| 1 | 0 | 1 | INDIRECT, CURRENT PAGE |
| 1 | 1 | 0 | INDIRECT, ZERO PAGE, INDEX BY $R_2$ |
| 1 | 1 | 1 | INDIRECT, ZERO PAGE, INDEX BY $R_3$ |

Fig. 19.

STORAGE REFERENCE INSTRUCTIONS

| | $R_0$ | $R_1$ | $R_2$ | $R_3$ |
|---|---|---|---|---|
| LOAD | X | X | X | X |
| STORE | X | X | X | X |
| ADD | X | X | X | X |
| SUBTRACT | X | X | X | X |
| COMPARE & SKIP IF EQUAL | X | X | X | X |

LOAD MULTIPLE

STORE MULTIPLE

JUMP

JUMP TO SUBROUTINE

INCREMENT AND SKIP IF ZERO

Fig. 20.

| INSTRUCTION | BITS 0-2 | | | BITS 3-4 | |
|---|---|---|---|---|---|
| | 0 | 1 | 2 | 3 | 4 |
| LOAD | 0 | 0 | 0 | | |
| STORE | 0 | 0 | 1 | | |
| ADD | 0 | 1 | 0 | | |
| SUB | 0 | 1 | 1 | | |
| COMPARE & SKIP IF EQUAL | 1 | 0 | 0 | | |

| | | |
|---|---|---|
| 0 | 0 | $R_0$ |
| 0 | 1 | $R_1$ |
| 1 | 0 | $R_2$ |
| 1 | 1 | $R_3$ |

| INSTRUCTION | BITS 0-2 | | | BITS 3-4 | |
|---|---|---|---|---|---|
| | 0 | 1 | 2 | 3 | 4 |
| INPUT/OUTPUT | 1 | 0 | 1 | X | X |
| LOAD MULTIPLE | 1 | 1 | 0 | 0 | 0 |
| STORE MULTIPLE | 1 | 1 | 0 | 0 | 1 |
| JUMP | 1 | 1 | 0 | 1 | 0 |
| JUMP TO SUBROUTINE | 1 | 1 | 0 | 1 | 1 |
| INCREMENT & SKIP IF ZERO | 1 | 1 | 1 | 0 | 0 |
| IMMEDIATE | 1 | 1 | 1 | 0 | 1 |
| REGISTER OPERATIONS | 1 | 1 | 1 | 1 | 0 |
| SHIFT OR STATUS | 1 | 1 | 1 | 1 | 1 |

Fig. 21.

CORE STORAGE PAGING

| OCTAL | | PAGE |
|---|---|---|
| 17 | | 15 |
| 16 | | 14 |
| 15 | | 13 |
| 14 | | 12 |
| 13 | | 11 |
| 12 | | 10 |
| 11 | | 9 |
| 10 | | 8 |
| 7 | | 7 |
| 6 | | 6 |
| 5 | | 5 |
| 4 | | 4 |
| 3 | | 3 |
| 2 | | 2 |
| 1 | 256 WORDS | 1 |
| 0 | PAGE ZERO | 0 |

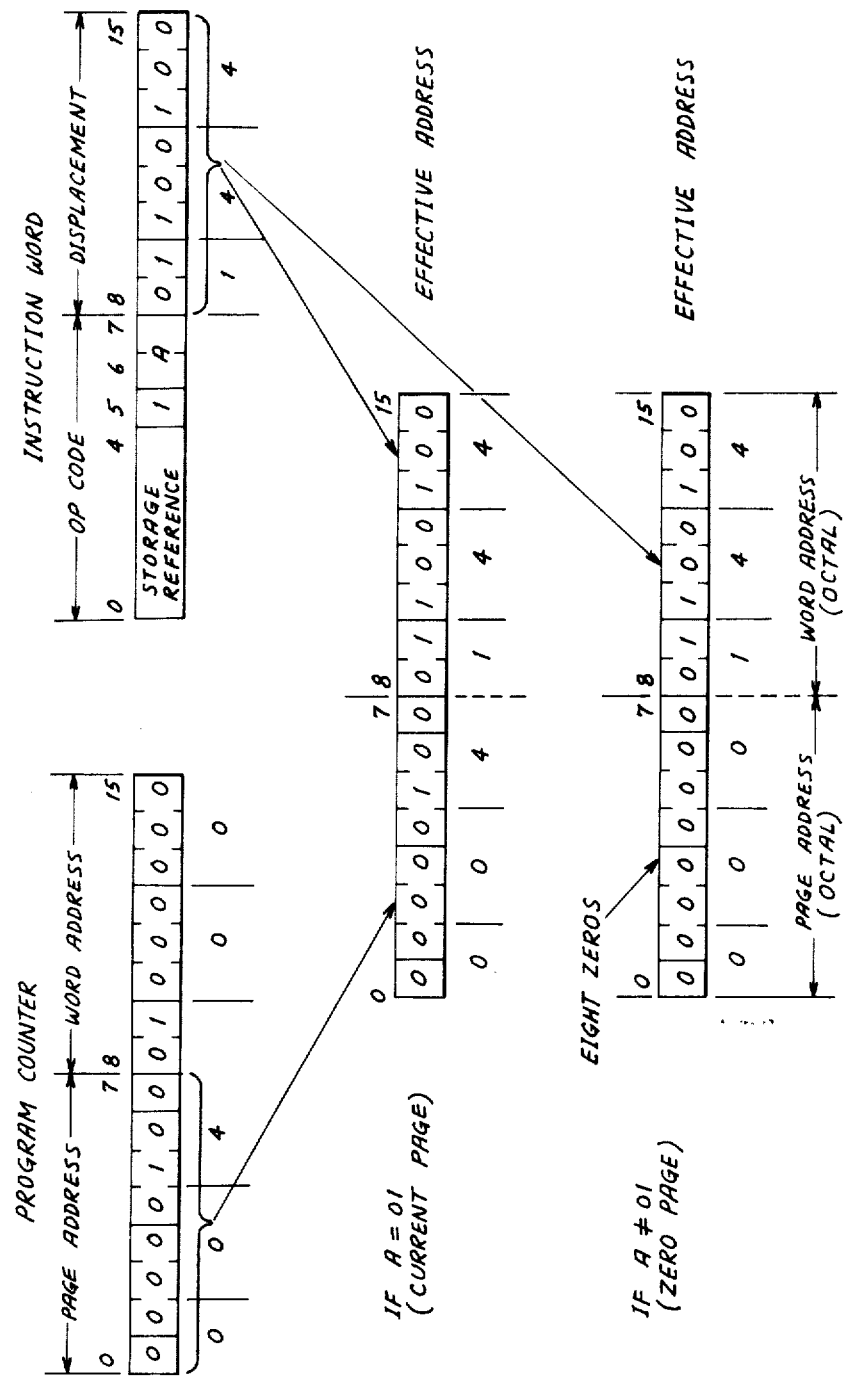

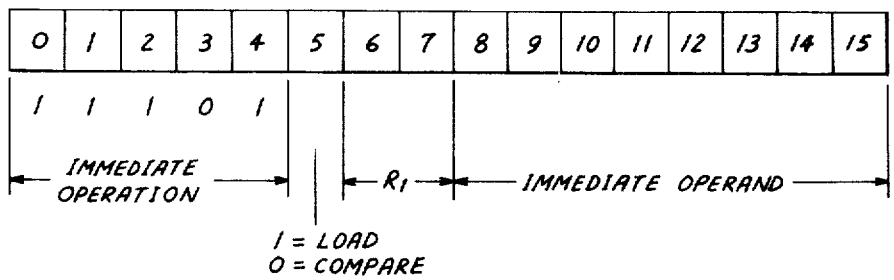
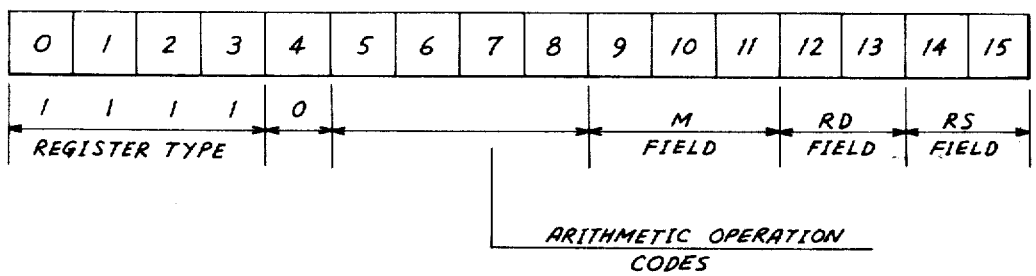
M FIELD INTERPRETATION
```
0 0 0    NO SKIP
0 0 1    SKIP IF ZERO
0 1 0    SKIP IF ZERO OR PLUS
0 1 1    SKIP IF C=1
1 0 0    SKIP IF V=0
1 0 1    SKIP IF NOT ZERO
1 1 0    SKIP IF MINUS
1 1 1    SKIP IF C=0
```

Fig. 26.

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 1 | 1 | 1 | 1 | 1 |   |   |   |   |    |    |    |    |    |    |

- Bits 0–3: REGISTER TYPE
- Bits 4–5: 1 1
- Bits 6–8: SHIFT OPERATION CODES
- Bits 9–11: M FIELD
- Bits 12–13: $R_i$
- Bits 14–15: N

M FIELD INTERPRETATION

- 0 0 0 NO SKIP
- 0 0 1 SKIP IF ZERO
- 0 1 0 SKIP IF ZERO OR PLUS
- 0 1 1 SKIP IF C = 1
- 1 0 0 SKIP IF V = 0
- 1 0 1 SKIP IF NOT ZERO
- 1 1 0 SKIP IF MINUS
- 1 1 1 SKIP IF C = 0

N FIELD INTERPRETATION

- 0 0 SHIFT ONE
- 0 1 SHIFT TWO
- 1 0 SHIFT FOUR
- 1 1 SHIFT EIGHT

COMMENT: SHIFT = $2^N$

Fig. 27.

REGISTER ARITHMETIC

| | MNEMONIC | 5 | 6 | 7 | 8 |
|---|---|---|---|---|---|
| MOVE REGISTER | MVR | 0 | 0 | 0 | 0 |
| ADD REGISTER | AR | 0 | 0 | 0 | 1 |
| ADD WITH CARRY REGISTER | ACR | 0 | 0 | 1 | 0 |
| SUBTRACT REGISTER | SR | 0 | 0 | 1 | 1 |
| SUBTRACT WITH CARRY REGISTER | SCR | 0 | 1 | 0 | 0 |
| ARITHMETIC SKIP IF | ASIF | 0 | 1 | 0 | 1 |
| LOGICAL SKIP IF | LSIF | 0 | 1 | 1 | 0 |
| AND | AND | 0 | 1 | 1 | 1 |
| OR | OR | 1 | 0 | 0 | 0 |
| EXCLUSIVE OR | XOR | 1 | 0 | 0 | 1 |
| NOT | NOT | 1 | 0 | 1 | 0 |
| INCREMENT REGISTER | IR | 1 | 0 | 1 | 1 |
| DECREMENT REGISTER | DR | 1 | 1 | 0 | 0 |

REGISTER SHIFT

| | MNEMONIC | 5 | 6 | 7 | 8 |
|---|---|---|---|---|---|
| SHIFT RIGHT ARITHMETIC | SRA | 1 | 0 | 0 | 0 |
| SHIFT RIGHT LOGICAL | SRL | 1 | 0 | 0 | 1 |
| SHIFT RIGHT WITH CARRY | SRC | 1 | 0 | 1 | 0 |
| SHIFT LEFT | SL | 1 | 0 | 1 | 1 |
| SHIFT LEFT WITH CARRY | SLC | 1 | 1 | 0 | 0 |
| ROTATE RIGHT | RR | 1 | 1 | 0 | 1 |

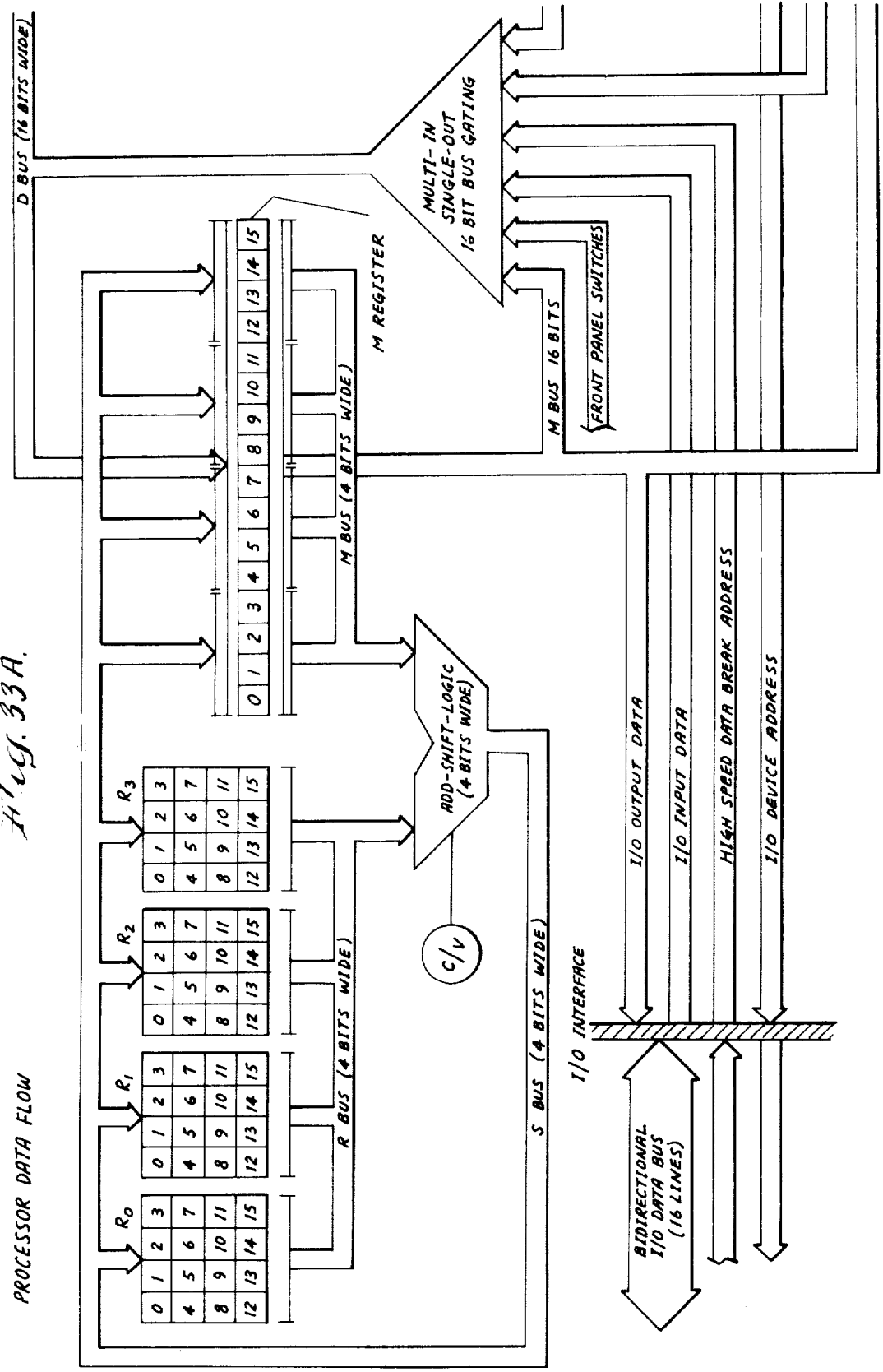

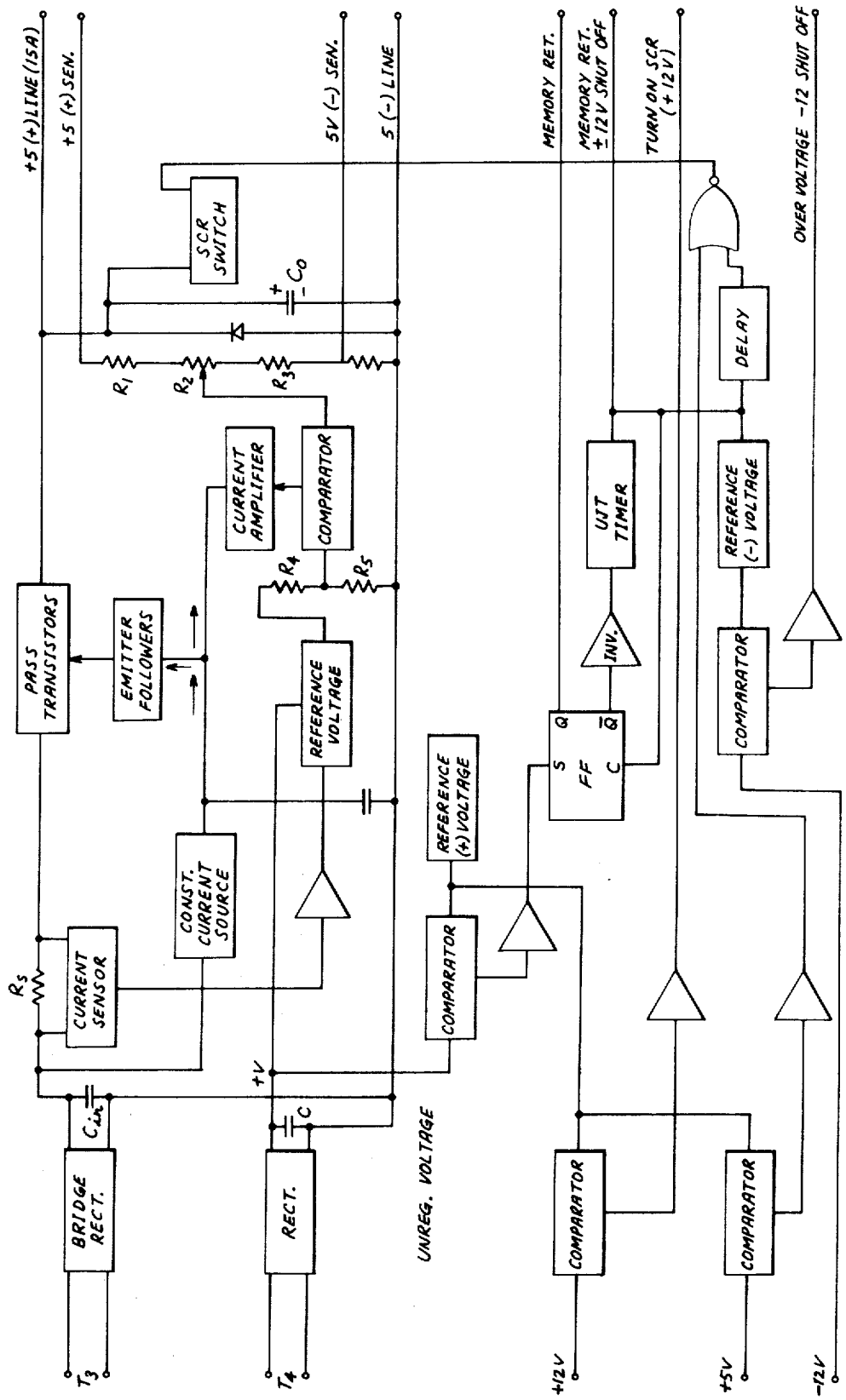

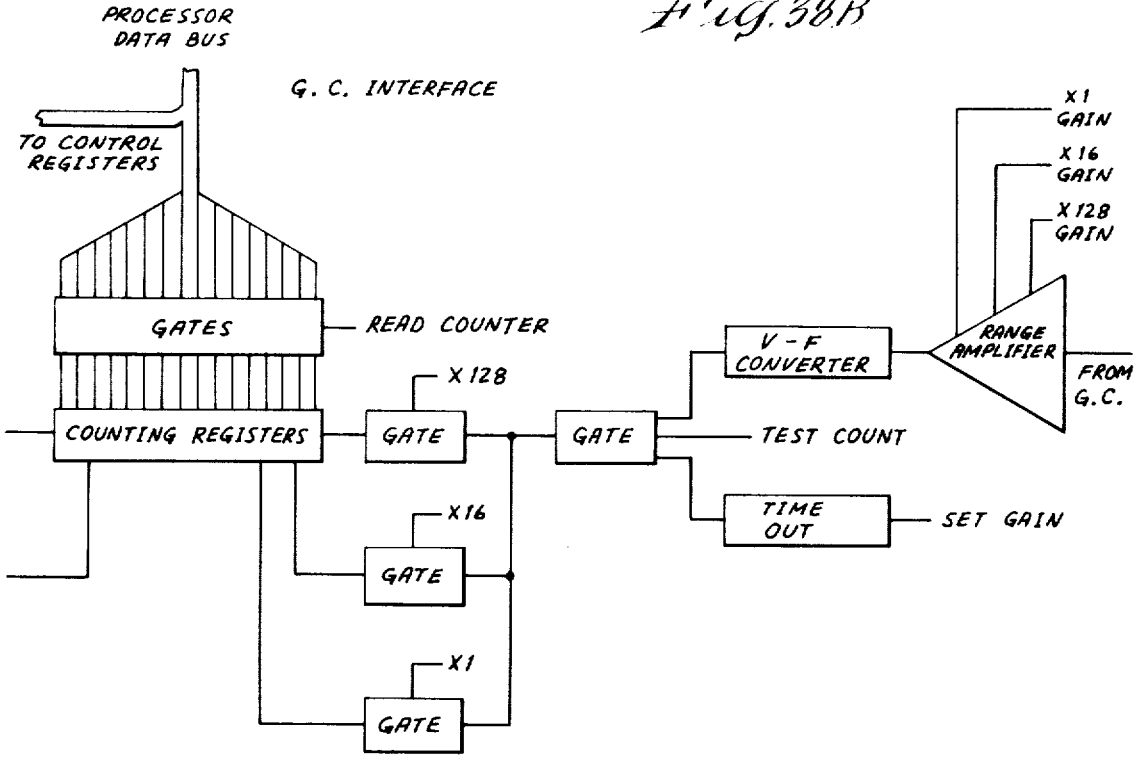
Fig. 38B
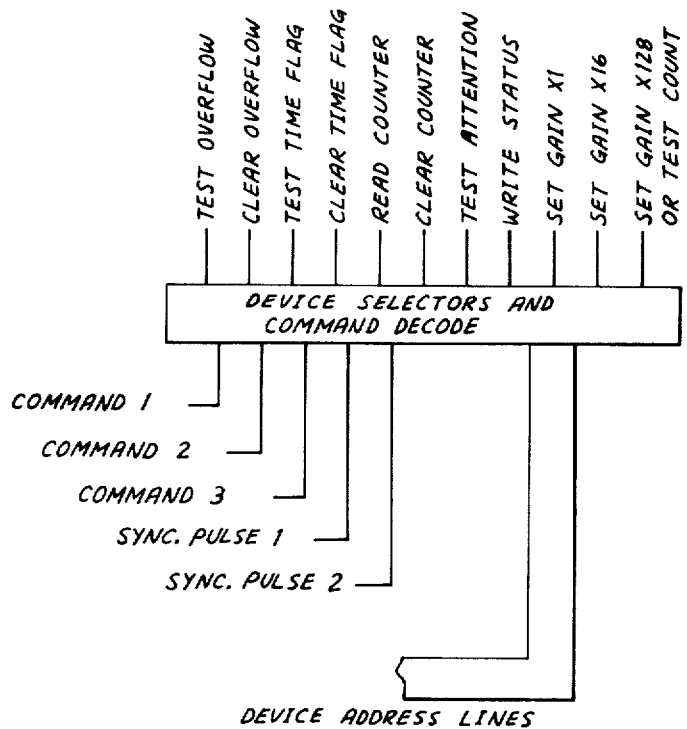

Fig. 42.

DIFFERENTIAL INPUT MODE
FLOATING SOURCE (i.e. BRIDGE)
X1 GAIN (X10 BY CHANGING
TWO PLUGS ON BOARD)

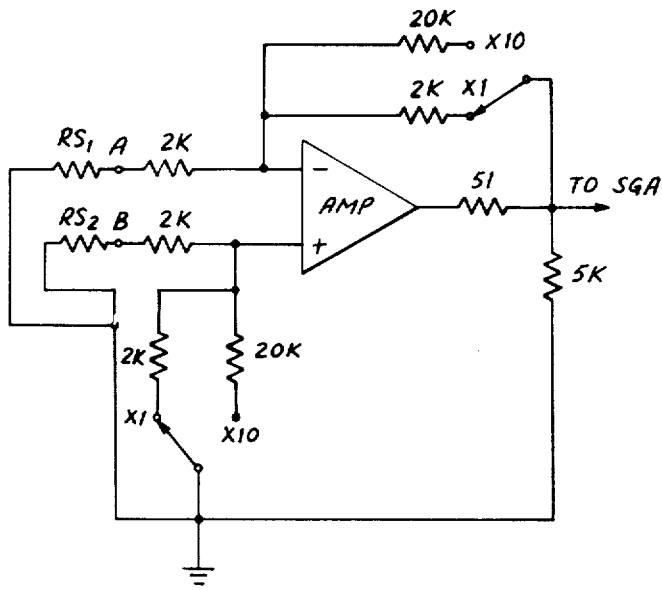

APPLICATION

BRIDGE MEASUREMENT

INPUT IMPEDENCE

4K OHMS

LOADING ERROR

$$\frac{100 \,(RS_1 + RS_2)}{4K} \%$$

BANDWIDTH

NO FILTER

A NEGATIVE INPUT TERM

B POSITIVE INPUT TERM

Fig. 43.

DIFFERENTIAL INPUT MODE
GROUNDED SOURCE (i.e. "INTEGRATOR"
 OUTPUTS)
NEGATIVE INPUT
X1 AND X10 GAIN

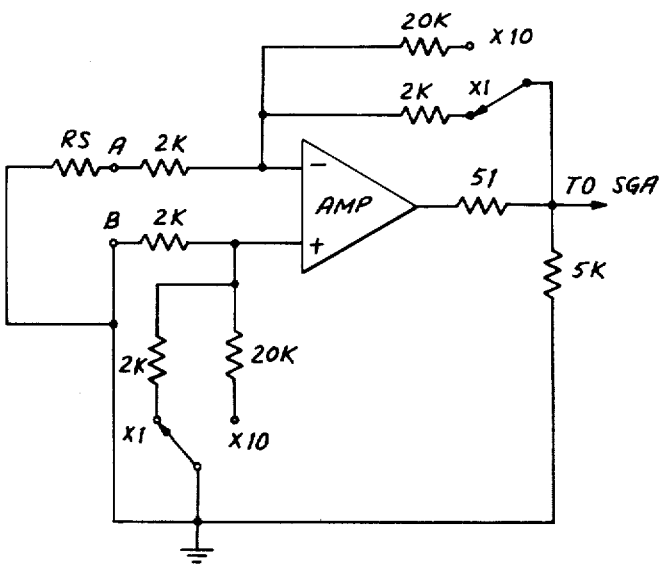

APPLICATION

GROUNDED SINGLE-ENDED
OUTPUTS WHERE POLARITY
IS NEGATIVE, i.e.
ELECTRON CAPTURE
DETECTORS.

INPUT IMPEDANCE

2K OHMS

LOADING ERROR

$$\frac{100 \, RS}{2K} \%$$

BANDWIDTH

NO FILTER

Fig. 44.

DIFFERENTIAL INPUT MODE
GROUNDED SOURCE (i.e. "INTEGRATOR" OUTPUTS)
POSITIVE INPUT
X1 AND X10 GAIN

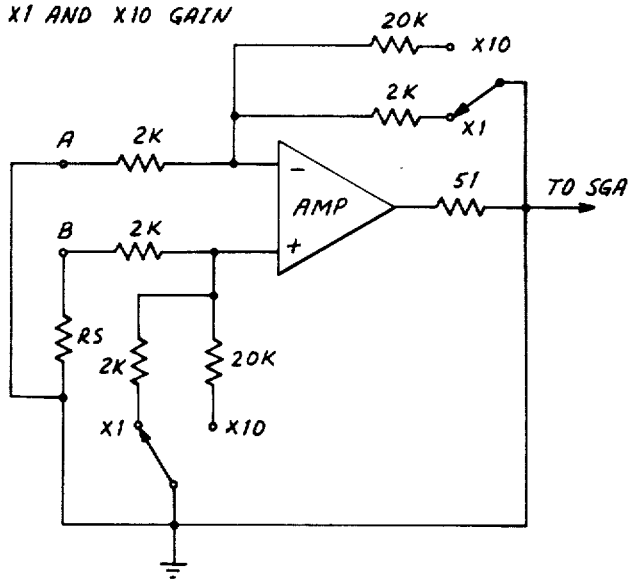

APPLICATION

GROUNDED SINGLE-ENDED OUTPUTS WHERE POLARITY IS POSITIVE. (WOULD GENERALLY BE BETTER TO USE SINGLE-ENDED INPUT.)

INPUT IMPEDANCE

4K OHMS

LOADING ERROR $$\frac{100\ RS}{4K}\ \%$$

BANDWIDTH

NO FILTER

Fig. 45.

SINGLE-ENDED INPUT MODE
X1 GAIN
POSITIVE INPUT

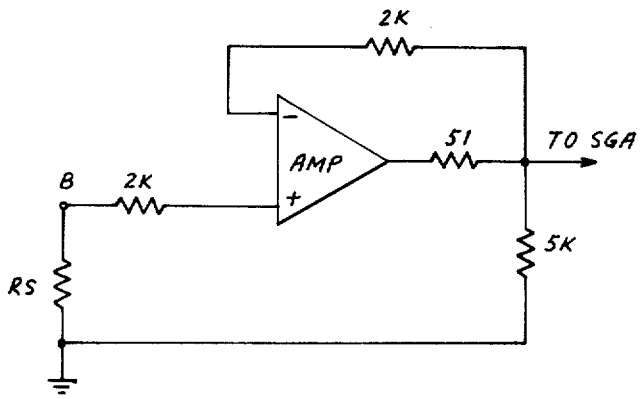

APPLICATION

ALL GROUNDED OUTPUTS WITH POSITIVE POLARITY

INPUT IMPEDANCE

GREATER THAN 5 MEGOHMS

LOADING ERROR

NEGLIGIBLE

BANDWIDTH

NO FILTER

United States Patent Office 3,721,813
Patented Mar. 20, 1973

3,721,813
ANALYTICAL INSTRUMENT SYSTEM
Richard D. Condon and Harry A. Gill, Ridgefield, David J. Noonan, Old Greenwich, and Gerard T. Paul, Weston, Conn., assignors to The Perkin-Elmer Corporation, Norwalk, Conn.
Filed Feb. 1, 1971, Ser. No. 111,593
Int. Cl. G06f 7/74; G01n 31/08
U.S. Cl. 235—151.35          6 Claims

ABSTRACT OF THE DISCLOSURE

An analytical instrument system includes a plurality of gas chromatographic analytical instruments that produce analog output signals having voltage peaks that extend from a baseline. A plurality of voltage-to-frequency converters are coupled to corresponding analytical instruments to convert the voltage output signals thereof to pulses having a pulse repetition rate corresponding to the amplitudes of the analog signals. Dedicated circuits including a plurality of counters are coupled to corresponding ones of the voltage-to-frequency converters to count the output pulses therefrom. A data processor is provided for responding to the stored data in said counters. The data processor includes means for sampling the counters at intervals to generate a sequence of sample signals corresponding to the analog output signals of corresponding analytical instruments. A program is stored in the memory of the data processor for analyzing the sample signals to derive the time of occurrence of the peaks in the analog signals as well as their areas.

RELATED APPLICATIONS

Certain portions of the method and apparatus herein disclosed are not our invention, but are the inventions of Richard D. Condon and David J. Noonan, as defined by their claims of their application Ser. No. 111,591, filed Feb. 1, 1971; David J. Noonan as defined by the claims of his invention Ser. No. 111,592, filed Feb. 1, 1971; and Gerard T. Paul, as defined by the claims of his invention Ser. No. 111,594, filed Feb. 1, 1971. All such applications are assigned to the assignee of the present invention.

BACKGROUND OF THE INVENTION

Ever since 1952, when A. J. P. Martin began the era of gas chromatography, people have wrestled with the problem of extracting the analytical information from the data. The necessary information can be extracted from the sequential series of peaks of a chromatogram by use of two simple concepts: the peak emergence time identifies a compound; the area under the peak indicates the concentration. In well resolved chromatograms, these are very simple steps, which by their very simplicity lead to the generation of an abundance of data in a short time. When the chromatogram is complex and contains many peaks, some of which are only partially resolved, the data generation is further increased. The early methods of data reduction have gone through the stages of area approximation by triangulation, peak-height calibration and the use of different types of mechanical attenuation and integration. The electronic integrator, with its ability to measure retention time and peak areas with high precision, brought new accuracy and speed to the field. These very factors quickly lead to the demand for a more direct interfacing of the data output to the digital computer. Systems now in operation, which utilize electronic digital integrators and computers, provide an almost "hands-off" analysis after the point of sample injection. Sophisticated and useful though these electronic data systems are, the difficulties soon become apparent. At one end of the spectrum is the digital electronic integrator; here the task of manually converting the data to analyses can be overwhelming. At the other end are the digital computer systems, either dedicated or off-line, with great data-handling capacity and speed; here the cost and programming tasks create obstacles of varying degrees of severity. These factors are all well documented in the papers from a recent Symposium "Computer Automation of Analytical Gas Chromatography" published in the "Journal of Chromatographic Science," No. 7, 1969 and No. 8, 1970.

The gas chromatographer has had long experience in manual reduction of the data produced by a gas chromatograph. He has used various aids to convert this data, including manual measurement with a ruler or planimeter, and later, more automatic methods involving mechanical and electronic integrators. Both manual and integrator techniques provide the analyst with the starting information he needs: retention time of the separated components and the area underneath each peak. However, this is only a beginning; this data must now be further reduced by laborious calculations before the chromatographer has a finished report of his analysis. In an effort to reduce the time-consuming drudgery of manual (and even integrator-assisted) data reduction, chromatographers have turned to computer systems to handle automatically the chromatograph output.

The job of chromatograph data reduction is well within the capabilities of the digital computer. It can handle and interpret the data as well as, and sometimes better than, the human operator. It will treat data in an unfailingly repeatable manner; if the system is designed and programmed correctly, it can transform this repeatability into analytical accuracy.

However, the introduction of a computer into the laboratory often brings with it an entirely new set of problems. Some of these problems are:

(1) The cost of actual computer hardware and of equipping a laboratory to accommodate a computer system.

(2) Lengthy and difficult installations.

(3) The continuing need for skilled programmers and computer maintenance personnel.

(4) In the case of a time-shared facility, the difficulty of performing real-time measurements on a time-shared basis.

Computers generally used in analytical data processing systems require digital information while the output of most instruments is analog. In the transmission of this analog information to the computer, especially over long distances, noise can be introduced into the system, thereby reducing its effectiveness.

A conversion unit of the same kind then must be introduced between the two in order to effect the changeover. Let us call the unit an Interface and the computer a Processor.

Naturally we would not want to degrade the information from the instrument; therefore, the interface can be regarded as a carefully carried package which transports the instrument signal to the Processor without altering its content and at the same time transforms it into Processor compatible signal.

An interface between analytical instruments and a processor can best be classified or defined as an information transfer device. The role of an interface should be to take analytical information from the output of the instrument and present this information to the input to a central processor with no degradation of the original analytical information. The role of the interface then can be compared to that of a transfer agent of goods from one place to another. The primary responsibility of this transfer agent, that is, the interface, is to accept intelligence at one station and transfer it to a second station with no deterioration or change in the original content. In the active transfer of the intelligent information it may be desirable to convert the original character of the information into a form that is more easily handled by the transfer agent and is more readily acceptable to the receiving agent, in this case, the processor.

It is desirable, therefore, that a gas chromatography interface in transferring of analytical analog voltages from the gas chromatography detector to a central processor do so in such a form as not to deteriorate the original detector signals. In addition, it is desirable to change the character of the detector signals into a form that is readily accepted into the processor and handled by software.

Ideally an interface would accept instrument signals from a few microvolts up to the maximum output, usually no more than 10 volts. It would introduce no noise of its own and would be capable of converting the DC analog signal into a digital form proportional to the analog signal and present this digital signal to the processor at a level easily identifiable in terms of distinguishing between background noise and drift of the basic detector siganl versus wanted analytical information, in this case the gas chromatography peak signal as it emerges above baseline and background conditions. The conversion rate would be constant and would have a high enough rate to provide infinite resolution.

The interface must be general enough in its input specifications to be compatible with a vast variety of various detector signals of many gas chromatograph instruments. Such signals may be low voltage without amplification as in the case of the output of the hot wire thermoconductivity detector or higher voltage outputs typically associated with the output from ionization detector amplifiers.

Within the interface proper, signal amplification, filtering and digitization should occur such that the transfer of digital information to the processor is an exact replica of the input analog information. The output of the interface must be capable of driving digital signals over long lengths of cable to the processor with no loss in signal clarity.

The interface should also be a convenient station for mounting controls for the analytical chemist to communicate with the processor. Similarly, suitable indicators in the form of lights should be made available to show instrument processor status. It is desirable that the user may communicate with the processor at the interface directly.

A digital computer for use in analyzing the data produced by analytical instruments has to repetitively perform certain specialized calculations. In particular, a digital computer used to analyze the spectrograms produced by gas chromatographs, flame, absorption, microwave, and X-ray spectrographs should be able to efficiently perform the specialized calculations necessary to determine spectrographic peaks, the areas under the peaks, the division overlapping peaks of overlapping areas, baseline correction calibration and the like. The so-called mini-computers presently available although theoretically having the capacity to perform these calculations are not organized such as to do so efficiently.

A program provided for a computer system for analyzing the data provided by analytical instruments should similarly be specifically devised to reduce the amount of core storage needed in the computer; in particular reducing core storage at the expense of using more computer time which is actually more available since the data from the analytical instrument arrives at the computer over a relatively long time span in terms of the extremely rapid calculations that can be made by the computer. Prior art programs for large computers did not do this, due to the very large core space available. On the other hand, computers to which the information was applied from electronic integrators in prior art gas chromatographic systems preferably handled the data very rapidly since the data was predigested by the electronic integrator and then sent in one lump as it were to the computer.

A computer system designed for analytical instruments should, if possible, be capable of handling several analytical instruments at once since the data is developed rather slowly. Otherwise, the cost of providing a separate computer for each analytical instrument would be prohibitive. Similarly, several analytical instruments should, if possible, be able to share a single output device such as a teletypewriter at which reports from each of the analytical instruments may be called for at will. Computer systems designed for these purposes do not exist in the prior art although they could be achieved at great expense using existing large scale computer systems. It is desirable that they be developed employing a small inexpensive mini-computer system dedicated to the analytical instrument task.

It will be seen from the above that the development of a data processing system for one or more gas chromatographs involves the development of a data processing system of general usefulness for analytical instruments and of special input/output devices, interfaces, and programs particularly for use in gas chromatography.

One of the particular problems in gas chromatography is that many separate analysis programs are used on the data provided by a gas chromatogram after an initial analysis produces a standard report of the basis row data. For many laboratories having only one or two gas chromatographs, the storage of these analysis programs in a dedicated computer would prohibitively increase the cost of the computer due to the large main memory (or present day core storage) required. On the other hand in laboratories having a large number of chromatographs, the storage of these special analysis programs in the main memory (core) is desirable and may be economically feasible. Thus it is desirable that any computer system developed be easily expandible so as to provide for either non-storage or storage of special analysis programs.

Illustrative of the analytical instrument system problems, a gas chromatographic data processing system must:

(A) Select from the signal that produces the chromatogram the essential information that is available and described below in the sections (What is a chromatogram—How to interpret).

(B) Select from the signal that produces a chromatogram of a standard sample the information required for the preparation of response factors for producing a quantitative analysis, and peak identification and selection for assignment of factors and the identification of components.

(C) Receive information from the operator to process the information from the standard sample.

(D) Calculate the stored factors and peak identification for automatic application in the calculation of quantitative and qualitative reporting.

(1) In less expensive systems, the "Method" programs for this must be conveniently available for reading in the computer.

(2) In larger systems, the "Method" programs should be stored in the computer.

(E) Receive and store factors manually entered by operator.

(F) Calculate and report the quantitative composition of the sample in a report. In addition, stored method systems should identify components by name.

(G) Be compatible with operation of automatic injection systems (i.e. an Automatic Sampler). In this regard, when employed with an Automatic Sampler, the system should be automatic (no operator intervention required).

(1) For the basic system, a single analytical method is repetitively used.

(2) For the stored method system, a method may be selected from those available in memory and automatically changed during the sequence of runs (at introduction only single method may be automatically selected).

(H) Calculate the average response factors from a series of standard runs in the stored method system.

WHAT IS A CHROMATOGRAM (A) It is a record of the passage of components of a mixture through a detector. The components in the mixture may have all been separated in the column of the chromatograph, some may have been only partially separated, some are completely unseparated and appear in the record as one peak. It is also a record of the amount of liquid substrate that has been lost by the column with time and temperature. It is a record of the noise produced in the detector by the passage of column substrate. It is a record of noise produced by the detector or transducer because of its own peculiarities i.e. noise from a flame ionization detector because of fuel gases (impurities, control of flow of the fuel gases) noise from hot wire detector (carrier gas flow sensitivity, movement of filaments), noise from power supplies, amplifiers and readouts.

Noise is defined as unwanted, uninformative signal, produced by the transducer or its essential-electronics; it includes signals because of contamination of fuel gases and their change in flows, substrate bleed, carrier contamination, contamination from previous injected samples, etc.

The practical chromatogram as presently employed has an elapsed time as short as one minute and as long as 180 minutes. It is not anticipated that this elapsed time requirement will change significantly in the near future, although the requirement of 180 minutes may tend to be shortened and in general analysis time may compress.

Significant signals (peak) produced within the elapsed time above will rise above the unwanted signal and return to the level of the unwanted signal in times between one-half second to 600 seconds.

Significant signals (peaks) may be produced by components in the sample ranging from 99.9999% of the concentration of the sample to 0.0001% of the total sample. The total sample quantity introduced can range from $\times 10^{-3}$ µl. liquid to 25 µl. of liquid sample, and from 10 µl. of gas to 25 ml. of gas, and the number of components can vary from one to two hundred.

(B) Baseline

The baseline is defined as that portion of a chromatogram which is not:

(1) A peak
(2) An envelope of unseparated peaks
(3) The valley between unresolved peaks It can also be defined as the signal that would be recorded as the gas chromatograph is operated as if an analysis were being performed, but no sample has been injected into the carrier gas stream. Baseline so constructed may not necessarily be exactly reproducible in successive runs since "noise" and baseline drift may change from run to run with instrument conditions held presumably constant i.e.

(1) Column bleed may decrease.
(2) Baseline cycling from temperature control on column, faulty flow and pressure controllers, condensation in lines, etc. may not always be synchronized with start time.
(3) Amplifier balance can have changed.

"Real" baseline, therefore, cannot necessarily be "memorized" but must be measured on the particular chromatogram of interest.

In actual practice, baselines are "drawn in" by the operator after the conclusion of the run when manual methods are employed. Based on the operator's judgment, noise is smoothed out and baseline under peaks are estimated. In estimating the baseline under a peak, the operator will "draw in" a line that is tangent with the last clearly resolved baseline prior to the peak (or succession of unresolved peaks) and the earliest clearly resolved baseline after the peak.

(C) Noise (1) Electrical:

(a) Normal-constant-measurable e.g. inherent level from system.
(b) Incidental—erratic in time and amplitude usually high frequency resulting from internal and external influences.

e.g. internal—"spike" from particulate matter entering detector
  e.g. external—voltage surge from unassociated source Electrical noise can be eliminated or reduced by electrical or digital filtering.

(2) Pneumatic:

(A) Normal—constant e.g. inherent flow noise
(B) Incidental—erratic in time and amplitude usually low frequency (can appear similar to real peak) e.g. leaks, faulty flow controller components n.b. a "floating" pressure regulator can be reproducible.

(3) Chemical/Physical:

(a) Contamination due to desorption of components
(b) Displacement of materials in column by sample injected
(c) "Ghost" peaks Pneumatic or Chemical/Physical noise is generally rejected by level and/or topology.

(C) Peak

A peak in the chromatogram is the record of the passage of a component (or components) of the sample through the detector, which produces a signal differing from the baseline signal.

Let it be realized that a chromatographic peak is virtually never a true Gaussian curve. The Gaussian curve and associated equations are simply the best, simple approximation for most chromatographic peaks when treating the chromatogram mathematically.

Peaks of different shapes are described below.

(1) Separated peaks.—A single, clearly resolved peak, corresponds to a logical sequence of slope changes. Changes that do not follow this fixed sequence (or those described in later descriptions of other types of peaks) must be treated as baseline. Beginning with differing by zero from the slope of the baseline, the peak starts with as an increasing positive slope and increases to a maximum (called the inflection point). A positive slope followed by a zero slope followed by a negative slope is peak top (the time of which occurrence is retention time). The peak end occurs when negative slope changes back to zero with respect to the baseline. Signal level at the beginning and end of a peak is the signal level of the baseline. The slope of the leading edge of a peak will in every practical case (except where column overloading occurs) change at a higher rate than at the end of a peak. On many peaks the change in slope on the following edge of the peak may be significantly less than on the leading edge particularly where the slope approaches zero with respect to the baseline (peak tailing).

A peak is defined as being separated when the resolution between the peak and adjacent peaks is greater than 1.5, where resolution is defined as the ratio of the spacing between the two peak maxima, $\Delta t_R$, to the mean base width of the two neighboring peaks Wm.

$$R = \frac{\Delta t_R}{Wm} = 2\frac{(t_{R2} - t_{R1})}{W_1 + W_2}$$

where:

$t_{R1}$ and $t_{R2}$ are the retention times $W_1$ and $W_2$ are the peak widths measured at the base between tangents drawn to the inflection points (2) Unresolved peaks.—Two peaks are considered as unresolved if the peak resolution is 1.5 or less. For unresolved peaks the logical sequence of slope changes as described previously are obtained. The position at the end of each peak, except the last peak, when negative slope changes to zero and then to positive is called the valley. The signal level at the valley position differs from the signal level of the baseline. Peak shapes and signal levels of a given peak in a sequence of unresolved peaks can differ significantly from the true peak shape if the peak were completely resolved.

(3) Peak shoulders.—Shoulders on peaks are a special case of unresolved peaks and are characterized by slope changes that retain their immediately previous direction after obtaining a value of zero. Like valleys, peak shoulders are characterized by a signal level at zero slope which are greater than the baseline signal level. In certain cases the slope of the shoulder will never reach zero but decrease followed by an increase.

(4) Peak on solvent tail.—Solids and some liquids are introduced into the gas chromatograph by dissolving in a solvent. The concentration of the solvent is usually large compared to the concentration of the components of interest so that the detector signal produced by the solvent is usually large compared to the signals produced by the peaks of interest. Peaks of interest elute and are detected prior to the complete elution and detection of the large solvent peak. In time, they reside on the "tail" of the solvent peak.

It is the intent of this invention that peaks of interest eluting prior to the complete elution of the solvent peak be measurable, and for the purpose of measurement, the tail of the solvent peak will be treated as baseline. Peaks with similar shape to a solvent peak can be encountered in the body of a chromatogram. They differ from solvent peaks in that their area and concentration is of importance in the analysis.

INTERPRETING A CHROMATOGRAM (A) Modes of calculation (1) Qualitative calculations:
(a) Retention Time ($t_R$) in minutes. Measured from the sample injection point to peak maximum.
(b) Adjusted Retention Time $t'_R = t_R - t_M$
  $t_M$ = time, from sample injection point to time of peak top of unretained compound.
  Examples: (1) Air peak from a thermal conductivity detector. (2) Methane peak from an ionization detector.
(c) All methods listed above require measurement of absolute time initiated by an operator or sampler pushing a button. It is required that all systems "start" (auto sampler, instrument programmer, data handling system) be actuated by a common switch.
(d) Referenced or Relative Retention Time $$RRT = \frac{t_R(X)}{t_R(S)} \text{ or } \frac{t'_R(X)}{t'_R(S)}$$

$$(t_M = 0)$$

X = peak of interest
S = reference peak

Reference peaks shall be designated by retention time brackets (i.e. $S_1 > 0.32$ but $< 0.36$ minute) entered before or after integration or entered after the calculation of adjusted retention time and held in storage for automatic insertion when this mode of calculation is employed in subsequent runs. The largest peak in the time zone to be selected as the reference peak.

(2) Quantitative calculations:
(a) Internal Standard Mode $$C_x = f_x C_s \frac{A_x}{A_s}$$

C = concentration of component in desired terms (i.e. weights, moles, or percents)
$f$ is normally determined from a chromatogram of a standard sample containing known amounts of the internal standard and the components of interest.

$$f_x = \frac{C_x A_s}{C_s A_x}$$

This mode differs from the normalization mode, in that the internal standard is added to a sample to be analyzed and all peaks are ratioed to it to determine their concentration.

(b) Area Normalization Mode $$A_1 f_1 + A_2 f_2 + \ldots + A_x f_x + \ldots A_n f_n = \Sigma A_x f_x$$

$$C_x \% = \frac{A_x f_x}{\Sigma A_x f_x} \times 100$$

Response factors ($f_x$) can all be set to 1, then the method is area percent.

As in the Internal Standard Mode, one component is chosen to which all other component weights are scaled, hence relative response factors are actually used.

(1) Calculate the average $f_x$'s from a standard run or series of standard runs after the known concentration of all the sample components have been entered. These average calibration factors shall be held in storage (identified by RRT) for application to subsequent analytical chromatograms.
  (2) Enter the stored calibration factors for application to subsequent analytical chromatograms.
  (3) Apply stored calibration factors to an analytical chromatogram, normalize and present results in the desired percent concentration.

(B) Peak detection

The chromatographic peak has been described in previous sections. In manual techniques, an operator generally decides the existence of a peak by evaluating the topology of the chromatograms. He is not dependent on electrical phenomenon such as slope detection. In implementing the peak detection method, it is recommended that the computer attempt to emulate this human capacity to remember definitive information of a potential peak start while withholding formal recognition that this is a peak until subsequent, clarifying, information is received, such as the peak has crested.

In making the above decisions, the method should select the prime points of an eluting peak such as start time, inflection points, crests, valleys and return to baseline.

It should also be recognized that because of the nature of chromatography early peaks can be fast and sharp while late peaks can be very broad. The method, therefore, should contain sampling rates and smoothing routines which can be made a function of peak shape and/or time.

As described in a previous section, all peaks in a chromatogram will not be clearly resolved peaks. It is requested that the operator has the option of treating unresolved peaks such that either the total area of the unresolved peaks is determined or the individual areas are determined by dropping a perpendicular from the valley. An exception to this is where peaks elute on the tail of a solvent peak; here peak skimming techniques may be employed by treating the tail of the solvent peak as baseline.

(C) Baseline calculations

Ideally the system should emulate the operator who has a finished chromatogram and will draw in baseline and correct peak areas according to this baseline. The most general rule used by the operator is to draw a straight line through the last clearly resolved baseline prior to a peak (or succession of unresolved peaks) and the earliest clearly resolved baseline after the peak. The operator will make exceptions to this rule based on previous knowledge of the baseline (such as from a "blank" or calibration run). This normally means drawing a baseline from reproducible points other than baseline points such as a clearly defined valley. In order to perform these functions, the system must be capable of doing the following:

(1) Measure baseline and use the measurement in determining baseline during the run.

(2) Measure and remember the last baseline segment and basepoint before starting a peak or series of unresolved peaks.

Note: A baseline segment is defined as two successive measurements of baseline. A basepoint is one measurement of baseline. These measurements should be taken at time intervals which should vary with the sampling rate for peak analysis. That is, if the peaks are sharp and fast, the sampling rate and basepoint measuring rate should be fast.

(3) Measure and remember all valley points.

(4) Determine and measure the next basepoint after a peak or series of unresolved peaks.

(5) Extend the last baseline segment, measured before starting a peak or series of unresolved peaks, (this extention is a baseline gradient) for comparison with gradients determined from the last basepoint of this baseline segment to all valley points within a series of unresolved peaks, terminated either by the occurrence of a predetermined number (number of unresolved peaks to be determined experimentally, present number is ten) of unresolved peaks or a new basepoint. (In the case of termination by a new basepoint, a gradient will also be determined for that basepoint). These gradients are examined sequentially and the first gradient which is less than the baseline gradient designates its valley point or ending basepoint as the end point for the baseline drawn from the last basepoint of the baseline segment. This baseline is then used for the area calculation of all peaks above it. Its end point is the new "start" point for the reinitiation of the baseline search.

If there is no gradient less than the baseline gradient then the point exhibiting the minimum gradient in the series is selected as the end point for the baseline for area calculation of all peaks above it. Again, this end point is the new start point for reinitiation of the baseline search.

If there is no last baseline segment before a peak starts (such as when an end point is designated as a new start point) then the system determines gradients from the start point to all valley points and/or a baseline point and the minimum gradient indicates the next end point for baseline construction.

(6) The exception to this procedure requires forcing predesignated basepoints during a run. A minimum of four predesignated basepoints should substantially improve the determining of baselines in complicated or unusual chromatograms. A forced basepoint should be designatable by the operator or method in minutes. This time will indicate that the first valley following it will be treated as a basepoint for purposes of determining baseline.

COMPATIBILITY

(A) Instrumental

It is recognized that the performance characteristics of individual gas chromatographs can influence the real and apparent performance of any data handling system. Furthermore, there are some instruments entirely unsuitable without modification. It is, however, essential to marketing that the design of the gas chromatography data handling system be such that it not arbitrarily eliminate compatibility with other gas chromatographs on the market as well as in the field. Therefore, it is necessary to have available field test procedures which test the performance of the data handling system independent of the chromatograph which it services.

The system should be able to process data from the following type detector systems and their associated electronics.

(1) Thermal conductivity
(2) Flame ionization
(3) Electron capture
(4) Thermionic or H—P

(B) Environmental

Because of the one to one nature of the data handling system, all components of the system and the system itself must be capable of optimum performance in the laboratory environment.

Temperature—to operate within specifications over the temperature range of $+15°$ C. to $+32°$ C.

Power—to operate within specification at 117 v.$\pm$ 10% of 60 Hz. So-called 220 v. versions should have taps for nominal line voltages at 210, 230 and 250$\pm$10%.

Interference—the data handling system must be capable of operation in close physical proximity to such equipment as:

(1) Gas chromatographs—with silicon controlled rectifiers which produce large power line surges
(2) Hydrogen generators
(3) Equipment with multiple solenoids which produce power line noise
(4) Electro-mechanical calculators which also produce power line noise

(C) Distance (1) Processor to most distant gas chromatograph, maximum of 1000 feet
(2) Processor to most distant output device, maximum of 1000 feet.

Thus a gas chromatograph data system should provide analytical qualities at least equal to better integrators and a capacity to relieve analyst of the bulk of post-GC run calculations. A minimum requirement is accuracy, sensitivity, and precision equal to the highest quality integrators; the sensitivity specification should be that peaks which have heights in excess of three times ambient detector noise and areas exceeding 30 microvolt-seconds are repeatably detected.

Flexibility of the system should be significantly superior to the integrator in its ability to reliably detect and quantize the following non-nominal peak topologies:

(1) extremely fast peaks (2 per second) typical of capillary columns.
(2) extremely slow and low lying peaks
(3) tailing peaks, and
(4) excessive positive and negative baseline drift.

The system should have a minimum number of controls (certainly no more than an integrator).

The overall objective is to absorb within the capacity of the system those features typical of a large computer system. Desired features, which relieve the analyst from the tedium of post-run computation based upon raw elution time and peak area are (a) Area Normalization Calculations
(b) Relative retention time computation
(c) Normalization or internal standard calculations based upon corrected peak areas.
(d) An automatic computation of response factors for correcting peak areas; and
(e) Component identification for the purpose of naming components on the report and for selecting response factors required to correct individual peak areas.

Control of the analysis should avoid complexity (as reflected by the requirement for few "analytical" knobs). The initial introduction of external information or "method data" (i.e., component names, calibration weights, etc.), should be direct, easily learned, and controlled in such a way as to avoid burdening the analyst with tedious, error intolerent, and inflexible data entry procedures. The method data from routine analyses should be permanently stored either electrically in the system or upon some automatically generated medium, such as punched paper tape. Under no circumstances should the analyst be compelled to generate method data "offline" or without the aid of the system.

(D) Errors in syntax or context data errors (1) Numeric data shall be entered between field delimiters such that recognition of an erroneous entry may be rubbed out and the field reentered.

(2) Lines, or a set of fields contained between line terminators shall also accede to a request, and the entire line correctly reentered.

(3) The complete method entry may be aborted at any time.

(E) Automatic operation

The basic system will be capable of utilizing magnetic tapes for storage. It shall be possible to do an automatic sequence of analysis where methods are read in automatically.

(F) Report format (1) The report will be in the following form:

Teletype Conversation

|  | Peak | Time | RRT | RF | Comp. | Percent | Area |
|---|---|---|---|---|---|---|---|
| Minimum value | 1 | .01 | 1 | .0001 | AA | .0001 | 1 |
| Maximum value | 200 | 327.67 | 32,767 | 3.2767 | ZZ | 99.9999 | 20,000,000 |

NOTE.—Area:
Must be in integer form.
Must represent peaks less than 1 part per million.
Need not exceed four significant figures.

(G) Core storage

In the stored method version of the gas chromatography data handling system, core storage of methods to include component names and additional flexibility are required. This version will be capable of performing all the functions previously discussed in this OPERATION section, plus the following:

(1) A minimum of 16 analytical methods can reside in core storage.

(a) These methods will contain the component names. A minimum of 6 characters per name is necessary but methods should be so structured as to allow more characters per name for small component lists or shorter names if required for long lists. A minimum of 25 component names per method is necessary. This should not preclude the capability of using all of the component names in one method.

(b) The core methods can be easily entered from method tapes and removed on to method tapes.

(c) If an automatic sampling system is being employed, the sequence of methods to be applied to the sequence of samples will be entered before starting the automatic cycle.

(d) The operator will be able to modify methods in core storage.

(2) Additional flexibility.—In addition to the operations previously described, this system will do the following:

(a) Teletype control.—All button commands on the interface will be duplicated by teletype commands.

(b) Threshold report.—The system will report the automatic calculations of threshold parameters (baseline, peak area, shoulders) to the operator.

(c) Manual thresholds.—The operator will have the option of entering:

(1) Area—a value which specifies a threshold which a potential peak must attain to be classified as a peak. The default case uses the value automatically calculated prior to the analysis. Consideration will be given to employing a scaling factor to apply to the automatic baseline thresholds.

(2) Shoulder—a value which specifies a threshold to determine whether a shoulder is detected. If detected, a retention time and area will be reported. The area will be obtained by dropping the perpendicular from the inflection point. In the default case, all shoulders would be reported.

(d) End of run message.—When the real time analysis terminates, the system will notify the operator of the instrument number and a diagnostic as to what terminated the data acquisition.

(e) Air or offset peak.—As an alternative to air peak time, a value (in minutes) may be entered to give an apparent air peak time. The value will be subtracted from the time of the first peak and the resulting apparent air peak time will be used to calculate adjusted retention times.

(f) Multiple RRT.—Up to 4 reference peaks can be employed for determining referenced retention times (RRT).

(g) Multiple internal standards.—Up to 3 internal standards can be employed for determining concentrations in the internal standard mode.

(h) Minimum peak threshold.—A value can be entered, below which a peak will be treated as an unknown.

(i) Print threshold.—A minimum concentration can be entered, below which the peak will not be printed in the final report.

(j) Average calibrations.—Several calibrations runs of the same standard sample can be made to check repeatability of the total system. The running average of these calibration factors can be calculated by the system and used as the method in the analysis mode.

(k) Teletype assignment.—With more than one teletype in the system, the operator can assign specific teletypes to specific chromatographs.

(l) Error indicators.—Positive indication on the teletype that the following errors have occurred.

(1) A peak has gone out of the range of the system (GC output or interface input).
(2) Baseline drifted below zero
(3) Area accumulator overflowed (VI) SYSTEM PERFORMANCE AND TOLERANCES (A) Input (1) Range 0–10 v.
(2) Accepts signals from T.C. bridge and FID and TID with electrometer amplifier.

(B) Retention time (1) Resolution—0.01 minute
(2) Range—3 hours
(3) Accuracy—0.1% or 0.01 min. (whichever is greater)
(4) Peak top detector sensitivity sufficient to give above accuracy
(5) Initial lockout of area measurement of at least 60 min. (not on basic system)

(C) Integration (1) Peak detection sensitivity—such that it will detect a peak that rises to three times the noise level of the baseline, if the baseline has not drifted more than ½ the peak height over the duration of the peak.

(2) Sensitivity—6 area counts/1 μv.-sec.
(3) Range—2×10⁹ μv.-sec.
(4) Peak rate—two peaks/sec. max.
(5) Area reproducibility±(0.05% of reading+5 μv.-sec. per second of peak duration+baseline drift error) under following conditions:
   Temperature: between 15 and 32° C.
   Line voltage changes±10%
   Calibration cycle—day to day
(6) Area accuracy±(0.1% of reading+5 μv.-sec. per second of peak duration+baseline drift error) under following conditions:
   Temperature: between 15 and 32° C.
   Line voltage changes±10%
   Calibration cycle—day to day (D) Baseline correction (1) Operable from −2.0 mv. to +100 mv. at 10 v. full scale
(2) Tracking rate ±50 mv./min. at 10 v. full scale In the computer program provided analytical requirements should have precedence over post-run computational features. The analytical programming requires the development of new algorithms which represent an improvement over classical techniques of peak detection and baseline correction. Post-run computations, being a mechanization of accepted formulae, require no algorithm development but do compel a high degree of system development in order to maximize the mix of features within limited resources imposed by the economic restraint of the overall system.

The classical technique of detecting a peak start when the signal slope exceeds a certain threshold and of determining return to baseline when either the signal slope approaches zero or when the signal level falls below the level of a previously determined baseline should be avoided because of (1) the inherent sensitivity of the signal first derivative to noise, (2) the insensitivity of the first derivative approach to slow low-lying peaks and (3) the confusion introduced by positive sloping baselines.

The inherent advantage of the fact that the system employs a computer should be exploited as much as possible. These advantages are the ability to mechanize relatively complex algorithms or decision processes so often required in the interpretation of real-life phenomena but with a non-linear decreasing cost-complexity relationship.

It will be seen that there is a great distinction between this kind of system and a typical computer system, and an instrument according to the prior art. Our system in its relationship to an instrument is dedicated to a single specific task; its user is "at home" with instruments, not with computer systems. Yet obviously, our system is a computer and as such is intelligent which an instrument is not. What gives computers intelligence is memory. Perhaps a more functional label for our system would be "an instrument with memory." This human-like quality enables it to make tentative decisions when a trend first indicates the slightest possibility of an impending event and then subject that decision to constant re-evaluation, possible rejection.

An "instrument with memory" is at an advantage as follows:

(1) Filtering on "memoryless" instruments is electrical and, therefore, exponential in nature with resultant signal distortion since weight is given to the future behavior of the signal. The "instrument with memory" on the other hand, can perform a symmetrical evaluation of the current signal giving balanced weight to its past and future behavior through the mechanism of least squares smoothing. Nor need the filtering be restricted to continuous function techniques. By logical inspection of several continuous points on a signal, the instrument with memory is able to identify by logic inspection that point which is clearly deviant.

(2) The "memoryless instrument" is confined to making an irrevokable decision as to the event of a peak start, crest, or end-primarily on the current behavior of the GC signal. An "instrument with memory" could, as the analyst himself would do when observing an eluting peak on a strip chart recorder, make a tentative decision as to the occurrence of an event and then subject its decision to constant re-evaluation-cancelling it even if future signal behavior should demonstate its invalidity. Thus a computer can commence to "integrate" a peak as soon as the signal starts a positive trend—i.e., goes positive by even a fraction of a microvolt.

(3) The "memoryless instrument" is compelled to correct a peak for baseline "on the spot," without the knowledge of the spectrum topology which follows: It can only subtract the most recently detected baseline level or some radiated extrapolation of it. The instrument with memory, being a computer, is able to review the total spectrum and thereby correct baseline by an interpolative process.

(4) These design features of the invention establish on the one hand, a standard for signal treatment prior to evaluation and on the other an overall analytical approach to the evaluation process. Also needed is a criterion for evaluation. Signal slope as the primary determinant was ruled out for reasons stated earlier. We again relied upon the "human observer" analogy as a means of deducing a tactic to observe signal movement to determine the peak to determine the peak start crest, etc. We have found that the computer can, by observing integrals and counter integrals, implement the same procedure.

(5) An integral observation technique works as a criterion for determining peak starts and crests but is of no value in determining baseline which, unlike the other topological points of interest, is really a condition of non-occurrence of a topological event. The simple technique of assuming a zero slope level or base height level is only adequate with non-drifting baselines. We attacked this problem first with an attempt to define a baseline or better stated tried to decide "when is a drifting baseline not a baseline but a peak." The answer we arrived at was "when it is nonlinear." We, therefore, decided that the signal should be marked as a baseline when the behavior of the first derivative, over an extended period of time exhibits linear characteristics. Put another way, baseline is present when the signal second difference over an extended period is within an established threshold value, the threshold being a function of ambient noise on the detector.

(6) It is generally agreed that in any digital sampling system the establishment of sample rate should be determined by the characteristics of the signal. In gas chromatography, the slower the peaks, the slower should the sample rate be. A high sampling rate must be employed for capillary work to assure that a few samples be taken between each topological event to avoid the passage of an event between two adjacent samples. Reducing the sample rate as the sample spreads not only increases sensitivity, but also normalizes the spectrum in the time domain so that the various thresholds and other decision criteria may be universally applied to the spectrum. We decided to automatically reduce the sampling rate as a run progresses and peaks widen.

In order to maximize the number of features in the system, we decided to develop what amounted to an operating system using various systems programming techniques which accomplished the following:

(A) Produced a software hierarchy which relieved us of the difficulty and detail of the initial coding of those application features which the user sees. The hierarchy also facilitates design modification as result of actual operating experience.

(B) Allowed us to trade a surplus for a scarce resource. In a small dedicated computer servicing a finite number of instruments, the surplus resource is time—the scarce resource is memory.

Thus, key features of the system relating to core, allocation, efficient file space management, list processing techniques, and decision processes effected through state driven algorithms.

In the end we decided that what was needed was two designs, a basic which incorporated only those features deemed essential and an advanced design incorporating most of those features held desirable. We stipulated, however, that, in keeping with priority specification, the analytical characteristics of both designs be identical and uncompromised. So, what really differentiated the two designs was data management technique.

These essential features included in the basic design are:

(a) Normalization and Internal Standard Calculation under program control.

(b) Area Correction by response factor.

(c) Calibration calculations for the purpose of automatically calculating response factors.

(d) Analysis initiation and method entry by either user conversation or paper tape entry on a single teletype station.

(e) System production of method tapes as the medium of method storage.

(f) A capacity for servicing two instruments.

In the advanced design we added the following features:

(a) Permanent method storage within the system in addition to paper tape storage. This entails several subsidiary features required to manage the stored methods:

(1) method entry at any time either by conversation or by paper type.

(2) stored method print-out or paper tape production.

(3) conversational modification of a stored method to include the insertion deletion or modification of component data.

(b) Component naming up to 23 characters, with no storage penalty for names which are shorter or for redundant usage of names.

(c) Report editing to eliminate print-out of peaks the area fractions of which are less than a user specified value.

(d) Response factor calculation as a running average of several calibration runs.

(e) Simultaneous conversation and report on up to three teletypes.

(f) Capacity to handle up to 8 gas chromatographs.

OBJECTS OF THE INVENTION

It is therefore among the objects of the invention to improve the arts of analytical instrumentation, data processing, data production by analytical instruments, spectrographic analysis, computer architecture, programming, and in particular all of these arts as applied to gas chromatography.

Other objects of the invention are to provide an efficient data processing system for analytical instruments which reduces operator requirements to a minimum yet provides for easy introduction of special data by the operator, performance of special routines under supervision of the operator, and for conversational routines necessary in analysis of data provided by analytical instruments particularly spectrograms, and more particularly spectrograms produced by gas chromatographs.

Still other objects of the invention are to provide an interface between analytical instruments and computers which reduces the chance for data error to a minimum, is responsive to analogue signal variations of at least one million to one, provides for wide separation between the analytical instrument and the computer, yet are inexpensive and reliable.

Yet other objects of the invention are to provide a computer architecture whereby one or more analytical instruments may be connected at will to a single computer, whereby one or more output devices may be connected at will to the same computer, wherein excess computer is not required when only one or a few instruments are connected to the computer, and wherein the computer main memory can be expanding at will to increase system capacity and performance.

Further objects of the invention are to provide efficient programs for spectrographic analysis, particularly spectrograms produced by gas chromatographs, such programs efficiently using a small computer at low cost, providing for special method programs upon operator command, and providing for computer storage of method programs when a large number of instruments are serviced by the same computer.

Other objects of the invention will in part be obvious and will in part appear hereinafter.

The invention accordingly comprises a system, apparatus and method comprising the means, features of operation, combinations of functions and the relationships of one or more of such operations and functions with respect to each of the others of the system; and features of construction, combination of elements and arrangements of parts of the apparatus which are adapted to effect such operations and functions; and a method comprising the several steps and the relation of one or more of such steps with respect to each of the others; all as exemplified in the following detailed disclosure. The scope of the invention is indicated in the claims.

THE DRAWINGS

For a fuller understanding of the nature and objects of the invention reference should be had to the following detailed description taken in connection with the accompanying drawings in which:

FIG. 18 illustrates the format for the storage reference instructions which do not refer to the R-registers used in the computer-processor of FIG. 7;

FIG. 19 is a table of the operation of the storage reference instructions of the computer-processor of FIG. 7;

FIG. 20 is a table of all the operations including input output, immediate and the storage reference instructions distinguished by operation code bits 0–4 in the computer-processor of FIG. 7;

FIG. 21 illustrates the page breakdown of the 4,096 word storage unit main memory of the computer-processor of FIG. 7;

FIG. 22 is a diagram showing the effective address of the program counter and instruction word of the computer-processor of FIG. 7;

FIG. 23 is a diagram indicating the indirect address content of the computer-processor of FIG. 7;

FIG. 24 is the format of the immediate instruction of the computer-processor of FIG. 7;

FIG. 25 is the format of the arithmetic operations of the computer-processor of FIG. 7;

FIG. 26 is the format of the shift operations of the computer-processor of FIG. 7;

FIG. 27 is a list of the various operations and codes showing the status of bits 4–8 of the instruction of identifying the same, of computer-processor of FIG. 7;

Figure 1:
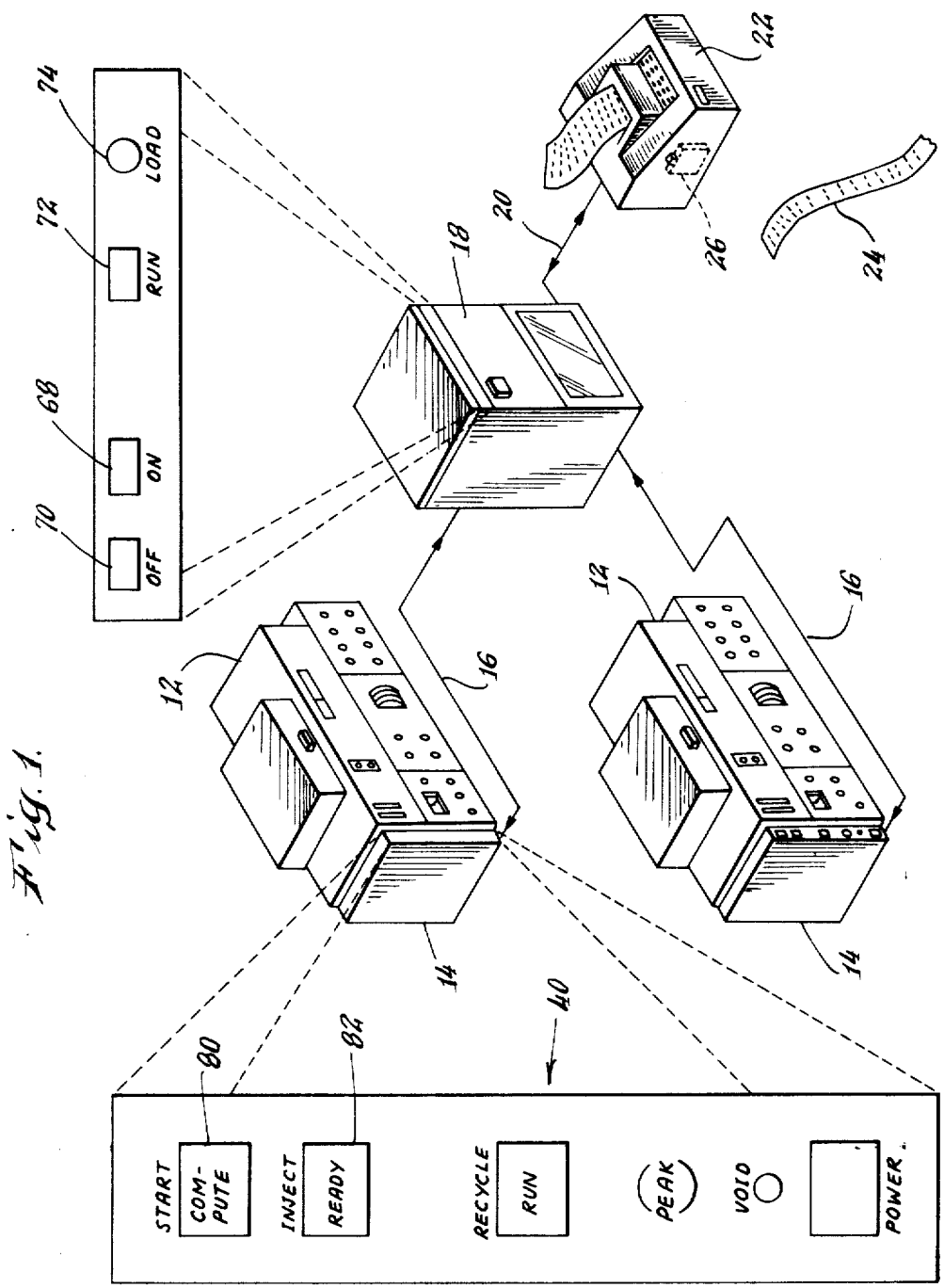
FIG. 1 is a perspective view of a system according to the invention with the control panels thereof shown in exploded view.
Figure 2:
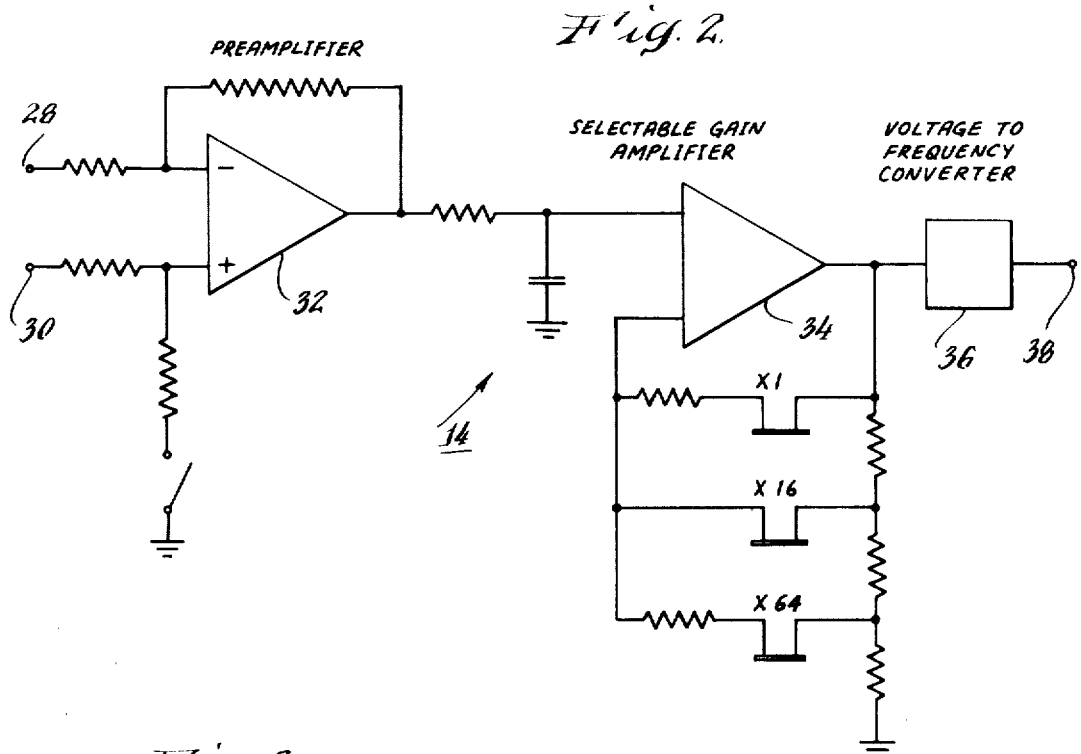
FIG. 2 is a schematic electrical circuit diagram illustrative of the interface of FIG. 1.
Figure 7:
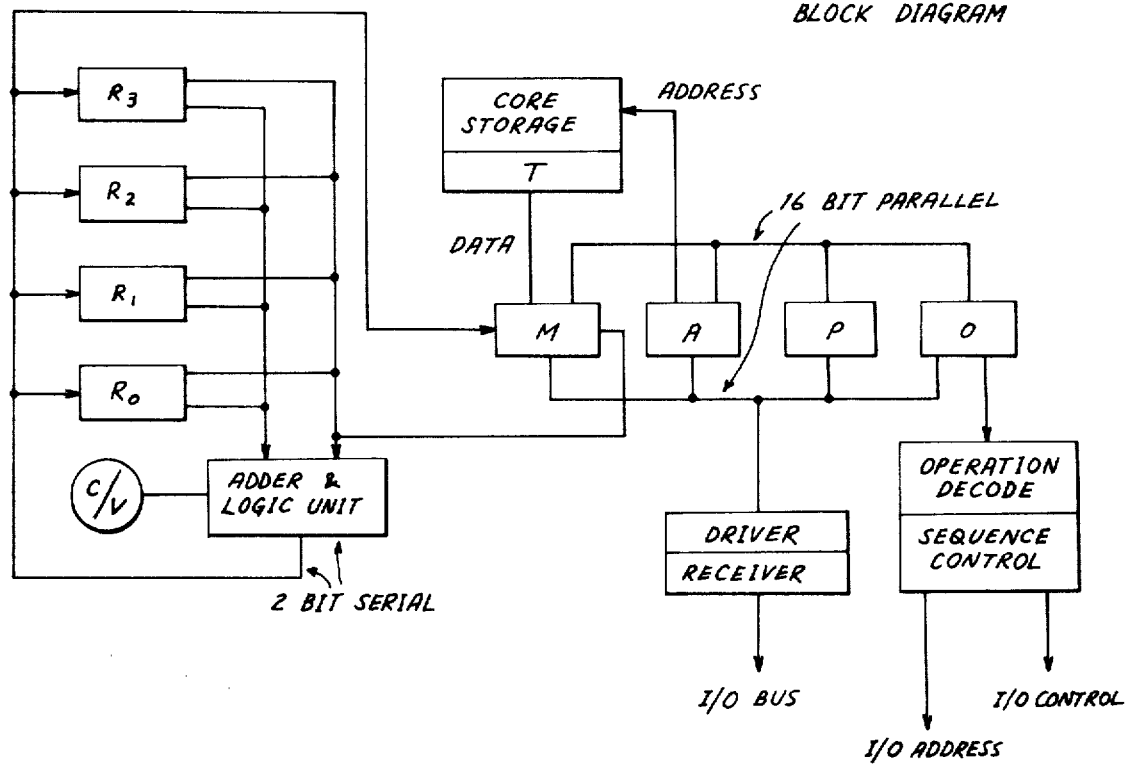
FIG. 7 is a block diagram of the computer-processor of FIG. 1.
Figure 33B:
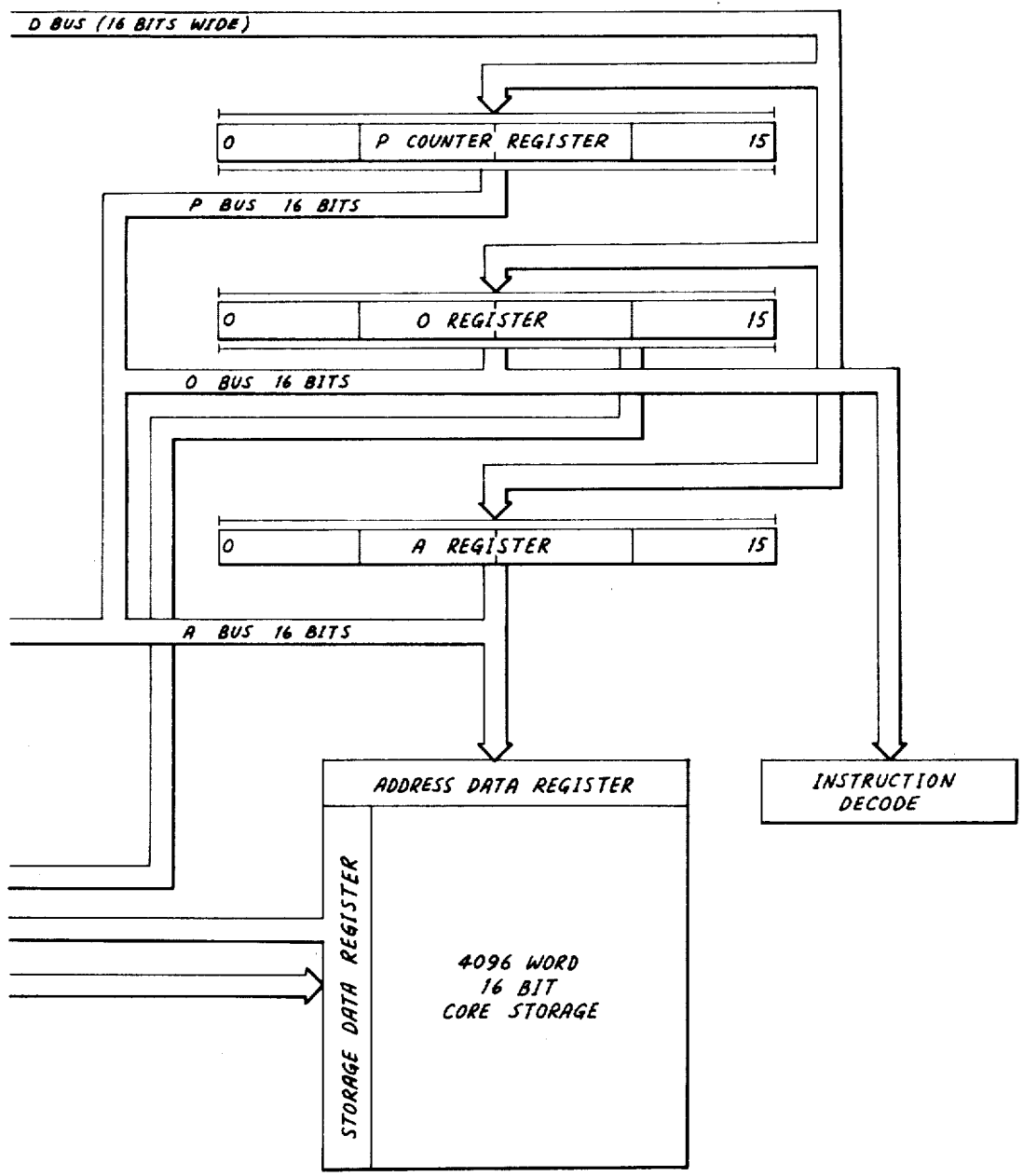
Figure 34:
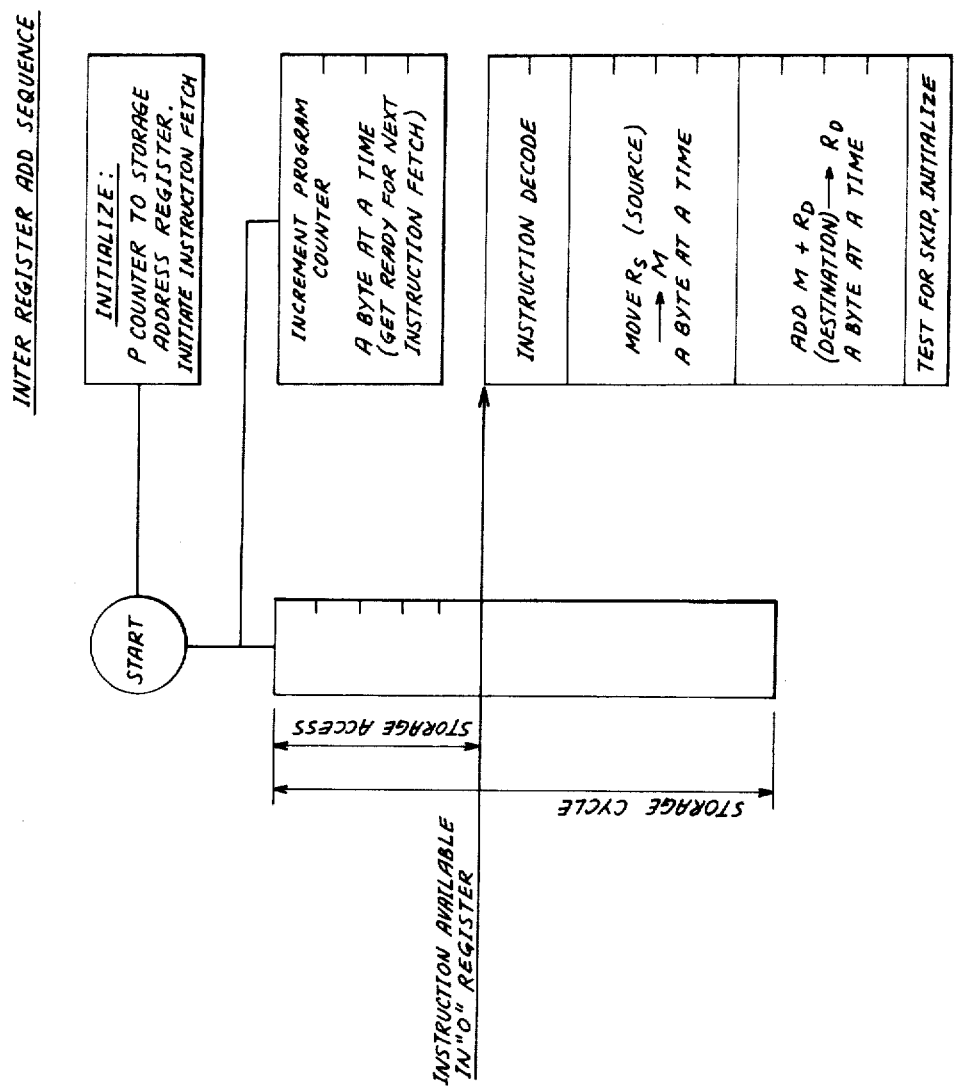
Figure 35:
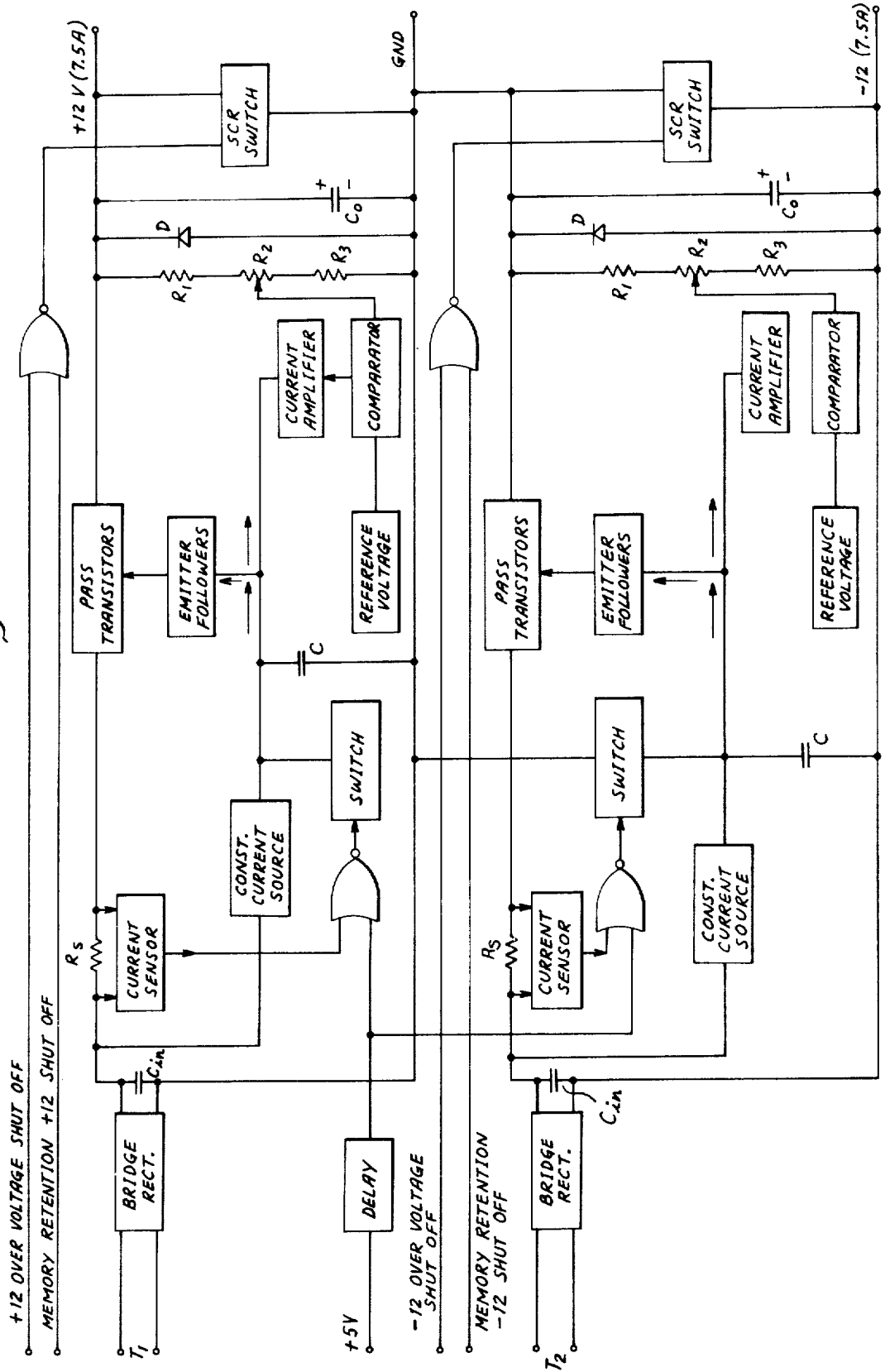
Figure 37A:
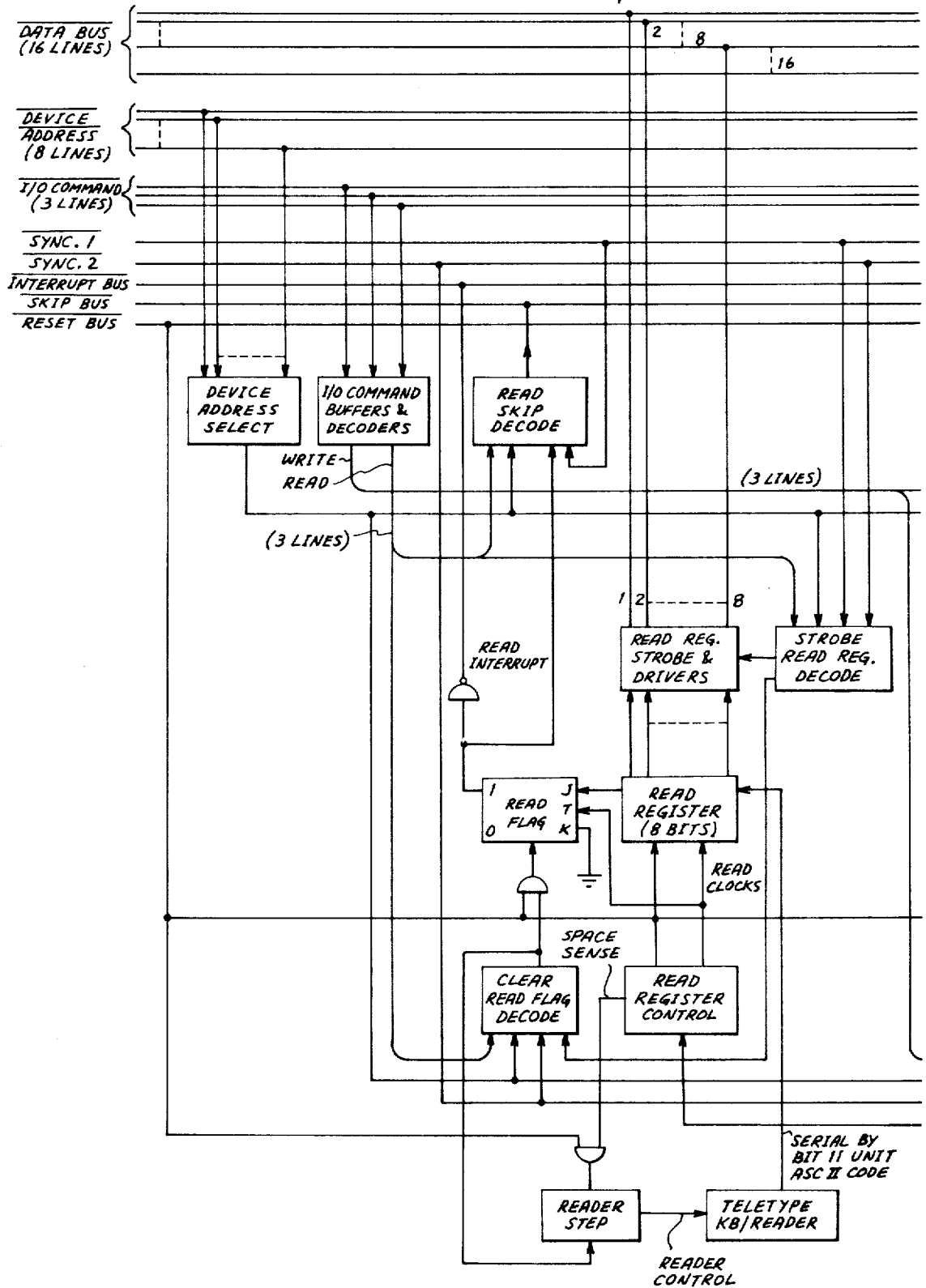
Figure 37B:
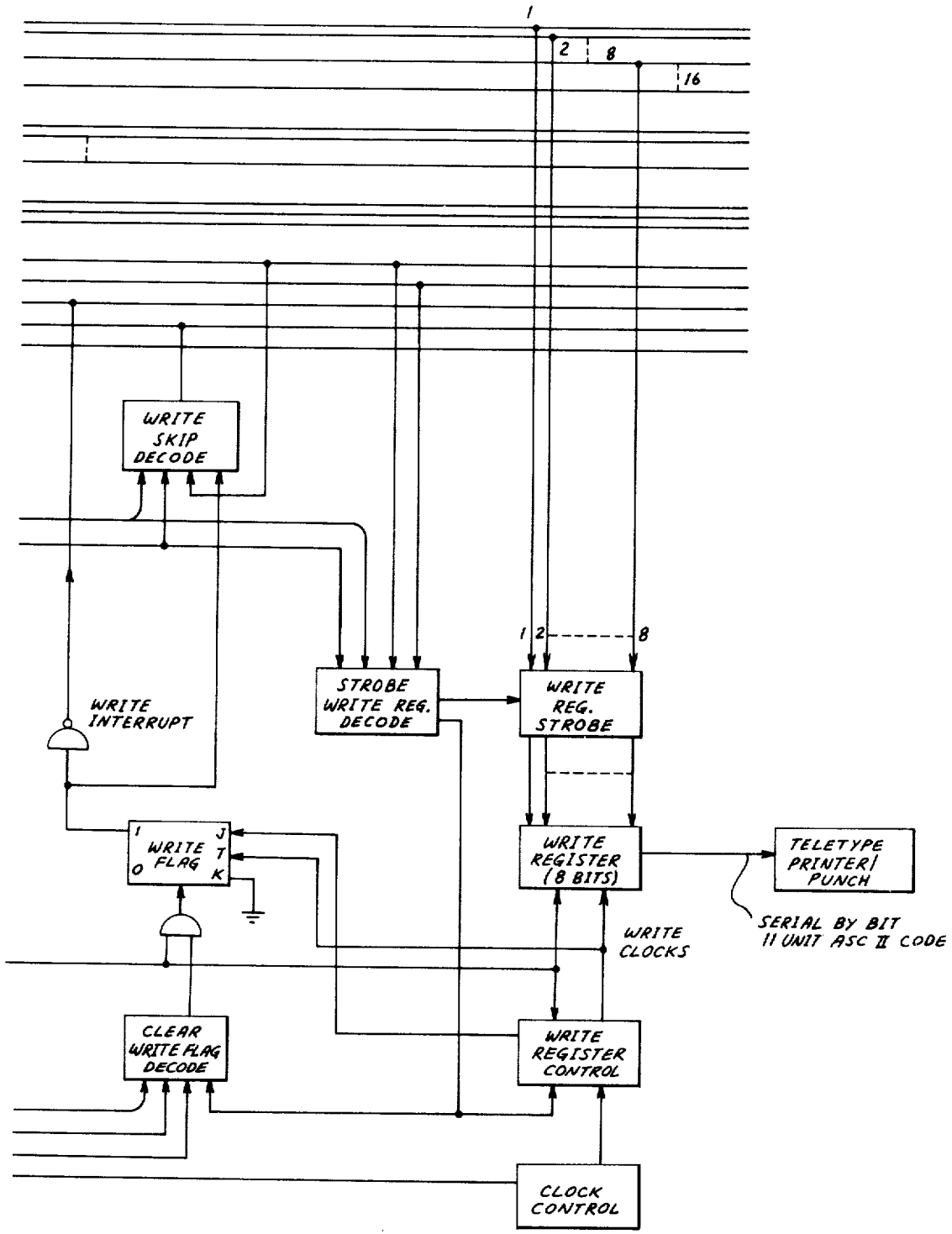
Figure 38A:
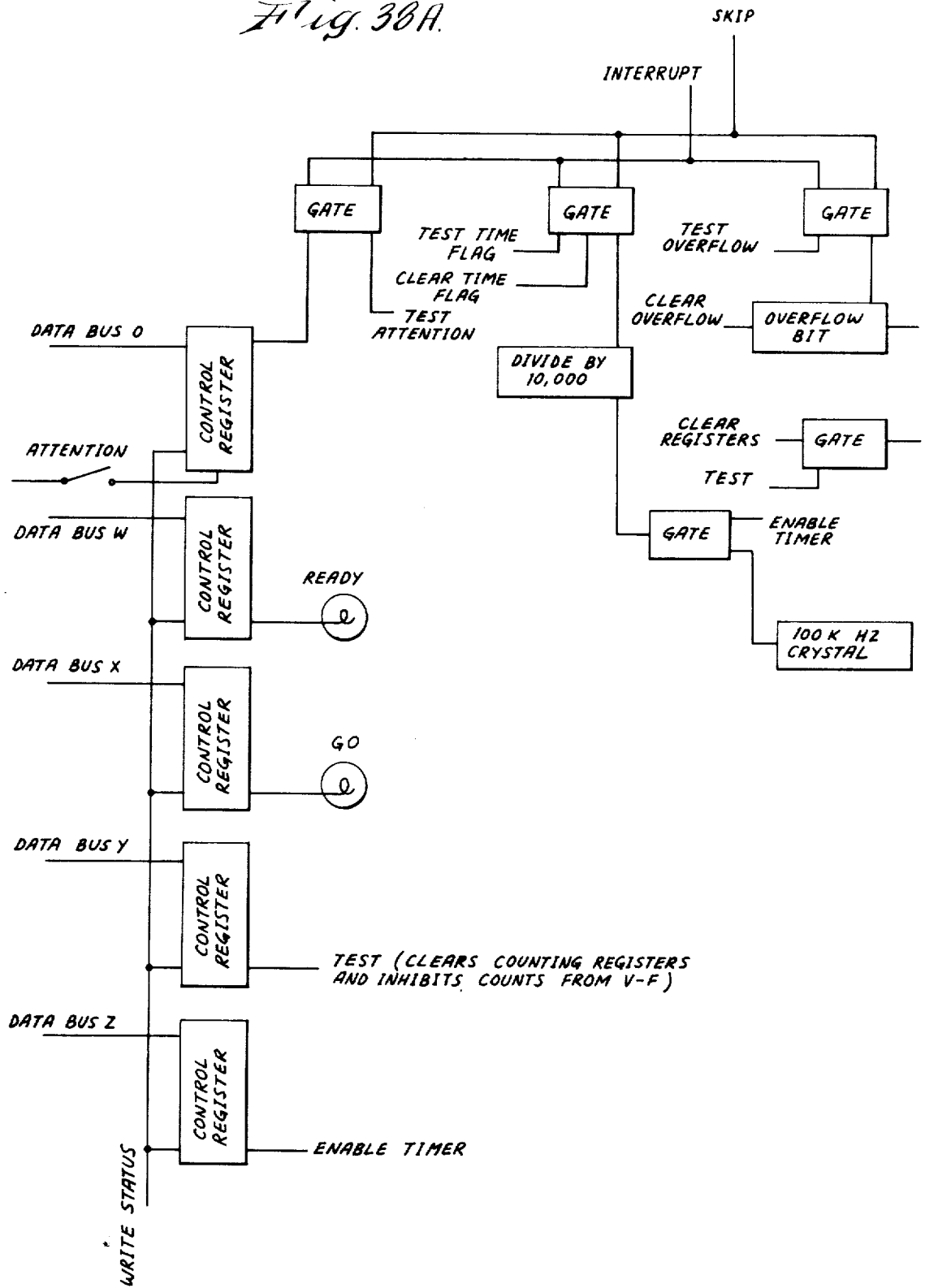
Figure 39A:
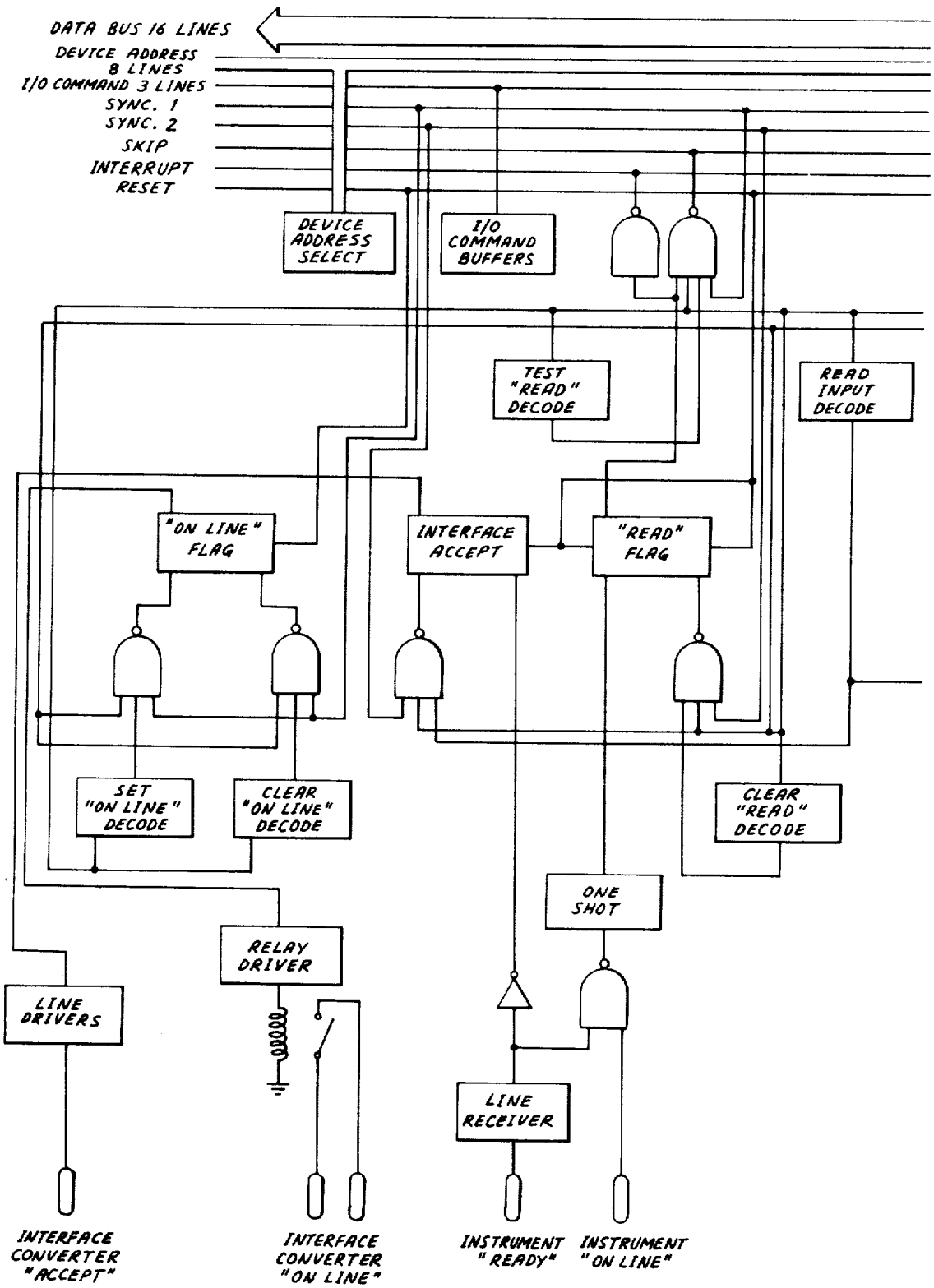
Figure 39B:
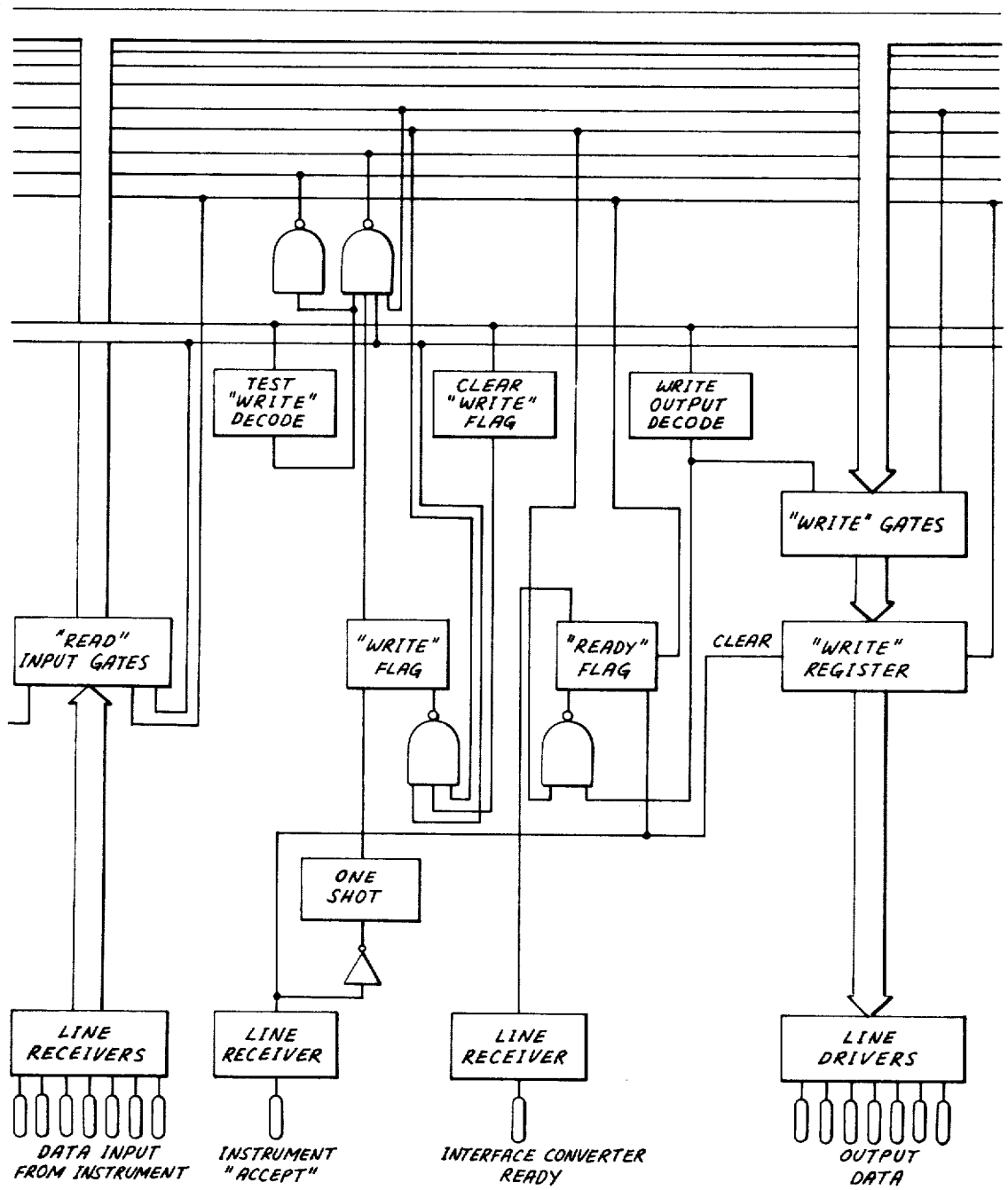
Figure 40:
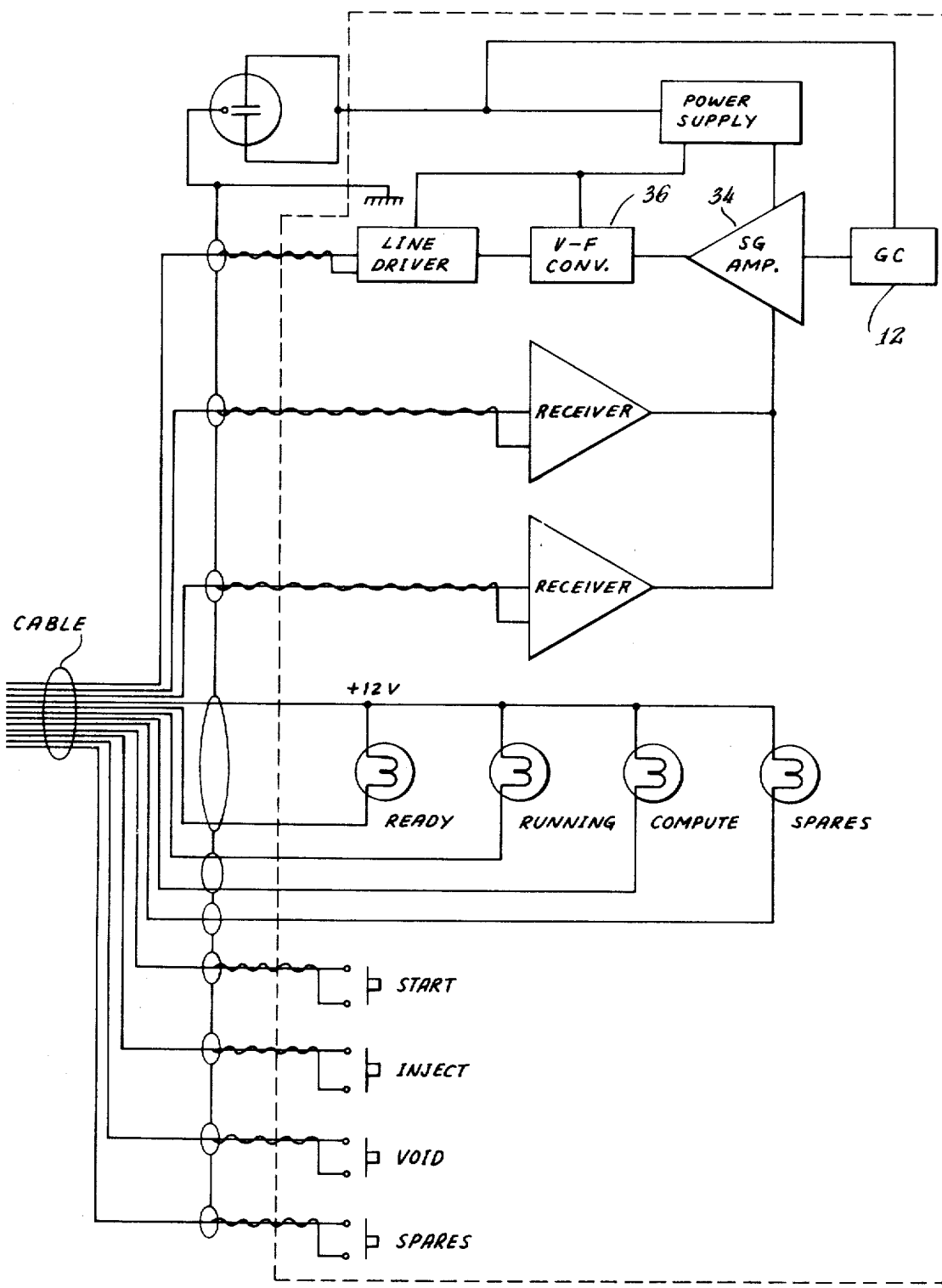
Figure 41:
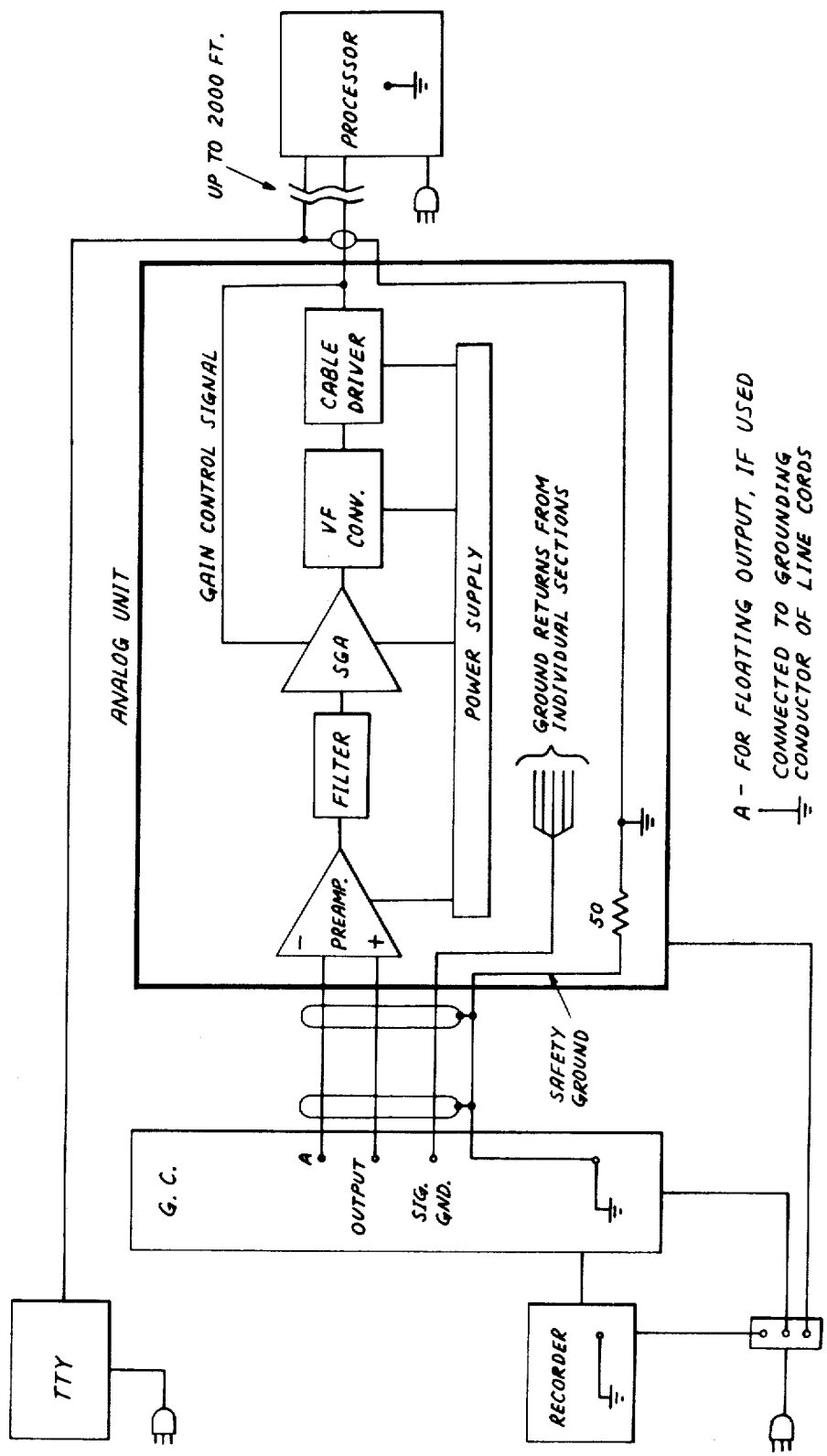

FIG. 33, comprising FIGS. 33A and 33B which fit together to form FIG. 33; is a more detailed schematic diagram of the computer-processor of FIG. 7 illustrating processor arithmetic data flow;

FIG. 34 is a flow chart exemplifying the processor sequence for an inter-register "add" operation of the computer-processor of FIGS. 7 and 33;

FIG. 35 is a circuit diagram of the ±12 volts supplies for the computer-processor of FIGS. 7 and 33;

FIG. 36 is a circuit diagram of the +5 volt supply and memory rotation circuit for the computer-processor of FIGS. 7 and 33;

FIG. 37, comprising FIGS. 37A and 37B which fit together to form FIG. 37, is a block diagram of the terminal interface provided in the processor of FIG. 1;

FIG. 38, comprising FIGS. 38A and 38B which fit together to form FIG. 38, is a diagram of the logic of the interface between the gas chromatograph and the processor of FIG. 1;

FIG. 39, comprising FIGS. 39A and 39B which fit together to form FIG. 39, is a diagram of a standard interface converter provided for the computer-processor of FIGS. 7 and 33;

FIG. 40 is an electrical circuit diagram partially in block form of the interface 14 of FIG. 1;

FIG. 41 is a block diagram of the system of FIG. 1 showing the power and ground connections provided;

FIG. 42 is a schematic electrical circuit diagram showing the circuit employed when the preamplifier of FIG. 2 is connected to a floating source;

FIG. 43 is a schematic electrical circuit diagram showing the circuit employed when the input amplifier IC2 of FIG. 42 is connected to a differential input mode grounded source;

FIG. 44 is another schematic electrical circuit diagram showing the circuit employed when the preamplifier is connected to a differential input mode grounded source; and FIG. 45 is a schematic electrical circuit diagram showing the circuit employed when the preamplifier is connected to a single ended input mode source.

DETAILED DESCRIPTION

General description of the system

The gas chromatography instrument system 10 of the invention is generally indicated in FIG. 1. The system 10 comprises one or more gas chromatographs 12, each provided with an interface 14 connected via a cable 16 to a processor 18; the processor 18 being connected via cable 20 to a data terminal 22. The processor or computer 18 is provided with one or more stored programs. Additional method programs are stored on tapes 24 which may be read into the computer 18 on tape reader 26.

Referring to FIG. 2, each analog interface 14 comprises three main components. Input signals from the chromatograph, either single ended or floating, are fed from terminals 28 and 30 to a preamplifier 32 having a gain of 1 or 10 depending upon the detector being used. The signal from the preamplifier 32 then goes to a selectable gain amplifier 34. As explained below, the gain of the selectable gain amplifier 34 is controlled by the processor 18.

The signal from the selectable gain amplifier 34 is then fed to a voltage-to-frequency converter 36 which produces at terminal 38 a pulse train proportional to the detector output. This signal is fed to the processor 18 via cable 16. The voltage-to-frequency converter 36, plus a counter located at the processor 18, provides integrated analog to digital conversion. Also, since only digital signals (variable frequency pulses) are sent from the interface 14 to the processor 18 on cables 16, no analog multiplexing is required.

The front panel 40 of the interface 14 (FIG. 1) is provided with both pushbutton switches and status lights. The switches are used to signal the processor to begin or terminate an operation. The processor and software in turn update the status lights on the interface front panel 40.

Figure 3:
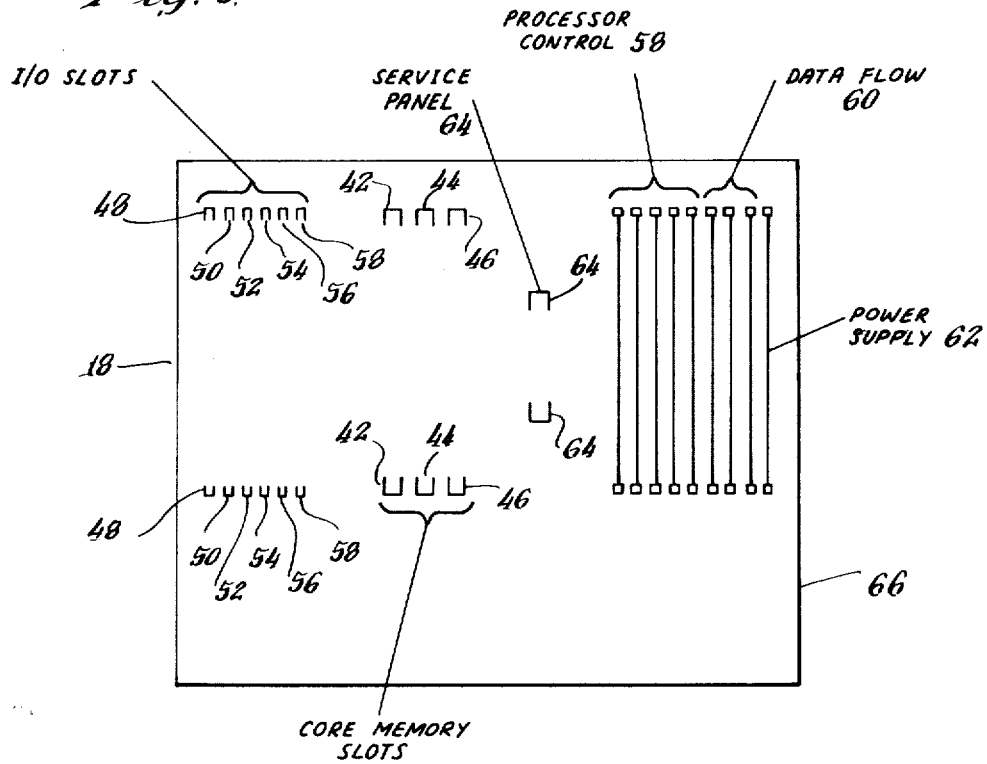
FIG. 3 is a schematic rear view of the processor of FIG. 1 illustrating its modular nature.

The heart of the system is the Processor 18, the back of which is shown schematically in FIG. 3. Referring to FIG. 3, it can accept up to three memory units of 4,096 (4K) words each in core slots 42, 44, and 46, respectively, and five input/output (I/O) cards in I/O slots 48, 50, 52, 54, and 56, respectively. The basic system in its minimum configuration operates with a single 4K word memory in one of the slots 42, 44, or 46. Additional memory can be added in 4K units up to a total of 12K words in the remaining slots.

The input/output boards are instrument related—one board can handle either one or two gas chromatograph cables 16 or one data terminal 22.

To expand the system, one additional gas chromatograph channel requires only the addition of an interface 14 at the chromatograph 12 (FIG. 1) and an input/output card in a pair 48 through 46 for every two channels. For an increase in data capacity or analytical features, additional 4K word memory units may be added each in a pair of slots 42 through 46. The processor control printed circuit boards are located in slots 58, data flow boards in slots 60, power supply in slot 62, and a service panel may be inserted in slots 64.

Front panel control for communicating with the processor 18 have been eliminated except for ON and OFF buttons 68 and 70, a RUN button 72 and a key loader 74 for loading the special method programs, via the tape reader 26 on the terminal 22.

The data terminal 22 may be a modified ARS–33 Teletype equipped with a paper tape reader-punch 26. The terminal 22 is used to output the processed data in the form of a finished report and to communicate with the system in preparing the analytical method. The typical chromatogram 76 of N butyl acetate (FIG. 4) shows the separated components of a mixture represented by the eight peaks 1–8 recorded on the strip chart produced by the prior art. This raw data is reduced by the data system of the invention to analytically meaningful results—component identification and component concentration—in the form of a finished report 78, shown in FIG. 5.

The programs are stored in the core (main memory) of the processor 18. They provide the functional characteristics of peak detection, baseline correction, calibration, normalization, internal standard calculations, relative retention time calculations, signal smoothing and noise rejection, and automatic determination and adjustment of these parameters.

These programs are supplied with the system. The analyst, therefore, is not required to do any computer programming yet he has complete control of the program through very simple conversation instructions.

Operation of the system

The operator initiates an analysis by informing the system that he wishes to begin an analysis and which GC instrument is to be employed via:

The START button 80 on the interface (FIG. 1). Without any further input; so-called default values will be used in the program which are stored in the processor 18. Alternatively, after pressing the START button, the operator enters the initialization parameters.

Either the program asks for the parameters and the operator enters the desired values or default values at the terminal 22 or the parameters are automatically read in a previously prepared program.

Certain control parameters may be entered by the operator—either manually or via the program. These are:

End time (in minutes)—time from sample injection to terminate data collection. The default value is preferably 327 minutes.

Basepoint times (in minutes)—times from sample injection to force baseline at the end of the first peak to elute after each specified time. The user may enter one such time.

Valley—a value which specifies a threshold to determine whether the areas of two or more unresolved peaks are reported individually by separating them with a perpendicular dropped at the valley point, or are summed. In the default case, perpendiculars will be dropped from all valley points.

After the request for analysis, but prior to the sample injection, the system analyzes the signal from the chromatograph under maximum sensitivity to establish the "noise" level of the signal and calculates sensitivity values. This is indicated at the interface panel 40 by illumination of a COMPUTE lamp. This interrogation period is reset and does not normally exceed one minute but must have a definite end time to be compatible with automatic sampling systems. The system indicates the end of this period by illuminating a READY lamp on the interface panel 40. The operator then may inject the sample and notify the system by activating an INJECT button 82 on the interface panel 40.

As the INJECT button is depressed, the READY light goes out and a RUN light on the interface panel 40 brightens. As a peak is eluted during the analysis, a PEAK light on panel 40 illuminates during peak passage as the sample is eluted the processor 18 performs the basic calculations on the incoming data on cable 16. It adjusts the gain of selectable gain amplifier 34 (FIG. 2) and stores the calculated data results required for the analysis calculation.

The system proceeds into the calculation ("analysis") mode when end time has been reached, the operator manually initiates end time, or data space has been overloaded. If the calculation desired is area normalization, the system produces the normalized report of the analysis. If the calculation includes response factors or internal standardization, the operator or program provides this information.

The operator has the option of selecting the first detected peak for establishing $t_M$ or setting $t_M$ to 0. If an air peak is designated the first peak, it is not quantized in the analysis. The default value gives uncorrected retention times.

The operator selects the boundaries (zone) in real time (minutes) of the expected time of the reference peak. If other peaks fall within the specified zone, the reference peak is selected as the peak with the greatest area within the zone. The relative retention time (RRT) of the reference peak is 1. The default case which is applicable in method normalization only indicates no RRT conversion and that component peak matching is by absolute or adjusted retention time.

The operator selects the peak matching tolerance. This is a percentage ratio which allows the RRT of a peak to deviate from the RRT in the component list and still be matched to that component.

When analyzing samples, the operator has the option of requesting that the quantitative analyses be performed by:

(1) Area normalization only, without component data entry.

(2) Normalization after employing response factors where response factors are entered by Teletype conversation or the stored method.

(3) Ratio to an internal standard with or without response factors supplied to the peaks of interest. If response factors are required, they are entered by Teletype conversation or the stored method.

The following input is necessary for (2) and (3).

(1) Response factors to be applied to peaks not in the component list (unknown). From 0.0 to 3.2767 may be entered.

(2) For the analysis by internal standards, the standard weight (volume) and the sample weight (before introduction of the standard) is necessary.

(3) The component list—the Relative Retention Time and the associated response factor for each component in the analysis. The time reference peak, internal standard peak are the same.

(In the calibration mode, the component concentration is entered and the response factor calculated.)

The operator then indicates at the terminal 22 the disposition of the report which may be print report and close file or to print report and save file.

In the calibration mode, data from a "standard" sample is employed to calculate detector response factors, which when applied to the areas of peaks identified as associated with the individual factors, and after corrected area normalization, produce a percent of total sample, that corresponds to the percent as blended.

Component identification in calculation of reponse factors is by relative retention time (RRT).

Component concentration in integer notation shall be entered by Teletype conversation.

Components physically not in the calibration sample, but of interest in the analysis, may be entered in the method by specifying the response factor which will be used.

After the response factors are calculated, these factors are stored for use in applying the factors in the analysis mode.

General description of the interface

The interface 14 is designed for connection to dedicated digital circuitry at the processor 18, which in turn is connected to the Input/Output Bus of a general purpose small digital computor. A 26 bit word system is disclosed herein. The choice of word length is essentially arbitrary.

The input/output signal paths of the computer disclosed herein are designated as follows:

```
GND
+5V
IODB0   ⎫
IODB1   ⎪
IODB2   ⎪
IODB3   ⎪
IODB4   ⎪
IODB5   ⎪
IODB6   ⎪
IODB7   ⎬  DATA BUS
IODB8   ⎪  (ONLY BITS 8 THRU 15
IODB9   ⎪  USED ON TTY)
IODB10  ⎪
IODB11  ⎪
IODB12  ⎪
IODB13  ⎪
IODB14  ⎪
IODB15  ⎭
IOCB5   ⎫
IOCB4   ⎬  I/O COMMAND BUS
IOCB3   ⎭
SYNC 1B    SYNC 1 BUS
SYNC 2B    SYNC 2 BUS
TTYCL      1.76 KHZ CLOCK
SKIPB      SKIP BUS
INTB       INTERRUPT BUS
RSTB       RESET BUS
SPARE
IOAB8   ⎫
IOAB9   ⎪
IOAB10  ⎪
IOAB11  ⎪
IOAB12  ⎬  DEVICE ADDRESS BUS
IOAB13  ⎪
IOAB14  ⎪
IOAB15  ⎭
+12V LP (IN)   12V LAMPS
−12V(IN)
+12V(IN)
GND
```

It will be noted that bits 0 through 15 (IODB0 through IODB15) comprise a Data Bus; and that Bits 8 through 15 (IODB8 through IODB15) only are used for the Data Terminal 22 (TTY).

Figure 6:
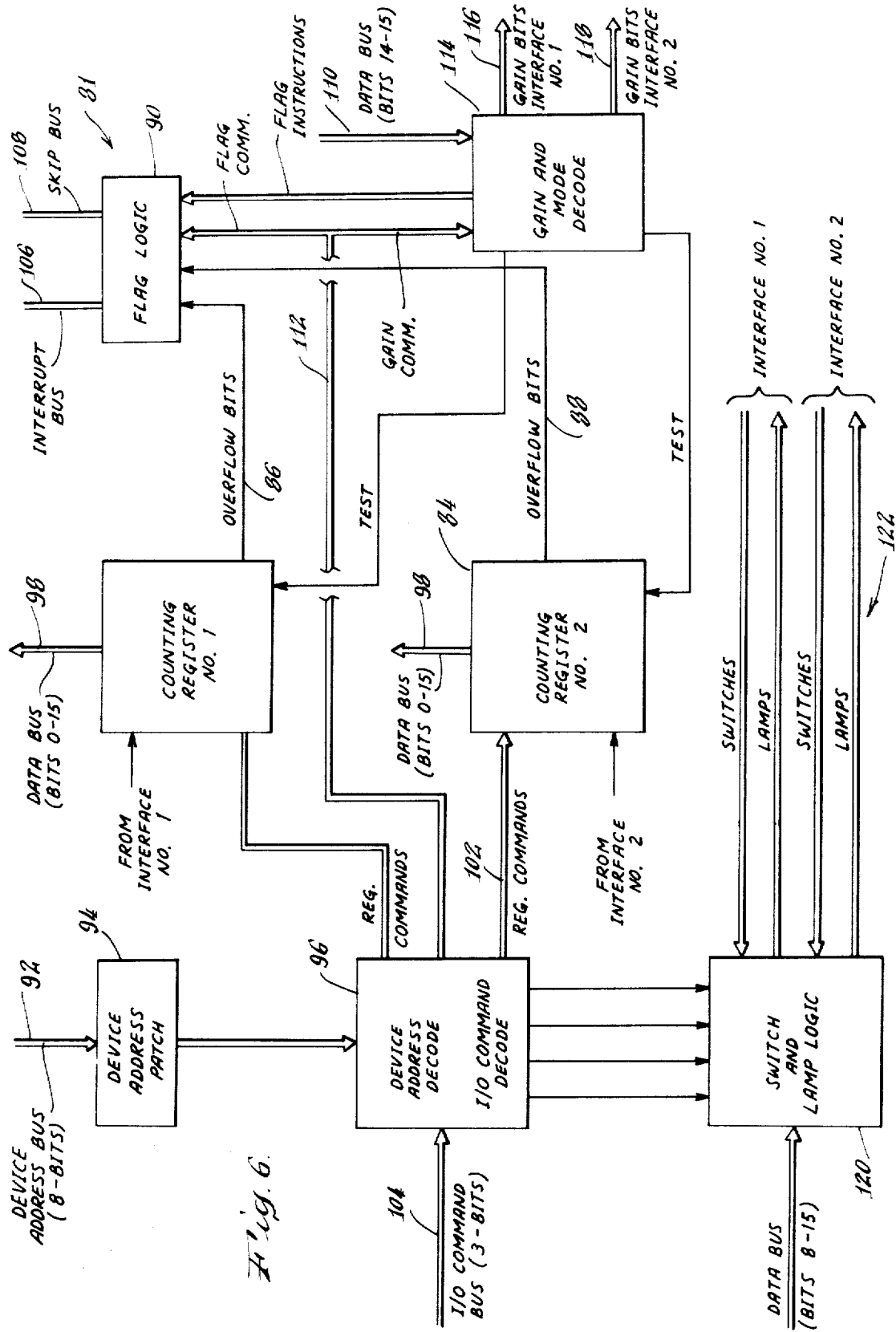
FIG. 6 is a block diagram of the dedicated digital circuitry at the processor of FIG. 1 facilitating connection to the pair of interfaces of FIG. 1.

The dedicated circuitry at the procesor comprsising one printed circuit logic card for insertion in a pair of input/output (I/O) slots 48 through 56 and for connection to one or two gas chromatographs is shown in block form in FIG. 6.

It will be noted that a pair of counting registers No. 1 and No. 2 are respectively supplied with the voltage proportional frequency pulses from the output terminals 38 of the voltage to frequency converters 36 of the interfaces 14 (FIG. 2). Thus the pulses from INTERFACE NO. 1 are supplied to COUNTING REGISTER No. 1, and the pulses from INTERFACE No. 2 are supplied to COUNTING REGISTER No. 2. These counting registers are capable of counting up to 215 pulses from their respective interfaces. When full, overflow bits are supplied upon respective overflow bits lines 86 and 88 to a flag logic unit 90. The counting registers are interrogated repetitively by the central computer by specifying their address on a DEVICE ADDRESS BUS 92. The device address is supplied by a DEVICE ADDRESS PATCH 94 to a DEVICE ADDRESS DECODE—INPUT/OUTPUT (I/O) COMMAND DECODE UNIT 96 which causes the count in the respective register 83 or 84 to be transferred to the DATA BUS 98. Register commands are sent on REGISTER COMMAND lines 100 or 102. The timing is under control of an INPUT/OUTPUT COMMAND BUS 104. If prior to normal repetitive interrogation a counting register overflows, a FLAG LOGIC unit 90 indicates such to the computer via INTERRUPT AND SKIP BUSES 106 and 108, respectively.

As will be explained in detail below, DATA BUS bits 14 through 15, as indicated at 110, together with the DEVICE ADDRESS DECODE—I/O COMMAND DECODE unit 96 via cable 112 indicate to a GAIN AND MODE DECODE UNIT 114 the gain at which a SELECTABLE GAIN AMPLIFIER 34 of the interface 14 (FIG. 2) should be operating.

It will be understood by those skilled in the art and from the detailed description below that the gain of the SELECTABLE GAIN AMPLIFIER 34 is high when low signal voltages are received from the gas chromatograph and low when large voltage signals are received, so that the full range of the VOLTAGE TO FREQUENCY CONVERTER 36 may be used over portions of a smaller range of voltage signals received from the gas chromatographs. Thus if a COUNTING REGISTER 83 or 84 is filling up too often, the gain is reduced, and if it is filling up too slowly, the gain is increased. The gain bits are signaled on GAIN BIT CONDUCTORS 116 and 118 of the common cable 16 (FIG. 1). Each interface as previously explained is provided with a plurality of switches and lamps which are controlled by the SWITCH AND LOGIC UNIT 120. Commands are provided to and from the interfaces 14 over switches and lamp conductors generally indicated at 122.

It will be further understood by those skilled in the art and from the detailed description below how the counts in the counting registers 83 and 84 and/or their indications of overflow through signals to and from the flag logic unit 90 may be utilized in the computer to derive the required signal information.

General description of the computer/processor

FIG. 7 is a block diagram of the Processor showing the R-registers, the arithmetic unit and the input/output controls. The random access core storage shown is a magnetic core unit containing, in each module, 4096 16-bit words. Data from the storage is transferred to and from the Processor through the M-register. The functioning units of the Processor are divided into two categories: Addressable & Non-Addressable. Those that are Addressable are available to the programmer through execution of one or more of the various instructions in the instruction set. All other units are Non-Addressable and are used by the processor to manipulate data and instructions but are not available to the programmer directly:

Addressable units

The R-register ($R_i$)—four, 16 bit registers used as the primary arithmetic accumulators and logic registers in the Processor. Two of the registers, $R_2$ & $R_3$, do double duty as index registers. The R-registers are addressed by means of the subscript $i$ which may be equal to 0, 1, 2, 3.

The P counter (P)—a 16-bit register (also called the program counter) that contains the location of the next program instruction to be executed.

C-register (C)—a 1-bit indicator associated with the accumulator and the adder which stores carry status resulting from the execution of arithmetic instructions and certain shift operations.

V-register (V)—a 1-bit indicator associated with the accumulators and the adder which stores overflow status resulting from the execution of arithmetic instruction and certain shift operations.

Interrupt status—a 1-bit indicator associated with the external interrupt system. If "Enabled" the processor will respond to external interruption between instructions. If "Disabled" the processor will ignore external interruption.

Input-Output bus—a bidirectional 16-bit group of lines which carries data to or from the processor and the attached peripheral I/O devices.

I/O command bus—3 lines used for I/O control.

Device address bus—8 lines used to address an I/O device.

Non-addressable units

Adder—Performs the basic arithmetic process of addition and subtraction.

M-register (M)—a 16-bit register used to transfer information to and from the magnetic core storage.

A-register (A)—a 16-bit register used to hold the address during the core memory cycle.

O-register—16-bit register used to hold the operation code during an instruction.

Details of the data formats, instruction set, addressing, interrupts, flags, timing and the like are provided below. It will be noted, however, that the architecture shown in FIG. 7 provides for multiple accumulators using two accumulators as index registers.

The convenience and adaptability of the input-output operations are an essential feature of the Processor. The ability to control and transfer data between the Processor and a wide range of peripheral devices is an important factor in the successful application of the Processor to the control of instruments. Two types of I/O transfers are provided:

The programmed data transfer.
The data break data transfer.

The programmed data transfer is characterized by the fact that for each peripheral device operation, a processor I/O instruction is required. The transfer of 16 data bits to the specified register from the peripheral device requires a "Read" instruction; the transfer of 16 data bits from the specified register to the peripheral requires a "Write" instruction. Various peripheral device status Flags are sensed and cleared by "status" instructions. Sometimes data transfer and status control are combined into one instruction for convenience. The programmed I/O technique generally results in simplified design in the peripheral device, but is limited in speed because of the software overhead required to service the attendant interrupts.

The data break transfer differs from the Programmed data transfer by the fact that the peripheral device participates in block data transfers directly to or from storage under control of the processor rather than an individual instruction for each word transferred. Generally, a starting address is given and a count identifying the block length. Data transfers to or from the peripheral occur, then, independently of the main line program once initiated; the only impact being somewhat reduced processing speed due to the unavailability of those storage cycles commandeered by the data break device. Completion of the block transfer will result in the appropriate setting of the data break device Flags and processor interruption. The data break transfer is associated with relatively high speed data transfer devices such as disk, tape or possibly a mass spectrometer front end.

Figure 8:
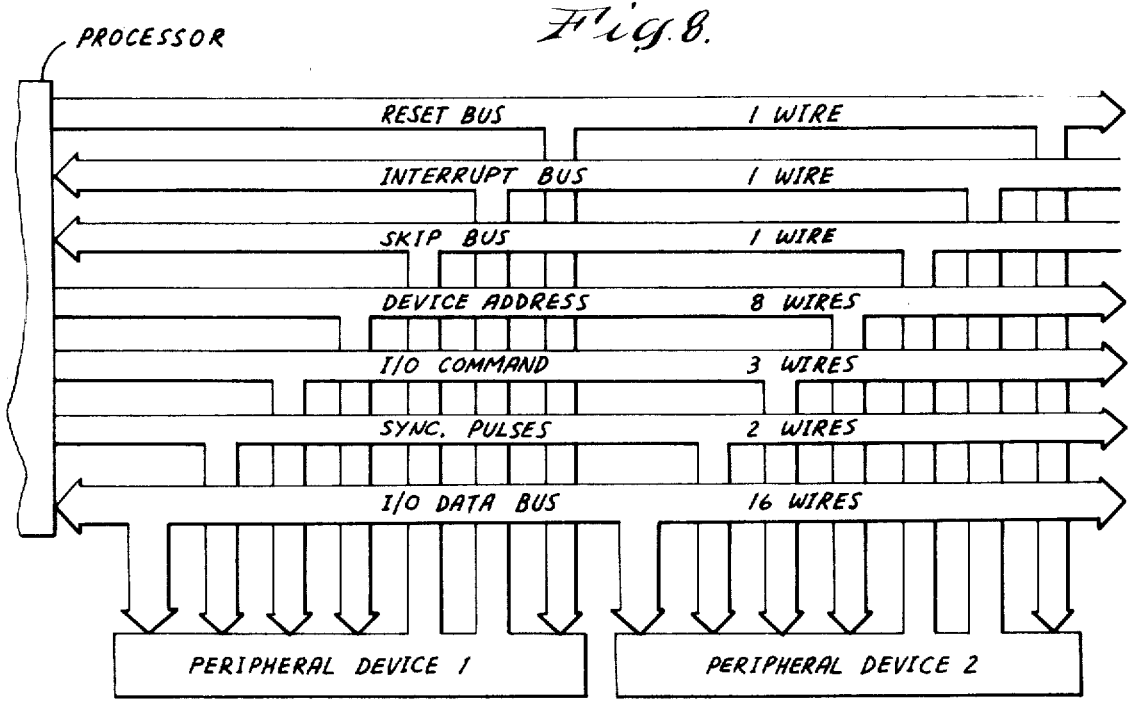
FIG. 8 is a diagram of the input output bus system of the computer-processor of FIG. 7.

The input/output bus system as seen from the Processor/Computer is shown in FIG. 8. Data and Control are transferred to and from peripheral devices by means of the input/output bus system. Because of the requirement to "wire OR" in parallel on the data busses, a logical one is negative (0 volt) on the bus and a logic zero is positive (+5 volt). The following is a breakdown of the Bus-System subsections:

| Title | Number of wires | Description and Direction |
|---|---|---|
| Device address bus | 8 | Device selection. Output only. |
| I/O data bus | 16 | Data input-output. Bidirectional. |
| I/O command | 3 | Operation to be performed by the device selected. Output only. |
| Synchronizing pulses | 2 | Carries timing information to devices. Output only. |
| Interrupt bus | 1 | An indication of device status which demands processor attention. Input only. |
| Skip bus | 1 | An indication of device status which is sampled under control of one of the test flag commands. Input only. |
| Reset | 1 | A signal from the processor causing peripheral device initialization on processor power on. Output only. |

Multiple devices are accommodated on the I/O bus system by the fact that all subsections of the bus are connected in parallel to the various devices along the length of the bus system. In this manner each of the devices is capable of sensing the state of each of the processor output wires and may, on interrupt, or under program control affect the state of the processor input wires.

Data is transferred between the processor and the peripheral device on a 16 bit, bidirectional bus. The command field (bit 3 thereof) indicates whether the Data Bus is in the transmit condition (bit 3=1) or the receive condition (bit 3=0). It should be understood that the Data Bus never goes to a physical peripheral device directly. Instead, the processor communication to the physical device occurs through an intermediate buffer register. In general, the physical device either enters data to or receives data from one or more of these registers. The timing of the transfer of data between a physical device and one of these registers is determined by the characteristics of the device and it is generally under control of the device itself. Similarly status flags, relative to transfers of both data and device condition between the physical device and the peripheral accessory, are set under device control. On the other hand, transfers between the processor and the peripheral accessory buffer register are under control of the processor by means of the I/O commands and the device select mechanism. Similarly, synchronization of the transfers between the device buffer registers and the processor as well as the interrogation and clearing of flags by the processor is accomplished by the use of the Sync 1 and Sync 2 pulses.

Figure 9:
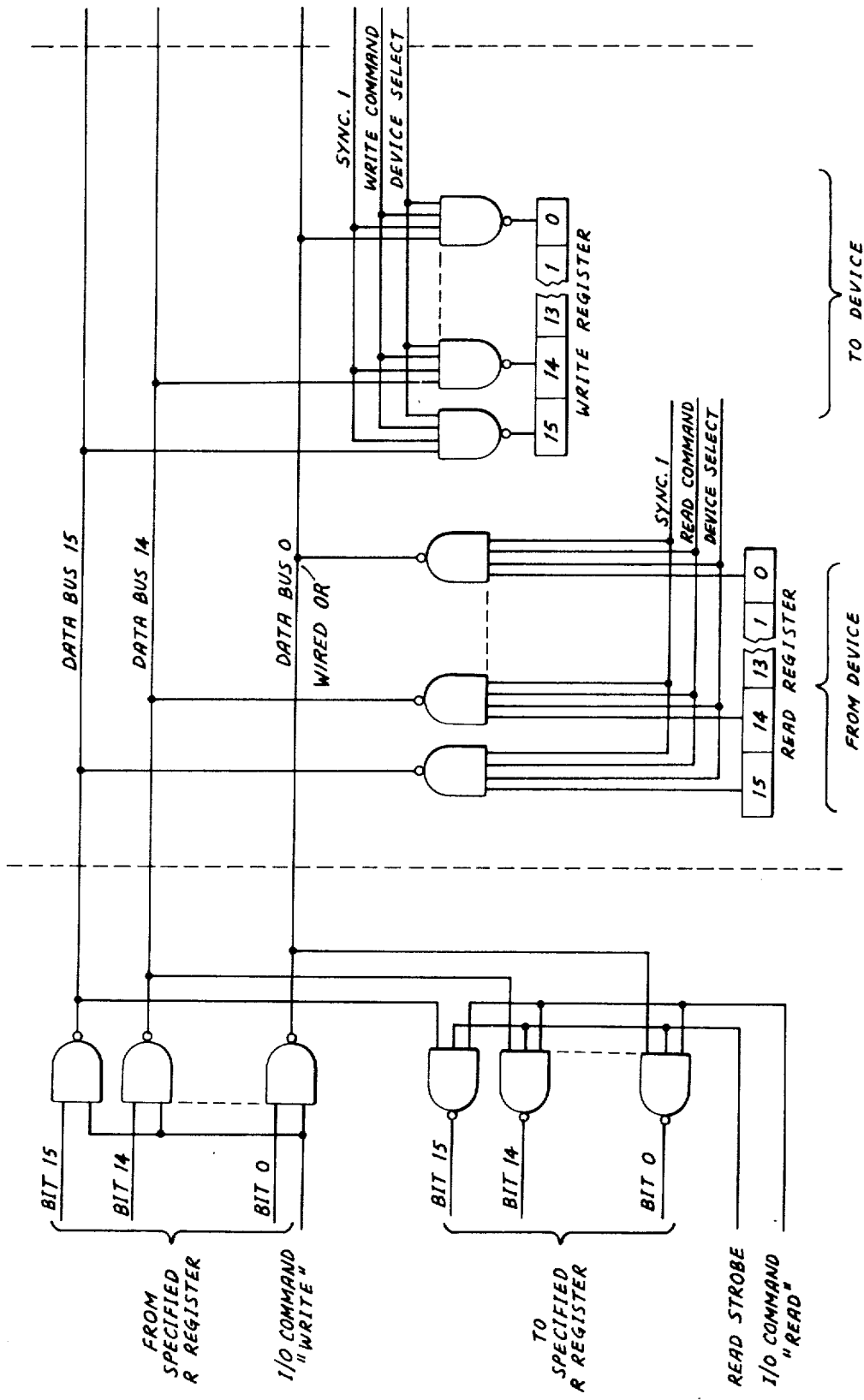
FIG. 9 is a logic block diagram of a typical connection between a device read register, a device write register, and the computer-processor of FIG. 7.

FIG. 9 shows a typical connection between a device Read Register, a device Write Register and the processor. Note that each bit of the "Wired OR" bus may be set by gates from the read register. Other read registers associated with other devices will share this bus as well.

Data from the processor to the device may be set into the Write Register under program control.

The status flags and buffer register then serves as an intermediary between the processor I/O interface and the particular physical device with which it is associated. In general, the peripheral device design is charged with appropriate conversion of device related input/output conditions and timing into Processor compatible form.

General description of the programs provided

One program of the invention entitled "Automatic Sensitivity Settings for Peak Detecting Systems" is a technique of replacing the manual setting of sensitivity and other control criteria used to reject noise and unwanted phenomena on a signal from any mechanized device which is used to detect the presence of peaks within the spectral output of analytical instruments by using the same device to estimate these criteria prior to the actual analysis.

Heretofore the operator was required to preset the device in order that it adequately distinguish the real signal from noise. This program exploits the fact that the unwanted signal is present on the instrument output signal prior to the analysis when the intelligence signal is not present. Therefore, the same device, by setting its sensitivities appropriately low, can employ its peak detection technique to purposely detect the noise portion of the signal as false peaks and thereby adjust its sensitivities according to the characteristics of the detected peaks. The procedure carried out by the system of the invention employing this technique is as follows:

Upon command from the user prior to the actual analysis, the device commences a test, of fixed duration, which conducts a search for peaks with its initial device sensitivity setting low; the device is, therefore, highly susceptible to noise. If the ambient noise on the instrument is sufficient to perturb the device analysis, this perturbance is manifest by the device falsely detecting the presence of peaks. As best fits the characteristic of the sensitivity setting, a choice of two remedial actions is taken:

(1) An incremental search technique is performed which upgrades the sensitivity value and recycles the test. This results in a final setting, sufficient to reject the ambient noise.

(2) A computed setting of the setting may be obtained by employing a possible quantitative relationship between the sensitivity setting and one of the device-computed parameters such as the accumulation of the signal first derivative during the test period or the amplitude or frequency of the falsely detected peaks.

Figure 10:
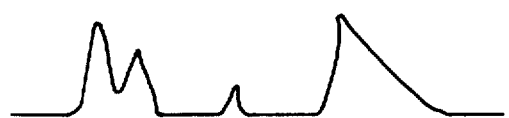
FIG. 10 is a trace of typical time varying analog voltage signal produced by an analytical instrument.

Another program of the invention, entitled "A Method of Peak Detection on Medium Speed Instrument Spectra," is a method of automatically reducing the raw output of a certain class of analytical instrumentation to its primary unit of information. The class of instrumentation to which this method may be applied is that in which the instrument transforms some physical phenonema or reaction to a time varying voltage signal. The time trace of this signal (see FIG. 10) is characterized by segments of constant voltage (called baseline) and segments of dynamic signal change (called peaks) of which the amplitude can be as small as five microvolts and as great as ten volts and the duration can vary from one-half second to twenty minutes. The primary information to be derived from this trace is the time of occurrence of each peak and either its area or height. This invention is a formalized notion of observing this signal for the purpose of obtaining the primary information. Its selective advantages over currently used techniques are:

(1) The derivation of primary data is concurrent with signal change, thus eliminating the requirement of maintaining a historical storage of the trace.

(2) The algorithm obtains primary data accurately and repeatedly for any form of signal topology without requiring detailed information (for example, knob settings) from the user for the purpose of revealing the characteristics of the signal trace.

(3) The algorithm operates reliably in environments in which electrical noise and other unwanted signal variations are mixed with the information signal; the elements of its design have been with the objective of differentiating the true information from the unwanted signal. This advantage is manifest in the sensitivity of the algorithm to peaks with amplitudes as low as ten microvolts.

The exploration of this invention is not necessarily restricted to a particular instrument, for example, a gas chromatograph; it may be employed with any instrument that exhibits the aforementioned characteristics. Nor is its physical manifestation restricted to a single form of mechanization; that form may be a "hybrid" electric analog-digital computer, a "hard wired" digital system or a stored program digital computer system.

This invention provides (1) The replacement of the signal first derivative (slope) function by the time integral of the signal behavior as the primary indicator of the occurrence of a peak start, crest, or end.

(2) The automatic adjustment of the observation parameters (such as digital sampling rate and thresholds) as a function of the analysis time and the observed topology so far.

(3) The continuous observation of the signal for those characteristics which exhibit a baseline-like behavior concurrently and therefore, competitively with the detection of "on-peak" conditions. This feature permits the provisional acceptance of a signal movement as a demonstration of a peak until it is superseded by the "on base-line" decision.

The overall goal of this algorithm is the detection of prime data points of the signal topology, peak start, crest and end, either in fusion with another peak or upon baseline. Because of noise or non-peak signal drift, the marking of a peak start when the signal derivative goes positive, peak crest when the signal derivative goes negative, etc., is inadequate. To be effective the algorithm must efficiently reject unwanted phenomena and yet be sufficiently sensitive to signal changes which could manifest either an extremely fast or a very slow, low amplitude peak. To eliminate fast noise, the signal is subjected to a smoothing operation, in particular a digital least-squares smoothing; however, a moving average or an electrical symmetrical filter are also effective. Based upon the smoothed signal data, the algorithm maintains the following functional variables: (1) running minimum, (2) running maximum, (3) up integral (4) down integral. The running maximum/minimum are the local maximum and minimum values of the signal. The up integral represents the cumulative trend of a rising signal since the signal had last departed from the running minimum and has the following qualities: it is simply the time integral of the difference between the signal and the running minimum while the signal is rising; it accumulates less when the signal begins to decrease; it progressively reduces as the decreasing signal falls below the midpoint between the running maximum and minimum; it is clamped to zero if it would otherwise be negative, the signal falls below the current minimum or the algorithm determines that the signal topology is not in the vicinity of a prime data point. The down integral represents the cumulative trend of a falling signal since it last departed from the local maximum and has the following qualities: it is simply the time integral of the difference between the running maximum and the signal while the signal is decreasing; it accumulates less as the signal begins to increase; it progressively reduces as the increasing signal rises above the midpoint if it otherwise would be less than zero, the signal rises above the running maximum, or the algorithm determines that the signal topology is not in the vicinity of a prime data point.

A formalized statement of the behavior of these four parameters is as follows:

let
$i$ = sample interval $i$
$s_i$ = value of smoothed signal at interval $i$
$X_i$ = running maximum at interval $i$
$M_i$ = running minimum at interval $i$
$U_i$ = up integral at interval $i$
$D_i$ = down integral at interval $i$
then
$X_i = S_i$ if $S_i > X_{i-1}$
$\quad = X_{i-1}$ if $S_i \leq X_{i-1}$
$\quad = S_i$ if set by the algorithm
$M_i = S_i$ if $S_i < M_{i-1}$
$\quad = M_{i-1}$ if $S_i \geq M_{i-1}$
$\quad = S_i$ if set by the algorithm $\Delta U_i = S_i - M_{i-1}$ if $S_i > X_{i-1}$
$= (S_i - M_{i-1}) - (X_{i-1} - S_i)$ if $M_{i-1} \leq S_i \leq X_{i-1}$
$= 0$ if $S_i < M_{i-1}$ $\Delta D_i = X_{i-1} - S_i$ if $S_i < M_{i-1}$
$= (X_{i-1} - S_i) - (S_i - M_{i-1})$ if $X_{i-1} \geq S_i \geq M_{i-1}$
$= 0$ if $S_i \geq X_i$ $U_i = U_{i-1} + \Delta U_i$ if $U_{i-1} + U_i > 0$ and $S_i \geq M_i$
$= 0$ if $U_{i-1} + \Delta U_i \leq 0$ or $S_i < M_i$
$= 0$ if cleared by the algorithm $D_i = D_{i-1} + \Delta D_i$ if $D_{i-1} + \Delta D_i > 0$ and $S_i \leq X_i$
$= 0$ if $D_{i-1} + \Delta D_i \leq 0$ or $S_i > X_i$
$= 0$ if cleared by the algorithm The algorithm is operational in one of several states, each of which determine its interpretation and treatment of the four functional variables. These states are "tracking baseline," "tracking forward side of a peak," "tracking reverse side of a peak." In each state the algorithm is searching for an initial indication of a prime data point (peak start, crest, or end) which may ultimately cause a transition into a new state. If from sample to sample it fails to perceive the primary indicators, it clears the integrals and clamps the running maximum and minimum to the current signal value. In this way the functional variables reflect only the signal behavior in the vicinity of a suspected prime topological point.

While tracking baseline the initial indicator is when the smooth signal surpasses the running minimum. Thus, the up integral is allowed to accumulate and will continue to do so on a steadily rising signal until a predetermined threshold is surpassed at which point the algorithm transits to the tracking "forward side of peak state" and marks the peak as starting from the initial point it detected a positive signal trend. If, however, noise causes secondary fluctuations of the signal, the up integral accumulation will be slowed, reduced or even forced to zero according to the severity of the noise. The down integral in this case acts as a counter integral; if it, as described in the preceding paragraph, accumulates to the threshold value before the up integral, the algorithm disqualifies the potential peak start.

Similarly, while tracking the forward side of a peak, an initial indicator of a possible peak crest is when the smooth signal falls short of the running maximum. The down integral accumulates and continues to do so until the predetermined threshold is surpassed, if the signal continues its decreasing trend. At that point the algorithm transits to the "tracking reverse side of peak" state. If, however, noise causes secondary fluctuations of the signal, the down integral accumulation will be slowed, reduced or even driven to zero according to the severity of the noise. The up integral acts as a counter integral; if it accumulates to the threshold value before the down integral, the algorithm disqualifies the potential peak crest.

While tracking the reverse slope of a peak, the initial indicator of the end of the current peak and the start of another peak is when the smoothed signal commences to rise above the running minimum. The decision process of qualifying this prime data point by observation of the up integral and its counter, the down integral is the same as that employed in qualifying a peak start while tracking baseline.

Figure 11:
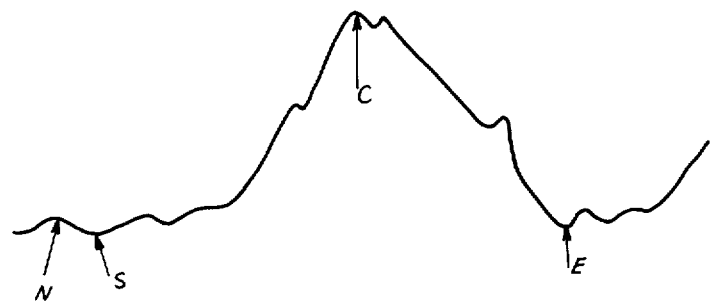
FIG. 11 is a trace of a typical signal produced by a gas chromatograph.
Figure 12:
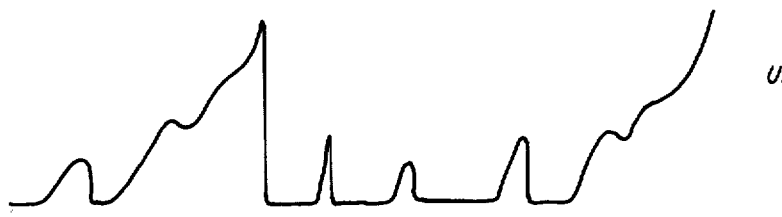
FIG. 12 is a trace of the up integral of the signal of FIG. 11 as provided by the present invention.
Figure 13:
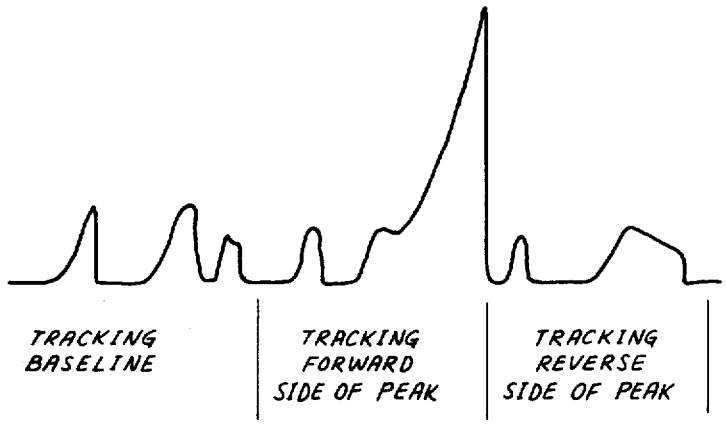
FIG. 13 is a trace of the down integral of the signal of FIG. 11 as provided by the invention.

FIGS. 11–13 demonstrate the activity of this algorithm in the process of detecting the prime topological points of a small peak in the presence of significant noise. Note that the small perturbance N is rejected but the algorithm is not impeded in detecting points S, C and E as the true points of peak start, crest and end.

Concurrent with the peak detection scheme described above is a continuous test for the signal characteristics which demonstrate that the signal is tracking baseline. In this test a function of the signal first derivative is used, but unlike its use in other disclosed techniques, this function is employed as an observed variable solely to confirm the presence of baseline by its failure to demonstrate non linear signal characteristics over an extended period of time. The test for baseline has precedence over the peak detection scheme; that is, if the test confirms the presence of baseline, the algorithm returns to the "tracking baseline" state. If at the moment the algorithm was tracking baseline but qualifying a potential peak start, that point is disqualified. If the algorithm was tracking the forward side of a peak, the peak is cancelled since it should be considered as an upward drifting baseline. If the algorithm was tracking the reverse side of a peak, the end of that peak is forced.

These exists several methods of evaluating signal linearity as a criterion of baseline test; what is the key to this invention is not how it is evaluated but rather that baseline test be concurrent with the counter integral peak detection scheme described above and that it should have precedence over it.

The linearity evaluation scheme used in the mechanization of this invention is as follows:

A smoothed function of the signal first derivative is obtained by use of at least squares digital smoothing technique. The evaluation of the smoothed function is set as the reference derivative. Then a time integral of the difference between the current function and the reference derivative is maintained for a prescribed interval; if at any time during this interval, the integral exceeds a prescribed threshold value, the evaluation recycles; otherwise, the integral is cleared at the end of the interval but the integration process proceeds for another interval; if this process continues for a prescribed period of time without an evaluation recycle, the decision that the signal is tracking baseline is made.

The surpassing of the threshold value by the integral can be because the signal first derivative is dynamically changing (i.e., displaying non-linear characteristics) or because the noise on the system is momentarily severe. In the latter condition, however, the process of intergrating the difference between the current and reference derivatives provides an effective noise rejecting filter. Note, however, that linearly drifting baseline is evaluated as a baseline.

The linearity evaluation scheme used in the mechanization of this invention is as follows:

The evaluation is divided into cycles, each of which consists of a prescribed number of intervals of fixed duration. The difference between the smoothed signal at the beginning and end of each interval is compared with the difference of the previous interval. If the difference between the differences exceeds a prescribed threshold value, the evaluation recycles. If the cycle runs to completion without recycling the decision that the signal is tracking, baseline is made.

The evaluation recycling can be prompted either by a dynamically changing signal first derivative (i.e., one displaying non-linear characteristics) or by severe noise. In the case of the latter, it can be shown that a threshold value statistically sufficient to reject the confounding properties of noise is one which is equal to the square root of two times, the root mean square of the ambient noise upon the signal. Due to the test interval, the change in signal level resulting from its real movement exceeds the level of noise upon the signal.

SPECIFIC DESCRIPTION

More specifically, the various components of the system are organized as follows:

Specific description of the Computer/Processor

Referring to FIG. 7:

DATA FORMATS

Figure 14:
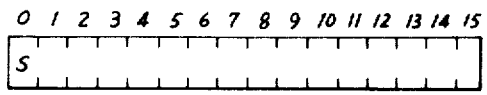
FIG. 14 is the format used by the computer-processor of FIG. 7 for single precision.

Single precision.—The format for single precision is shown in FIG. 14. The 16-bit arithmetic data is represented in 2's complement form. Bit 0, the high order bit of a data word, may be considered the arithmetic sign and is a zero if the data is positive, one if the data is negative.

Figure 15:
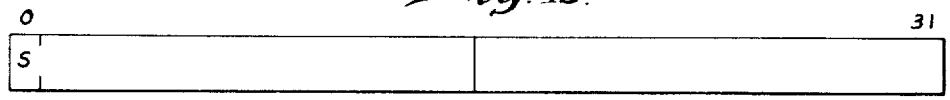
FIG. 15 is the format used by the computer-processor of FIG. 7 for double precision.

Double precision.—When greater precision is required than that obtainable using the single precision format, double precision is used. The sign of the word is given by bit 0 of the high order word, and 31 bits of significant magnitude are available. See FIG. 15.

Logic data.—Logical data such as status or other binary indicators may be stored in a single data word. This type of data is generally not treated arithmetically by the program but logically by means of Boolean operators such as "AND," or "OR," "EXCLUSIVE OR," as well as logical shifts. In these case bit 0 of a word does not represent the sign but simply a logical state. See FIG. 16.

Instruction words.—Instruction words are divided into five types:

- Storage Reference
- Immediate
- Register-Register
- Status
- Input-Output

BASIC STATUS

Instruction sequence.—Programs are executed sequentially, with the contents of the program counter being incremented by 1 upon the execution of each instruction. The program counter is normally pointing to the next sequential instruction from the one being processed. Compare and skip may conditionally increment the program counter thereby causing the next sequential instruction to be omitted. The instruction sequence may be broken by the jump instruction, which loads the P counter with the effective address of the next instruction.

Breaks.—Certain operations may occur between instructions or cycles of an instruction without affecting the contents of the program counter. These actions are called "breaks" and include such operations as storage cycle stealing by high speed I/O.

Interrupts.—An interrupt is different from a break and may occur independently of the operation of the Processor. However, interrupts are only acknowledged between instructions. Interrupts will not be acknowledged during indirect addressing cycles within an instruction.

A program interrupt causes the interrupt status to be disabled and an automatic jump to subroutine in location 0; that is, the Program Counter (P), which contains the next sequential instruction after the point of interruption is stored in location 0, and the program resumes operation in location 1. The interrupt recovery which caused the interrupt to occur, remove the interrupt condition, and return to the main line program.

The interrupt system may be "Disabled" by the Ioff instruction and "Enabled" by the Ion instruction. Three instructions, the Interrupt Status On, Jump of Subroutine and Jump, will inhibit testing the Interrupt condition following their execution even if the Interrupt status is enabled; therefore, an interrupt will never follow directly after a Jump instruction, but will follow after completion of the instruction following the Jump unless it too is a Jump, Jump to Subroutine or Interrupt Status On instruction. Individual devices may have their interrupt capability inhibited by appropriate I/O command logic in the Device Adapter.

STORAGE REFERENCE INSTRUCTIONS

Figure 17:
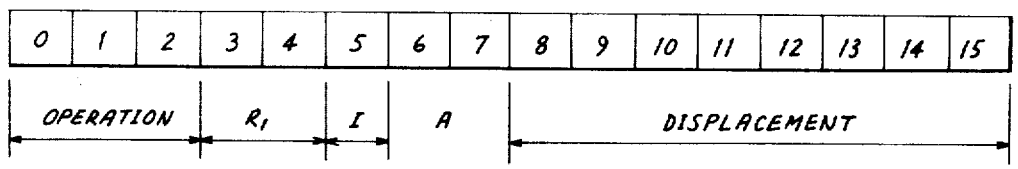
FIG. 17 illustrates the format for the storage reference instructions which refer to the R-registers used in the computer-processor of FIG. 7.

These instructions have in common the calculation of an effective address by means of which the storage unit is referenced. The format for the storage reference instructions which refer to the R-registers is shown in FIG. 17; those which do not are shown in FIG. 18. The operations are listed in FIG. 19 and described in detail in the subsequent specification sheets. Common to all storage reference instructions are the address control fields; the A field, and the I field and the displacement portion of the Storage Reference instruction word. Proper interpretation of these fields is required for the processing of an effective address, a description of which follows. FIG. 20 shows all the operation including I/O, the Immediates and the storage reference instructions as they are distinguished by operation code bit 0–4.

EFFECTIVE ADDRESS

The effective address is the computed address which is used to reference storage. For instructions such as load, store or add the content of the storage location specified by the effective address becomes the storage reference operand of that instruction. For the instruction Jump, the effective address becomes the operand which replaces the old content of the Program Counter. It is left to the normal instruction fetch sequence to fetch the content of this effective address prior to execution of the subsequent program step.

The A field, together with I field controls the computation of the effective address. When A=0, the displacement portion of the instruction specifies a particular location in page zero of the storage indicated by the octal representation of the displacement range $000000_8$–$000377_8$ ($2^8$ or 256 words). FIG. 21 shows the page breakdown of the 4096 word storage unit. If A=01, the displacement portion of the instruction is concatenated to the page address portion of the program counter. Bits 0–7 of the Program Counter (P), then, contain the "current page" address.

For example, assume an ADD intruction having an address of 144 is in location page 4, word 100 octal. If the A field in the instruction is not 01, the instruction references word 144 in page 0. If the A field is 01 then the instruction references word 144 in page 4, because the instruction itself is in page 4. See FIG. 22.

Because 4K storage may be addressed with 12 bits of address an 8K with 13 bits, references to storage by either the program counter (P) or the effective address register (A) will interrogate the state of those bits of either register which are required to reference the particular storage capacity available. If storage is referenced by a program beyond the physical capacity of the particular system, no storage unit will be selected; therefore, a memory write will result in loss of data and memory read will result in an apparent data word of all zero. The basic processor will be designed to handle either 4K or 8K core by means of released options. Other storage capacities will be considered on an "as required" basis.

INDEXING

Indexing proceeds under control of the A field. If I=0, Direct Addressing is specified, When A=2 or A=3, indexing by either $R_2$ or $R_3$, respectively, is called for. In this case, the content of the specified index register is added to the value of the displacement. The result is an effective address which specifies the operand of the particular instruction.

If I=1, Indirect addressing is specified. Again, if A=2 or A=3 indexing by either $R_2$ or $R_3$ respectively, is called for. In this case, the Index computation precedes the indirect process which is described in the next section. The address computed is the initial address used at the start of the indirect process.

In all cases again, the high order bits of either the initial, the current, or the final effective address which are not required for storage addressing are ignored in the storage reference. Of course, B field information (see FIG. 23) is used to control the indirect process but is truncated along with other high order bits of the address during the storage reference.

INDIRECT ADDRESSING

If Field I of a storage reference instruction is set to 1, indirect addressing takes place. In this case, the initial address is computed under the rules given above under control of the A field. However, instead of this being the address of the storage location from which the contents are fetched or to which a Jump is made, it is the storage location whose content contains the address to which the instruction actually refers. The content of the initial address, then, becomes itself an address which points to the operand in question. Calling for an indirect address (I=1), therefore, will cause at least one extra storage reference to be made in order to process the instruction.

MULTILEVEL INDIRECT ADDRESSING

It will be noted above that the control and interpretation of the effective address computation process is under control of the instruction specified parameters: The A, I and displacement. Multilevel indirect may be accomplished by the proper specification of the B field portion of the content of the initial address location which is referenced indirectly as described above. FIG. 23 shows the format of the content of this location and the meaning of the 2 B field states.

B=0 the indirect process is complete. The content of the current address contains the final address.

B=1 the indirect process is not complete and is multilevel. The content of the current address contains another address but not yet the final address.

DESCRIPTION OF EACH STORAGE REFERENCE INSTRUCTION

Operation load (mnemonic L)

The content of the specified R-register ($R_1$) is replaced by the content of the effective address. The content of the effective address, C & V remain the same.

Operation store (mnemonic ST)

The content of the effective address is replaced by the content of the specified R-register (R). The content of the specified R-register ($R_1$), C & V remain the same.

Operation add (mnemonic A)

The content of the effective address is added to the content of the specified R-register ($R_1$) in two's complement arithmetic. The sum replaces the content of the specified R-register ($R_1$). The content of the effective address remains the same. All sixteen bits of both operands participate in the addition. If a carry occurs out of the sign-bit position (0) of the adder, the carry register (C) is set to one, otherwise the carry (C) is set to zero. If carries out of the sign-bit position (0) and the high-order numeric bit position (1) disagree, an overflow occurs and the V bit is set to one, otherwise, the V bit is set to zero. Overflow is accompanied by a sign change.

Operation subtract (mnemonic S)

The content of the effective address is subtracted from the content of the specified R-register ($R_1$) in two's complement arithmetic. The difference replaces the content of the specified R-register ($R_1$). The content of the effective address remains the same. All sixteen bits of both operands participate in subtraction. The subtraction is accomplished by adding the two's complement of the content of the effective address to the content of the specified R-register. If a carry occurs out of the sign-bit position (0) of the adder the carry register (C) is set to one, otherwise the carry (C) is set to zero. If carries out of the sign-bit position (0) and the high order numeric bit position (1) disagree, an overflow occurs and the V bit is set to one, otherwise, the V bit is set to zero. Overflow is accompanied by a sign change.

Operation compare and skip if equal (mnemonic CSE)

The content of the effective address is subtracted from the content of the specified R-register ($R_1$) is two's complement arithmetic. If the difference is equal to zero, the content of the program counter (P) is incremented by 1 and the next sequential instruction is thereby skipped. If the difference is not equal to zero, the program counter (P) is not incremented and thus the program proceeds to the next sequential instruction. Neither the content of the specified R-register ($R_1$) nor the carry (C) nor (V) is changed by this instruction.

Operation load multiple (mnemonic LM)

The content of R-register 0 ($R_0$) is replaced by the content of the effective address. The storage address is then incremented by 1 and the content of the new effective address replaces the content of register $R_1$. The process continues sequentially for $R_2$ and $R_3$. Finally the carry (C) and the overflow (V) are replaced by bits 0 and 1 respectively of the content of the last effective address in the sequence. The content of the five storage locations are left unchanged.

Operation store multiple (mnemonic STM)

The content of the effective address is replaced by the content of register $R_0$. The storage address is incremented by 1 and the content of register $R_1$ replaces the new effective address. The operation continues sequentially through $R_2$ and $R_3$. Finally, the carry (C) and the overflow (V) replace bits 0 and 1 respectively of the content of the final effective address. Bits 2 through 15 of the content of the final effective address are set to zero. The contents of the four R-registers, the carry and overflow are left unchanged.

Operation: Increment and skip if zero (mnemonic ISZ)

The content of the effective address is incremented by 1 and the resultant value replaces the original value in the location specified by the effective address. If the resultant value of the content of the effective address equals 0, the content of the program counter (P) is incremented by 1 and the next sequential instruction is thereby skipped. If after incrementation the resultant value of the content of the effective address does not equal 0, the program counter (P) is not incremented, and thus the program proceeds to the next sequential instruction. The contents of the 4 R-registers and the carry register and the overflow are not changed by this instruction.

Operation jump (mnemonic J)

The effective address replaces the content of the program counter (P). The next instruction is fetched from the location specified by the program counter. The R-registers, the carry (C) and the overflow (V) remain unchanged. Testing an interrupt condition following the Jump operation is suppressed even if the Interrupt Status is enabled; therefore, an interrupt will never follow directly after a Jump instruction, but will follow after completion of the instruction following the Jump unless it too is a Jump, Jump to Subroutine or Interrupt Status On instruction.

Operation: jump to subroutine (mnemonic JS)

The value of the content of the program counter, which has been incremented, replaces the content of the effective address. Thus, the effective address contains the address of the next sequential instruction after JS. Then the effective address is incremented by one and replaces the content of the program counter (P). The next instruction is then fetched from the location specified by the program counter. The R-registers, the carry (C) and the overflow (V) remain unchanged. Testing an interrupt condition following the Jump to Subroutine operation is suppressed even if the Interrupt Status is enabled; therefore, an interrupt will never follow directly after a Jump to Subroutine instruction, but will follow after completion of the instruction following the Jump to Subroutine unless it too is a Jump, Jump to Subroutine or Interrupt Status On instruction.

IMMEDIATE INSTRUCTIONS

The format of the immediate instructions is shown in FIG. 24. Bit 5 specifies whether the operation is load or compare. Bits 6 and 7 specifiy the destination register $R_1D$. These operations are distinguished from the storage reference operations by the fact that the eight low order bits of the instruction are an immediate operand rather than displacement. The immediate operand, then, comes directly from the instruction stream. It is converted to a 16-bit operand by extending the high order portion by eight zero bits.

Operation immediate load (mnemonic IL)

Bits 8 through 15 of the content of the specified R-register ($R_1$) are replaced by bits 8 through 15 of the instruction, the immediate operand. Bits 0 through 7 of the content of $R_1$ are set to zero. The carry (C) and the overflow (V) are left unchanged.

Operation immediate compare & skip if equal (mnemonic ICSE)

Bits 7 through 15 of the instruction are extended by eight high order zeros to form a 16 bit operand. This operand is subtracted from the content of the specific R-register ($R_1$) in two's complement arithmetic. If the difference is equal to zero, the content of the program counter (P) is incremented by 1 and next sequential instruction is thereby skipped. If the difference is not equal to zero, the program counter (P) is not incremented and thus the program proceeds to the next sequential instruction. Neither the content of the specified R-register ($R_1$) nor the carry (C) nor (V) is changed by this instruction.

REGISTER INSTRUCTIONS

These instructions are identified by the fact that bits 0-3 of the instruction word equal one. The format for the arithmetic operations is shown in FIG. 25 and for the shift operations in FIG. 26. Bits 4-8 of the instruction identify the various operation codes which are listed in FIG. 27. The types of operations which may be specified are either inter-register operation or shift operations. In the case of the inter-register operations, both a source and a destination register are specified. Unless the source register and the destination registers are the same, the source register is unchanged by the specified operation and the destination register contains the result of the specified operation. If the source and destination register are the same register, then the source register is changed and contains the result of the operation. All shift type operations fall into the latter category because only one register for both source and destination is specified. For both register and shift operations the M field is a skip modifier field and is applied to the result of the particular operation being specified by the operation code portion of the instruction. M field interpretation is listed in FIG. 26 and described below.

M=0.—The operation specified by the code is performed; no skip is taken.

M=1.—The operation specified by the code is performed. If the result is equal to zero the value if the Program Counter (P) is incremented and the next sequential instruction is skipped; if the result is not equal to zero the value in (P) remains unchanged.

M=2.—The operation specified by the code is performed. If bit 0, the sign of the result, is zero (+), the value in the Program Counter (P) is incremented and the next sequential instruction is skipped; if bit (0) is one (−) the value in (P) remains unchanged.

M=3.—The operation specified by the code is performed. If the carry (C) is equal to one after the operation is complete, the value in the program counter (P) is incremented and the next sequential instruction is skipped. If the carry (C) is equal to zero the value in (P) remains unchanged. If the specified instruction does not change the carry (C) the skip modified refers to the value of the carry (C) as it was prior to the instruction.

M=4.—The operation specified by the code is performed. If the overflow (V) is equal to zero after the operation is complete, the value in the Program Counter (P) is incremented and the next sequential instruction is skipped. If the overflow (V) is equal to one the value in (P) remains unchanged. If the specified instruction does not change the overflow (V), the skip modifier refers to the value of the overflow (V) as it was prior to the instruction.

M=5.—The operation specified by the code is performed. If the result is not equal to zero the value in the Program Counter (P) is incremented and the next sequential instruction is skipped. If the result is equal to zero the value in (P) remains unchanged.

M=6.—The operation specified by the code is performed. If bit (0), the sign of the result, is one (−) the value of the Program Counter (P) is incremented and the next sequential instruction is skipped; if bit (0) is zero (+) the value in (P) remains unchanged.

M=7.—The operation specified by the code is performed. If the carry (C) is equal to zero after the operation is complete the value in the Program Counter (P) is incremented and the next sequential instruction is skipped. If the carry (C) is equal to one, the value in (P) remains unchanged. If the specified instruction does not change the carry (C), the skip modifier refers to the value of the carry (C) as it was prior to the instruction.

Control of the M field is accomplished by the skip mnemonics. They are:

| M-value | Mnemonics |
|---|---|
| 0 | (No skip). |
| 1 | SZ—Skip if zero. |
| 2 | SZP—Skip if zero or plus. |
| 3 | SC—Skip if carry (C=1). |
| 4 | SNV—Skip if not overflow (V=0). |
| 5 | SNZ—Skip if not zero. |
| 6 | SM—Skip if minus. |
| 7 | SNC—Skip if not carry (C=0). |

SHIFT OPERATIONS

Shift operations are distinguished from the other inter-register operations by the interpretation of the $R_1$ field and number field (N). For shift type operations the specified N field contains the shift count, the content of the $R_1$ field is the operand to be shifted, and when the operation is complete, the final shifted result. Shifting will be accomplished under control of the various shift commands. When the shift is complete, the specified register ($R_1$) will contain the shifted operand, the carry (C) and the overflow (V) will be set according to the definition of the instruction. Shifts of one, two, four, or eight may be specified directly with (N).

The M field skip control refers to the status of the various indicators at the completion of the shift command.

Operation move register (mnemonic MVR)

The content of the source register ($R_1S$) replaces the content of the destination register ($R_1D$). The content of the carry (C) and overflow (V) remain unchanged.

Note: The specification ($R_1S$) may be set equal to ($R_1D$). This is, in effect, a "No OP." However, the skip mnemonic may be applied to the specified operand.

Operation add register (mnemonic AR)

The content of the source register ($R_1S$) is added to the content of the destination register ($R_1D$). The sum replaces the content of the destination register ($R_1D$). All 16 bits of both operands participate in the addition. If a carry occurs out of the sign-bit position (0) of the adder, the carry (C) register is set to (1) othewise the carry (C) is set to (0). If carries out of the sign-bit position (0) and the high order numeric bit position (1) disagree, an overflow occurs and the V bit is set to one, otherwise the V bit is set to zero. Overflow is accompanied by a sign change.

Operation add with carry register (mnemonic ACR)

The content of the source register ($R_1S$) is added to the content of the destination register ($R_1D$). The sum replaces the content of the destination register ($R_1D$). All 16 bits of both operands participtate in the addition, as well as the initial value of the carry (C) which is introduced into the low order adder position 15 as an input carry. If a carry occurs out of the sign-bit position (0), the carry (C) register is set to one, otherwise the carry (C) is set to zero. If carries out of the sign-bit position (0) and the high order numeric bit position (1) disagree, an overflow occurs and the V bit is set to one, otherwise, the V bit is set to zero. Overflow is accompanied by a sign change.

Operation subtract register (mnemonic SR)

The content of the source register ($R_iS$) is substracted from the content of the destination register ($R_iD$). The difference replaces the content of the destination register ($R_iD$). All 16 bits of both operands participate in the subtraction. The subtraction is accomplished by adding the two's complement of the content of the source register ($R_iS$) to the content of the destination register ($R_iD$). If a carry occurs out of the sign-bit position (0) the adder, the carry (C) is set to one, otherwise, the carry (C) is set to (0). If carries out of the sign-bit position (0) and the high order numeric bit position (1) disagree, an overflow occurs and the V bit is set to one, otherwise, the V bit is set to zero. Overflow is accompanied by a sign change.

Operation subtract with carry register (mnemonic SCR)

The content of the source register ($R_iS$) is subtracted from the content of the destination register ($R_iD$) and the difference replaces the content of the destination register ($R_iD$). All 16 bits of both operands participate in the subtract, as well as the initial value of the carry (C) which is introduced into the low order adder position 15 as an input carry. The subtraction is accomplished by adding the complement of the content of the source register ($R_iS$) to the content of the destination register ($R_iD$) together with the carry (C) input as described above. If a carry occurs out of the sign-bit position (0) of the adder the carry (C) is set to one, otherwise the carry (C) is set to zero. If carries out of the sign-bit position (0) and the high order numeric bit position (1) disagree, an overflow occurs and the V bit is set to one. Otherwise the V bit is set to zero. Overflow is accompanied by a sign change.

Operation arithmetic skip If (mnemonic ASIF)

The signed content of the source register ($R_iS$) is subtracted algebraically in two's complement arithmetic from the signed content of the destination register ($R_iD$). The contents of ($R_iS$), ($R_iD$), (C) and (V) remain unchanged. The skip is under control of the M field which is interpreted differently for "Skip If" types only.

$\overline{M}$
0 Arithmetic Skip if content $R_iS = R_iD$ (Equal)
1 Arithmetic Skip if content $R_iS >= R_iD$ (Greater)
2 Arithmetic Skip if content $R_iS <= R_iD$ (Less)

$M$
3 Arithmetic Skip if content $R_iS /= R_iD$ (Not Equal)
4 Arithmetic Skip if content $R_iS <= R_iD$ (Less than or Equal)
5 Arithmetic Skip if content $R_iS >= R_iD$ (Greater than or Equal)

Comment:
   3 is the negative of 0
   4 is the negative of 1
   5 is the negative of 2

Operation logical skip If (mnemonic LSIF)

The unsigned content of the source register ($R_iS$) is subtracted algebraically in two's complement arithmetic from the unsigned content of the destination register ($R_iD$). The contents of ($R_iS$), ($R_iD$), (C), and (V) remain unchanged. The skip is under control of the M field which is interpreted differently for the "Skip If" types only.

$\overline{M}$
0 Logical Skip if contents $R_iS = R_iD$ (Equal)
1 Logical Skip if content $R_iS > R_iD$ (Greater)
2 Logical Skip if content $R_iS < R_iD$ (Less)

$M$
3 Logical Skip if content $R_iS /= R_iD$ (Not Equal)
4 Logical Skip if content $R_iS <= R_iD$ (Less than or Equal)
5 Logical Skip if content $R_iS >= R_iD$ (Greater than or (Equal)

Comment:
   3 is the negative of 0
   4 is the negative of 1
   5 is the negative of 2

Operation AND (mnemonic AND)

The content of the destination register ($R_iD$) is replaced with the logical product (AND) of the bits of the specified destination register ($R_iD$) and the specified source register ($R_iS$). The contents of the carry and overflow remain unchanged. Operands are treated as unstructured logical quantities, and the connective "AND" is applied bit by bit. The bit position in the result is set to (1) if both of the corresponding bit positions contain a one; otherwise the result bit is set to zero.

Operation OR (mnemonic OR)

The content of the destination register ($R_iD$) is replaced with the logical sum (OR) of the bits of the specified destination register ($R_iD$) and the specified source register ($R_iS$). The contents of the carry and overflow remain unchanged. Operands are treated as unstructured quantities, and the connective inclusive "OR" is applied bit by bit. A bit position in the result is set to (1) if the corresponding bit position of either or of both operands contain a (1); otherwise, the result bit is set to zero.

Operation Exclusive OR (mnemonic XOR)

The content of the destination register ($R_iD$) is replaced with the modulo-two sum (Exclusive OR) of the bits of the specified destination register ($R_iD$) and specified source register ($R_iS$). The content of the carry and overflow remain unchanged. Operands are treated as unstructured logical quantities and the Exclusive OR is applied bit by bit. A bit position in the result is set to (1) if the corresponding bit positions in the two operands are unlike; otherwise, the result bit is set to zero.

Operation NOT (mnemonic NOT)

The content of the destination register ($R_iD$) is replaced with the logical complement (NOT) of the bits of the specified source register ($R_iS$). The contents of the carry and overflow remain unchanged. The operand is treated as an unstructured logical quantity, the connective (NOT) is applied bit by bit. The bit position in the result is set to (1) if the corresponding bit position of the source contains a (0); otherwise, the result bit is set to zero.

Operation increment register (mnemonic IR)

The value in the content of the source register ($R_iS$) is increased by one. The result replaces the content of the destination register ($R_iD$). If a carry occurs out of the sign-bit (0) of the adder the carry (C) is set to (1), otherwise, the carry (C) is set to (0). If carries out of the sign-bit position (0) and the high order numeric bit position (1) disagree, an overflow occurs and the V bit is set to one, otherwise the V bit is set to zero. Overflow is accompanied by a sign change.

Operation decrement register (mnemonic DR)

The two's complement value of the content of the source register ($R_iS$) is reduced by one. The result replaces the content of the destination register ($R_iD$). If a carry occurs out of the sign-bit position (0) of the adder, the carry (C) register is set to (1), otherwise, the carry (C) is set to (0). If carries out of the sign-bit position (0) and the high order numeric bit position (1) disagree, an overflow occurs and the V bit is set to one, otherwise the V bit is set to zero. Overflow is accompanied by a sign change.

Operation shift right arithmetic (mnemonic SRA)

The content of the specified register ($R_i$) is shifted right by an amount specified by the number field (N). The value of the sign, bit position (0), remains unchanged and also is propagated to the right; bit (0)→bit (1), bit (1)→bit (2), etc. The value of the low order position 15 is shifted into the carry (C), while bits shifted out of the carry (C), are lost.

Operation shift right logical (mnemonic SRL)

The content of the specified register ($R_i$) is shifted right by an amount specified by the number field (N). Zeros are introduced to the high order position [bit (0)] of the register and are propagated to the right; zero→bit (0), bit (0)→bit (1), bit (1)→bit (2), etc. The value of the low order position 15 is shifted into the carry (C), while bits shifted out of the carry (C) are lost.

Operation shift right with carry (mnemonic SRC)

The content of the specified register ($R_i$) is shifted right by an amount specified by the number field (N). The initial value of the carry ($C_I$) is introduced to the high order position (0) of the shifter and is propagated to the right; $C_I$→bit (0), bit (0)→bit (1), bit→(1) bit (2), etc. The value of the low order position 15 is shifted into the final value of the carry ($C_F$) while bits shifted out of the carry (C), other than the initial value ($C_I$), are lost. In the case of shifts of magnitude greater than one, subsequent shifts beyond the first shift introduce zeros to bit (0).

Operation shift left (mnemonic SL)

The content of the specified register ($R_i$) is shifted left by an amount given by number field (N). Zeros are introduced into the low order position 15 of the shifter and are propagated to the left; zero→bit (15), bit (15)→bit (14), bit (14)→bit (13), etc. The value of the high order position (0) is shifted into the carry (C), while bits shifted out of the carry (C) are lost. If any bits are shifted out of bit (1) which are not equal to bit (0) the overflow (V) is set to one, otherwise the overflow is set to zero.

Operation shift left with carry (mnemonic SLC)

The content of the specified register ($R_i$) is shifted left by an amount given by number field (N). The initial value of the carry ($C_I$) is introduced to the lower order position 15 of the shifter and is propagated to the left; $C_I$→bit (15), bit (15)→bit (14) bit (14)→bit (13), etc. The value of the high order position (0) is shifted into the final value into the carry ($C_F$) while bits shifted out of the carry (C), other than the initial value ($C_I$) are lost. If any bits are shifted out of bit (1) which are not equal to bit (0) the overflow (V) is set to one, otherwise the overflow is set to zero. In the case of shifts of magnitude greater than one, subsequent shifts beyond the first shift introduces zeros to bit (0).

Operation rotate right (mnemonic RR)

The content of the specified register ($R_i$) is rotated right by an amount given by the number field (N). Bits shifted out of the low order poistion 15 are introduced to the high order position (0) of the shifter and are propagated to the right. Bit (15)→bit (0), bit (0)→bit (1), bit (1)→bit (2), etc. At the same time bits shifted out of the low order position 15 are also shifted into the carry (C) while bits shifted out of the carry (C) are lost.

STATUS INSTRUCTIONS

Figure 28:
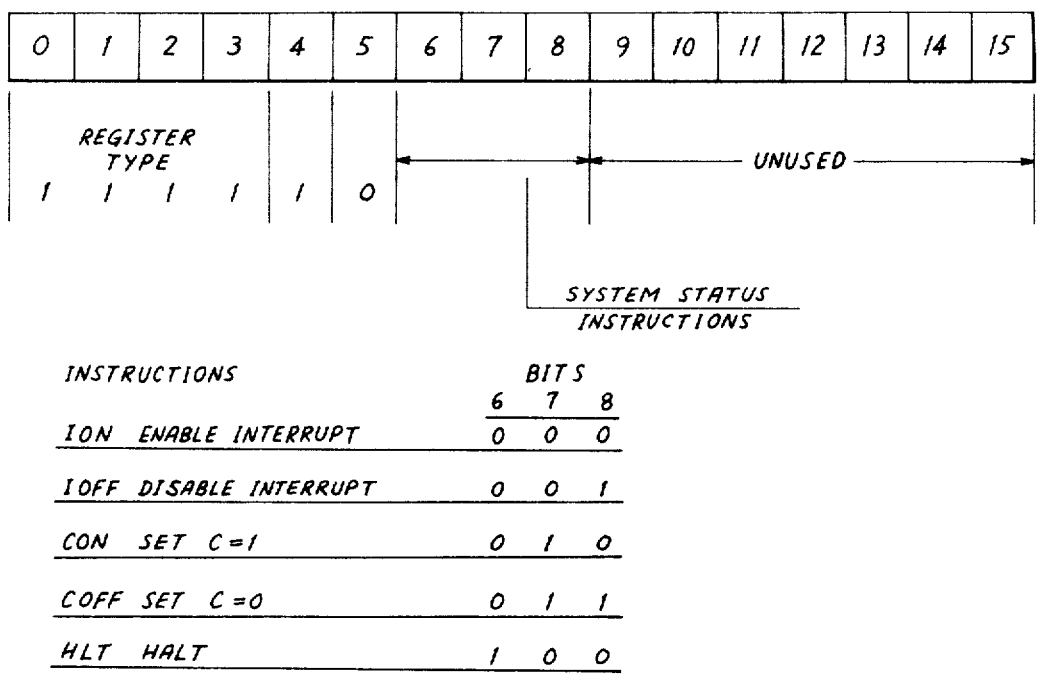
FIG. 28 is the format for system status operations of the computer-processor of FIG. 7.

The format for system status operations is shown in FIG. 28 together with the operation list.

These operations are used to set the value of the C bit, to enable or disable the interrupt system or to Halt the Processor.

Operation Interrupt Status ON (mnemonic ION)

This command turns "ON" the Interrupt Status and permits the Processor to respond to an external interrupt request. Testing an interrupt condition following the Interrupt Status on instruction is suppressed even if the Interrupt Status enabled; therefore, an interrupt will never follow directly after an Interrupt Status On Instruction, but will follow after completion of the instruction following the Ion unless it too is a Jump, Jump to Subroutine or Interrupt Status On instruction.

Operation Interrupt Status OFF (disable) (mnemonic IOFF)

The instruction turns the Interrupt Status "OFF" and disables the interrupt mechanism thus preventing the interruption of the Processor program by external requests.

Operation C ON (mnemonic CON)

The carry register C is set equal to one. The V & R registers remain unchanged.

Operation C OFF (mnemonic COFF)

The carry register C is set equal to zero. The V & R registers remain unchanged.

Operation HALT (mnemonic HLT)

This instruction, upon completion, causes the Processor to enter HALT STATUS. The Processor is stopped at a point between instructions. Neither the addressable registers nor memory will be changed. The Processor may be restarted at the next sequential instruction by depression of the "GO" button on the optional Service Panel. Also, the Processor may be restarted by depression of the "INITIALIZE" button on the Processor Control Panel. Finally, the loading of a new program may be initiated from HALT status by turning the "Load Key Switch" on the Processor Control Panel. The HALT instruction is intended primarily for use as a diagnostic and service aid.

The Input-Output instruction format

Figure 29:
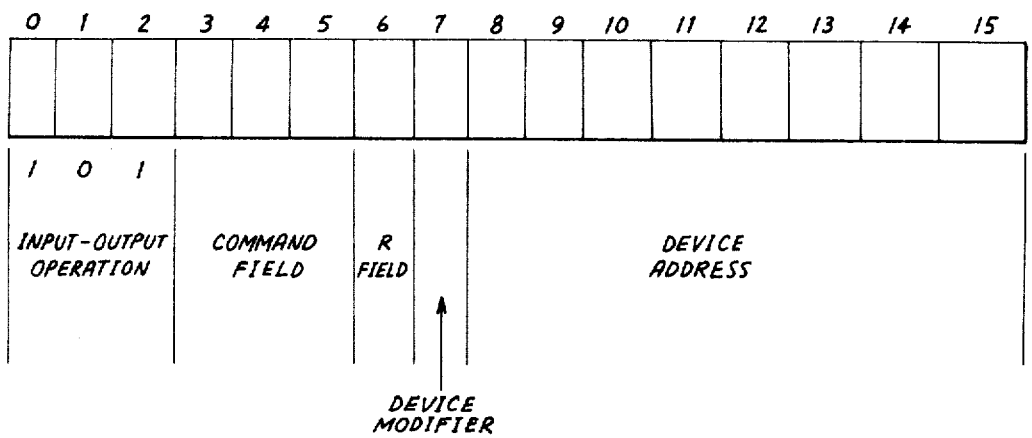
FIG. 29 illustrates the input/output instruction format of the computer-processor of FIG. 7.

The operation code field (bits 0–2), FIG. 29, specifies the I/O type instruction (101), the command field (bits 3–5) identifies the particular device related control commands, the R field (bit 6) specifies the particular R register that is either the source or desination of an I/O transfer, the D field (bit 7), the device modifier, permits the device address to be indexed and, finally the device address field resides in bits 8–15.

Input/Output command field

The general nature of the I/O Operation may be recognized from the comand field. Within certain limitations the interpretation of the command code is under the control of the device designer, and the conventions are shown in the table below:

I/O Command Field

| Bits | 3 | 4 | 5 | Command Type | Processor Strobe |
|---|---|---|---|---|---|
| | 0 | 0 | 0 | Test Flag | Strobe Skip Bus. |
| | 0 | 0 | 1 | Test Flag | Strobe Skip Bus. |
| | 0 | 1 | 0 | Read | Strobe Data Bus. |
| | 0 | 1 | 1 | Read | Strobe Data Bus. |
| | 1 | 0 | 0 | Unreserved | |
| | 1 | 0 | 1 | Unreserved | |
| | 1 | 1 | 0 | Unreserved | |
| | 1 | 1 | 1 | Unreserved | |

It will be noted that the reserved operations, the test flag type and the read type, are characterized by an associated strobe within the processor data flow. This strobe will cause the state of the skip bus to be sampled during the test flag types and the states of the I/O bus to be sampled during the Read types.

The high order bit of the I/O Command field (bit 3) indicates whether the processor is sending or receiving information. If bit 3=0, the data bus is in the receive condition; if bits 3=1, the data bus is in the transmit condition. The unreserved codes (those which have no strobe association) may be assigned to commands that write into a peripheral device buffer, clear or set a device flag and similar control functions.

It will be possible to combine, as well, the operation of a data transfer and flag control by appropriate use of the command field, the device address and the various synchronizing pulses to be described. In general then, the interpretation of the command field is highly dependent on device requirements and peripheral accessory design. Subsequent sections will describe examples of various peripheral device accessory design techniques.

The R field

The state of this field indicates whether an I/O data transfer will be in or out of Register 0 (R=0) or Register 1 (R=1). In the case of the input operation, the content of the specified register $R_0$ or $R_1$, is replaced by the 16 bit word on the Input-Output Data Bus. In the output operation case, the content of the specified register is placed on the data bus, to be sampled ultimately by the selected device. The content of the specified R register is left unchanged by an output type I/O instruction.

Device modifier

The D field, designated as the device modifier indicates whether the device address is to be indexed or not. If D=0 the device address is unaltered. If D=1, the content of Register three ($R_3$) bits (8–15) are added to the device address field of the instruction. The sum thus formed is an "effective device address," which is used to identify a particular device.

The device address field

The eight bit device address is capable of addressing uniquely up to 256 devices. Very often a device will be identified with a single device address and controlled via the command field. Alternatively, more complex systems may require multiple device addresses to accommodate the data transfer and control operations associated with the particular physical peripheral unit being serviced. For example, the data read from an instrument may originate at one "device" address and the control data to the instrument may be directed to another buffer by means of a different "device" address. In this case, only one physical peripheral device is involved, yet two "device" address are called out.

Device address modification under control of the D field will be useful when it is required to write I/O subroutines independent of unit number.

By means of the device modifier, a certain I/O subroutine, written for identical units, may be made independent of unit number, and thus one routine may service many units by simply setting $R_3$ to the appropriate unit address before entering the subroutine.

Programmed transfer timing

Figure 16:
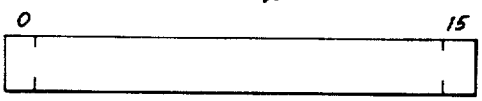
FIG. 16 is a representation of the logical word used by the computer-processor of FIG. 7.
Figure 30:
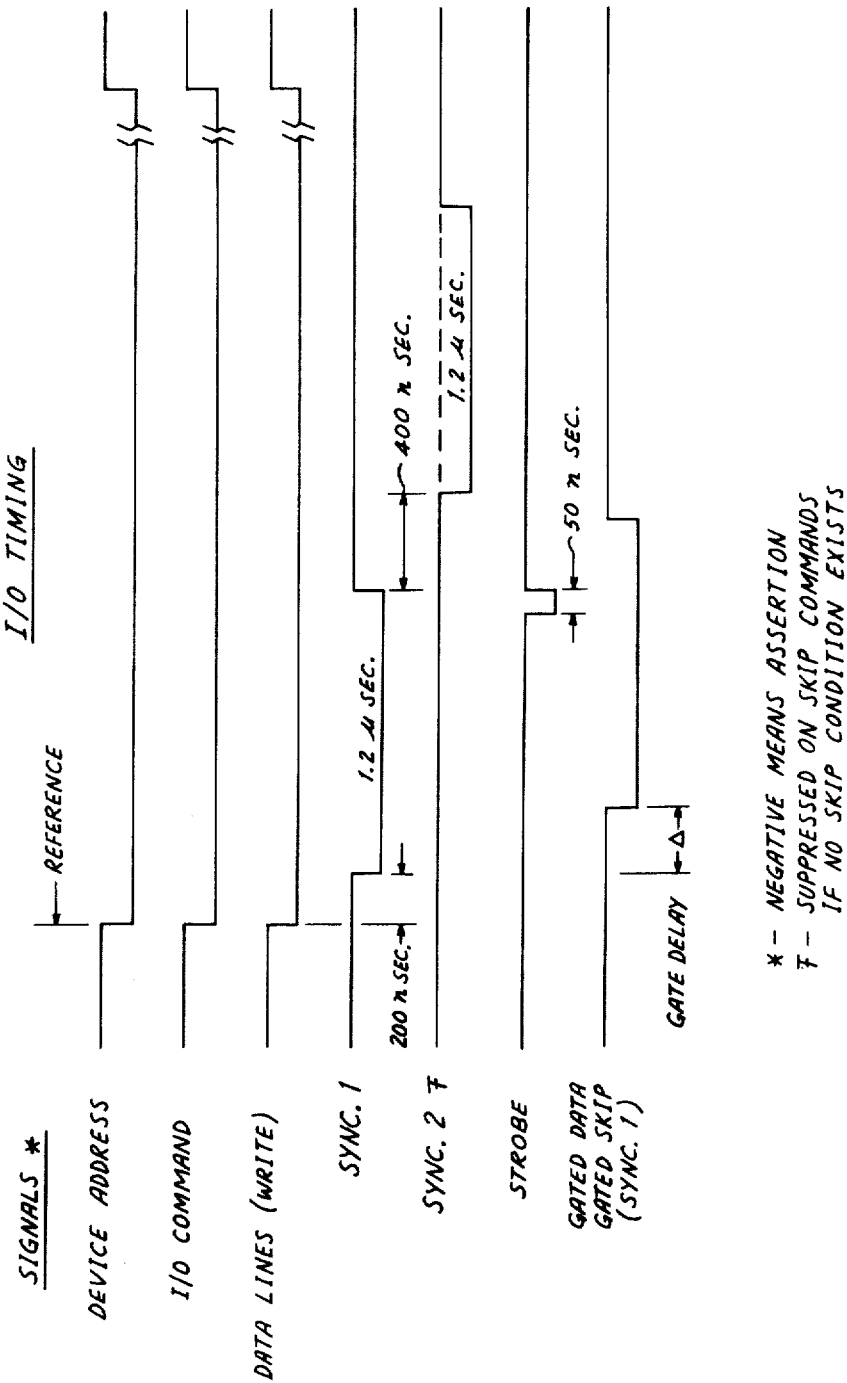
FIG. 30 is an input/output timing diagram of the computer-processor of FIG. 7.

The timing of the information flow between the processor and the peripheral device is shown in FIG. 30. Timing signals in FIG. 16 are referenced to a point at which the Device Address, I/O Command, and the Data Line become valid on the I/O bus control system. This point is preceded by the I/O instruction fetch, optional indexing and, in the case of the Write Command, transfer of either $R_0$ or $R_1$ to the M register and thence to the I/O lines. A timing pulse of duration 1.2 microseconds and commencing at 200 nanoseconds after the reference point is called "Sync 1" and sent to all devices. 400 nanoseconds after the end of "Sync 1" a second timing pulse, "Sync 2" of duration 1.2 microseconds is sent to all devices. These pulses are on individual wires and will occur only during an I/O type instruction. Because the Processor Read Strobe and the Processor Test Flag Strobe are associated with the timing of the "Sync 1" pulse, these type commands must be implemented in the peripheral device control such as to gate onto the input bus or the skip bus with a "Sync 1" timing pulse. Write Register or Clear Flag commands may be gated either with "Sync 1" or "Sync 2" time, at the preference of the device designer.

Usually Write Register Commands will be performed on "Sync 1," and Clear Flags done on "Sync 2." Due to transmission delay, input data will arrive at the data bus terminals of the processor delayed from the time of origin depending upon the distance of the devices from the processor and, more importantly, the propagation delay within the hardware of the peripheral interface logic itself. The timing given above is tentative and depends upon the processor speed and a variety of circuit considerations. The 50 nanosecond strobe pulse within the processor occurs at the end of Sync 1 and therefore allows as much latitude as possible in synchronization.

Program interrupt

The program interrupt facility is essential to the efficient interaction between the processor program and the various peripheral devices connected on line. The various flag status registers in the peripheral devices are connected ungated to the common "interrupt" bus, through open collector drivers in the "Wired OR" configuration. By this means, whenever one or more of the device flags is turned on by some (generally asynchronous) device dependent occurrance, the interrupt condition on the bus is a logic one (0 volt). If the interrupt status is enabled, the interrupt condition will be acknowledged between processor instructions; otherwise, the interrupt condition will be ignored. A program interrupt causes the interrupt status within the processor to be disabled and an automatic jump to subroutine in location 0. The content of the program counter is stored in location 0 and the interrupt recovery program commencing in location 1 must identify the device flag which caused the interrupt, remove that interrupt condition, re-enable the interrupt status and return to the main line program.

Input/Output Skip

The Input/Output Skip system is used for testing the status of flags within the peripheral devices. The flag is interrogated by gating its value onto a common "Wired OR" bus. This function is initiated in the device at the receipt of one of the device addressable flag test instructions. If, upon interrogation the skip bus is sensed by the processor to be a logical one (0 volt) the value of the Program Counter will be incremented by one and the next sequential instruction will be skipped; otherwise, the next sequential instruction will be executed. The skip condition is gated onto the skip bus by Sync 1 in order to be testable by the skip strobe. If the skip condition does not exist upon test, the transmission of the Sync 2 pulse from the processor is suppressed. Thus a test and reset type command may be given, the reset being accomplished with Sync 2, without fear of concurrently setting and resetting the condition to be tested. By this means each of the various interrupt producing Device Status Flags may be tested individually and the program redirected on the basis of its state.

The programmed transfer peripheral— general properties

The I/O bussing system used demands certain interfacing circuits with each peripheral unit which are described below:

(1) Device selection.—Each peripheral unit will be identified with one or more device addresses, the decoding of which is accomplished by circuits within the peripheral unit.

(2) I/O command decode.—Gates are required to decode the various command states necessary to control the peripheral unit.

(3) Synchronizing pulses.—The two timing pulses, Sync 1 and 2, are necessary to synchronize the peripheral unit with the processor. Generally, Sync 1 is used for Read, Flag test or Write while Sync 2 is used for Flag clearing, although other arrangements are possible.

(4) Flags.—Every device will contain at least one flag status register, which is indicative of device condition. Generally the state of these flags is determined by the action of the peripheral unit; for example, if a flag is "on" data is "Ready."

(5) Input output gating.—Gates are required in each device to transfer data to the data bus from the read registers within the device; or to transfer data from the data bus to the write registers. These gates will be selected under control of appropriate I/O commands and device addresses, and gated with the proper synchronizing pulse to occur when needed.

Device selection and command decode

Figure 31:
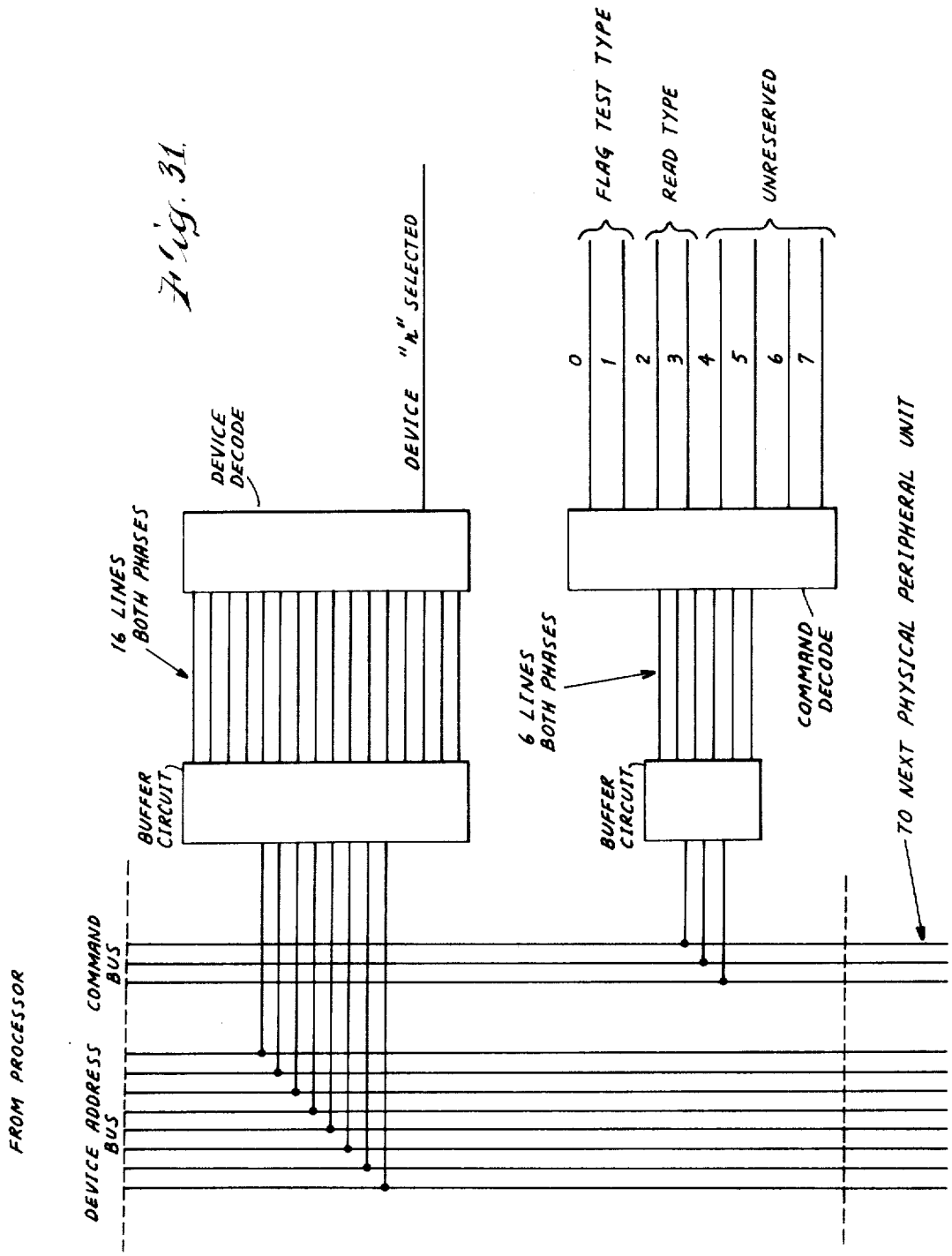
FIG. 31 is a schematic representation of the device selector and command decoder of the computer-processor of FIG. 7.

A schematic representation of the device selector and command decorder is shown in FIG. 31. Each device selector is assigned a particular code. The output of the device select circuit will be asserted only when the device address bus code matches the assigned select code of the peripheral unit. Good practice would require that one physical unit put just one circuit load on the I/O bus lines; thus the buffering circuits between the device selector and the device address bus, which also provide as output both phases of the input lines.

Similarly, the command decode circuits will be connected to the command section of the I/O bus through comparable buffering circuits. The output of the command decode unit may take on any one of eight states. Recall that two of the states are reserved for flag test operations, two for read type operations and the remainder are unreserved.

Synchronizing pulses and flags

Figure 32:
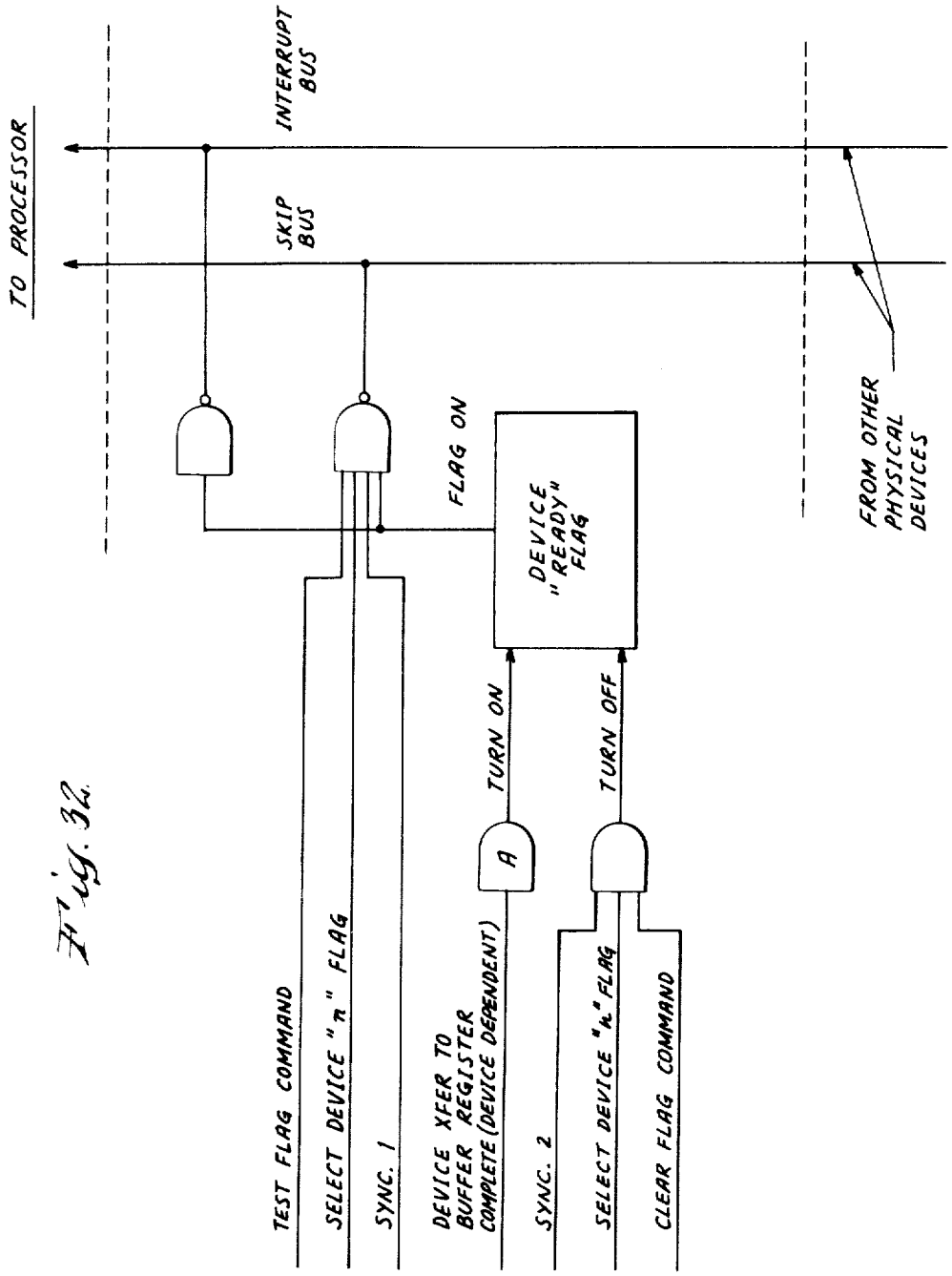
FIG. 32 is a schematic logic block diagram showing the proper use of synchronizing pulses relative to test flag and clear flag operations of the computer-processor of FIG. 7.

FIG. 32 shows the proper use of synchronizing pulses relative to Test Flag and Clear Flag operations. Note that flag is selected by the device select line, the combination of the clear command (one of the unreserved commands) and Sync 2 is used to reset the flag while the flag is interrogated with the combination of a test command, Sync 1 and the appropriate device select.

Arithmetic data flow

The design of the arithmetic data flow is shown in FIG. 33. The data flow consists of the addressable registers, which include the four 16-bit accumulators (the R registers), the carry register (C register), the overflow register (V register), and the Program Counter (P Counter). In addition, three 16-bit registers are required for communication to the core storage and the peripheral I/O devices. They are: the storage address register (A register), the storage data register (M register), and the operation code register (O register). The arithmetic, logic and shift processes are accomplished in a 4-bit adder-logic unit which is connected between the M register and the R registers. Interconnection between major segments of the processor data flow is accomplished by data busses. Some busses, those associated with the adder-logic system, are four bits wide; others, those associated with the M register, the other parallel registers and the I/O, are 16 bits wide.

The serial portion of the data flow.—The four R registers, the adder-logic unit and the M register constitute the serial data flow. Instructions which require the use of the adder-logic unit are processed four bits at a time. Four consecutive bits of a sixteen bit word are herein referred to as a byte. Data is processed in the serial portion of the data flow then, a byte at a time. Suppose, for example, we wish to add the content of $R_0$ (register zero) to $R_1$ (register one) and replace the content of $R_0$ with the sum. The sequence would go like this:

(1) $\qquad$ Move $R_1^{0-15} \rightarrow M^{0-15}$ (2) $\qquad$ Add $M^{0-15} + R_0^{0-15} \rightarrow R_0^{0-15}$ that is, move the content of $R_1$ into M, all 16-bits. (The subscript indicates the R register designated, the superscript the bits involved.) Then add $M + R_0$, all 16-bits, and put the result into $R_0$. Because of the serial nature of the data flow, this must be done from four bits (one byte) at a time, as follows:

(1)

(a) $\qquad$ Move $R_1^{12-15} \rightarrow M^{12-15}$ (b) $\qquad$ Move $R_1^{8-11} \rightarrow M^{8-11}$ (c) $\qquad$ Move $R_1^{4-7} \rightarrow M^{4-7}$ (d) $\qquad$ Move $R_1^{0-3} \rightarrow M^{0-3}$ (2)

(a) $\qquad$ Add $R_0^{12-15} + M^{12-15} \rightarrow R_0^{12-15}$ (b) $\qquad$ Add $R_0^{8-11} + M^{8-11} \rightarrow R_0^{8-11}$ (c) $\qquad$ Add $R_0^{4-7} + M^{4-7} \rightarrow R_0^{4-7}$ (d) $\qquad$ Add $R_0^{0-3} + M^{0-3} \rightarrow R_0^{0-3}$ Note that during the add cycle, the original content of $R_0$ is being used and replaced by the sum in one cycle. This is possible because of the "double rank" nature of the R & M registers. The operation proceeds from the low order (bits 12–15) to the high order end. Carries resulting from each byte addition are saved and introduced into the adder when the next higher order byte is being processed.

The adder-logic unit.—The P-E Processor adder-logic unit is designed to perform the following operations, byte serial:

(1) Move (simple transfer)
(2) Add
(3) 2's complement subtract
(4) The logic connectives: AND, OR, EXCLUSIVE OR, NOT
(5) The algebraic and logical compares.
(6) Right and left shift operations.

Because of the special nature of the adder-logic portion of the Processor, and because it represents the longest logic path length between clock pulses, special attention has been given its design to assure the proper balance of economy and propagation delay.

The parallel portion of the data flow.—The M register has both serial (byte) and parallel (16-bit) capability. The M register can send or receive data, byte serial, to or from the adder-logic unit. Moreover, data is entered into the M register and the A, O, and P registers, as well, via the D bus, 16-bit parallel. Data may be introduced onto the D bus from any one of the registers A, O, P or M, as well as from the I/O lines, the switch register lines, the storage data output lines or the data break address input lines.

Processor timing and instruction sequencing.—On the basis of the core storage specifications and on analysis of the adder-logic path worst-case delay, a logic period of 250 n sec. is projected. Each major computation cycle consists of 16 such periods. There are two basic cycle types in the P-E Processor design:

(1) The fetch cycle.
(2) The extended operation cycle.

The inter-register operations (those that operate with the contents of the R registers only) generally require the fetch-type cycle only. The storage reference instructions (those that operate with a storage reference operand and the R registers) require one fetch cycle and at least one extended operation cycle. Indirect storage references will require still another extended cycle. The total elapsed time for each of these cycle types is four μsec. (16×.250 μsec.=4 μsec.)

The flow chart shown in FIG. 34, which exemplifies the Processor sequence for an inter-register "add" operation, is indicative of the way in which an arithmetic instruction will be handled.

I/O data flow

Data and control pulses are transferred to and from peripheral devices by means of the input-output bus system. The specific voltage and impedance levels, which are compatible with integrated circuits, and cable and connector types, as well as system power sense and control, will be detailed in a subsequent report. The following is a breakdown of the bus-system subsections:

| Title | Number of wires | Description direction |
| --- | --- | --- |
| Device address bus | 8 | Device selection. Output only. |
| I/O data bus | 16 | Data input-output. Bidirectional. |
| I/O command | 3 | Operation to be performed by the device selected. Output only. |
| Synchronizing pulses | 2 | Carries Timing Information to devices. Output only. |
| Interrupt bus | 1 | An indication of device status which demands Processor attention. Input only. |
| Skip bus | 1 | An indication of device status which is sampled under control of one of the test flag commands. Input only. |
| Reset | 1 | A signal from the Processor causing peripheral device initialization on "power on". Output only. |

Multiple devices can be accommodated on the I/O bus system because of the fact that all subsections of the bus are connected in series with the various devices along the length of the bus system. In this manner, each of the devices is capable of sensing the state of each of the Processor output wires and may, on interrupt or under program control, affect the state of the Processor input wires. See FIG. 15.

The programmed transfer peripheral—general properties.—The I/O bussing system used demands certain interfacing circuits with each peripheral unit which are described below:

(1) Device selection.—Each peripheral unit will be identified with one or more device addresses, the decoding of which is accomplished by circuits within the peripheral unit.

(2) I/O command decode.—Gates are required to decode the various command states necessary to control the peripheral unit.

(3) Synchronizing pulses.—The two timing pulses, Sync 1 and Sync 2, are necessary to synchronize the peripheral unit with the Processor. Generally Sync 1 is used for Read, Flag test or Write, while Sync 2 is used for Flag clearing, although other arrangements are possible.

(4) Flags.—Every device will contain at least one flag status register, which is indicative of device condition. Generally the state of these flags is determined by the action of the peripheral unit; for example, if a flag is "on," data is "ready."

(5) Input/Output gating.—Gates are required in each device to transfer data to the data bus from the read registers within the device; or to transfer data from the data bus to the write registers. These gates will be selected under control of appropriate I/O commands and device addresses, and gated with the proper synchronizing pulse to occur when needed.

Storage

A major component of the Processor is its core storage system. The heart of this system is the core array in which data are stored and from which they are retrieved. The array consists of 65,536 doughnut-shaped ferrite cores, .020" or .030" in O.D., arranged in 4096 16-bit words. Each core is a tiny magnet which stores one bit of information; the direction of the magnetic field in the core can be changed electrically, but once set it retains its magnetism for an indefinite period of time unless it is modified electrically.

The core array in itself is incapable of performing any function except that of holding the data; it must be operated upon by active circuit elements that can cause it to accept and relinquish data according to a plan, that can synchronize all of the individual steps required, and that can perform all of the conversions necesary to enable communication between the M register of the Processor and the core array. This combination of care array and its associated electronic circuits constitutes the Storage System.

We can write a word of information in this storage system by applying 3 sets of signals to its terminals:

(1) Data signals representing the word to be stored.
(2) Address signals telling exactly where to store it.
(3) Command signals that cause the act of storage to occur.

To retrieve a stored word of information, only two sets of signals are required:

(1) Address signals telling where the word is stored.
(2) Command signals that cause the desired word to appear at the data output terminals.

The Core Storage System receives these signals from the registers of the Processor, and the electronic circuits convert them into the format and timing required by the core array.

In addition to the above supply voltages, the following unregulated voltages are required to power peripheral devices (e.g. 2G.C. & 2 TTY).

+60 v. at 100 ma.
+24 v. at 250 ma.
−24 v. at 1.5 A.

The power supplies and the control circuitry required to meet the above specifications are shown in block form in FIGS. 35 and 36.

+12 volt regulator.—Any change in the output voltage is sensed by the comparator and compared with a reference voltage as shown in FIG. 35. The difference is amplified by the current amplifier and fed to the emitter followers. The constant-current source maintains the current constant thereby causing a current variation in the emitter-follower base current. This produces the regulator action. The SCR shorts the regulator whenever +12 v. overvoltage shut-off or memory retention +12 v. shut-off occurs.

Current sensor circuitry senses the peak current through resistor $R_s$, inserted in series with the pass transistors, and operates a switch, through an OR gate, to turn off the regulator. The other input of the same OR gate is fed from +5 volt regulator through a delay. When the +5 volts appears, the OR gate is activated after a certain delay, and the switch opens, causing +12 volts to appear. A large capacitor at the output of the Bridge rectifier stores a sufficient amount of energy, so that, in case of power failure, the output voltage will be maintained at +12 v. until the Processor has permanently stored its data.

−12 volt regulator.—The −12 volt regulator is replica of the +12 volt regulator.

+5 volt regulator.—The design of the +12 volt regulator is repeated in the +5 v. supply, with some modifications, as shown in FIG. V-5B. The comparator is composed of two matched NPN transistors in the same can for temperature stability.

Over-voltage protection.—Over-voltage protection of the three supplies is accomplished by separately comparing +12 and +5 volts with a positive reference, and −12 volts with negative reference. The comparators continuously monitor these voltages, and if they exceed a predetermined value in their respective case, a signal is generated that shuts off the corresponding power supply.

Memory retention circuitry.—The memory retention circuitry incorporated within the power supply system (FIG. 36) is designed to prevent the loss of data stored in the memory, in the event of power failure. If the line voltage varies significantly below its nominal value (which is predetermined) this circuit will turn off the regulators in an orderly way and prevent the starting of any new cycles. This is done as follows:

The unregulated voltage +V is compared with the reference voltage, as in other cases, and a signal is generated when the +V equals the reference, thereby setting the flip-flop, F—F. This transition of the flip-flop sends the memory retention signal to the Processor, and also activates the unijunction timer to provide a delay for the Processor to shut down in an orderly manner. After this delay (about 1 msec.) a signal is generated to reset the flip-flop and shut off the +12 volt supplies. The same signal, after some additional delay, shuts off the +5 volt supply also.

The Teletype interface design

General description.—FIG. 37 is a block diagram of the Teletype accessory showing all the logic elements required for control of the ASR 33 Teletype. The Teletype and associated control circuits are handled in the same manner as any other I/O device, with connections to the Processor via various bus lines.

In the minimum analytical system, the circuitry required for control of the Teletype along with that for the instrument interface is mounted on one 12" x 15" printed circuit board, which is located within the Processor chassis. The logic consists almost exclusively of integrated circuits of the DTL (Diode-Transistor Logic) variety.

The Model 33 ASR (automatic send-receive) can be used to type in or read in, and print out or punch out perforated paper tape at a rate of 10 characters per second.

Signals transferred between the Teletype and the control logic is the standard, 11-unit, serial Teletype code in ASCII format. The 11-unit code is broken down into 1 start pulse, 8 data pulses and 2 stop pulses. These pulses consist of marks and spaces on the line from the Teletype to the control logic, and ones and zeros on the lines to the Processor.

The Teletype control is separated into two sections. The Reader/Keyboard and associated logic constitute the sending section, and the Printer/Punch and associated logic constitute the receiving section.

Operation of the sending section (Reader/Keyboard) is as follows: Each time a key is depressed or a character is read in the reader, a character is sent serially from the Teletype "send" terminals to the electronic control circuits. Spaces correspond to binary zeros, and marks correspond to binary ones. The character is accumulated in the 8-bit read register shown in FIG. 37 and when the register is full the read flag is set. Unless using the interrupt, the program will check the flag and, if a one, issue the read instruction to clear the flag and transfer the contents of the read register to the accumulator in the Processor. The read flag being a one can also cause a program interrupt if the interrupt status is enabled. If the data is coming from the tape reader, the read instruction will also step the reader to its next character and the same procedure will occur.

Operation of the receiving section (Printer/Punch) is as follows: On command from the Processor, a character is sent in parallel from the Processor accumulator to the Teletype write register. The character is then serialized out to the Printer/Punch by the control logic in the proper Teletype format. When the character has been written/ punched, the write flag is set to a one, indicating that the write register is ready to accept another character from the Processor. The program interrogates the write flag via the skip bus, and, if a one, clears the flag and issues a write instruction to transfer a new character from the accumulator to the write register and initiates another write cycle. The write flap, being a one, can also cause a program interrupt if the interrupt status is enabled.

The gas chromatography interface design

The gas chromatography data acquisition system consists of a printed circuit board for the gas chromatography Interface-Teletype logic contained with the Processor cabinet and an enclosure containing an amplifier and voltage-to-frequence converter. The regulating section of the power supply is also included in the amplifier/converter enclosure; the filtered DC is supplied from the Processor. A block diagram of the system is shown in FIG. 38.

The design has been simplified by providing room in the Processor enclosure for the Interface-Teletype PC board and by using the Processor power supply for all power. To minimize noise pickup and to provide convenient access to the controls, the analog section (amplifier and V-F converter) are mounted close to the chromatograph. External cables carry supply and control voltages, and transmit the signal from the chromatograph to the Interface as digital pulses.

In order to keep the critical supply voltages of the amplifier and converter free of noise and transients, final regulation of the supply voltages is done in the amplifier/ converter package.

The Interface-Teletype board contains a 16-bit register to accumulate counts during each read period, an overflow bit to signal when the register is full, gates to isolate the register from the Processor and to permit transmission of register bits to the Processor. Control registers and device selectors decode Processor commands. A pulse generator with a rate of 10 pulses per second is included on the board also as a reference for recording retention time of peaks and to serve as a time base for count accumulation.

Provision has been made in the Processor for plugging in two Interface-Teletype boards and for sufficient power supply capacity to permit operation of two complete GC systems with one Processor. Some additional cost over a one chromatograph system is incurred because of the larger power supply and the wiring for the second set of terminals. The cost, however, is relatively small and the savings in providing a second system is substantial.

Each interface has two device selectors, which enable it to pick out the Processor command directed to that particular unit. All boards are exactly the same, but the commands will be decoded by connecting the command lines to a different combination of receptacle terminals on each board.

Standard Interface Converter design

The function of the Standard Interface Converter shown in FIG. 39 is to act as an intermediary between the Processor I/O bus system and an instrument operating with the Standard Interface. By using separate line drivers and line receivers in the converter, it is also possible to transmit data remotely at a greater distance from the Processor than by the I/O bus system.

Data transfer from the instrument to the processor.— The converter has two sections. One is concerned with interrupting the Processor and setting up the transfer of the input data from the instrument to the Processor. In this section "read input" gates are provided for transferring data from the instrument to the I/O data bus. A "read" flag is set by the instrument "ready" signal, which causes the processor to be interrupted. The Processor then clears the "read" flag and transfers the input data from the instrument to the I/O data bus under program control, and simultaneously sets the "interface accept" flip-flop, returning an "interface converter accept" signal to the instrument. The "interface accept"

flip-flop is reset by the disappearance of the instrument "ready" signal.

Data transfer from the processor to the instrument.—The second section of the converter is responsible for transfers from the Processor to an instrument. When the instrument is able to accept data, the instrument "accept" signal disappears, which causes the "write" flag to be set, thus interrupting the Processor. The Processor clears the "write" flag, and if it has data to send to the instrument, data is transferred from the Processor to the write register by another instruction. Simultaneously, the "ready" flag is set, which sends an "interface converter ready" signal to the instrument. The instrument can then accept the data, and the instrument "accept" signal is sent which resets the "ready" flag and the write register.

"On Line" indication.—Interface Converter "On Line" indication is done by setting an "on line" flag by an I/O command. This operates a relay which causes a contact closure to give the "on line" indication in the standard form.

Specific description of the analog interface

The analog interface for each chromatograph is shown in block form in FIG. 40.

This unit consists of an operational amplifier with feed-back elements switched by means of field effect transistors to provide gain ranges of ×1, ×8, and ×64. Specifications are:

(1) Gain accuracy (a) Difference between output on the ×8 range and 8 times the output on the ×1 range for a zero to 10/8 volt input: ±2.5 mv. maximum with ambient temperatures between 25 and 45° C.

(b) Difference between output on the ×64 range and 8 times the output on the ×8 range for a zero to 10/64 volt input: ±2.5 mv. maximum with ambient temperatures between 25 and 45° C.

(2) Maximum range change time: 100 μsec. or less to settle to an error of 2.5 mv. at the output.

(3) Maximum Temperature Drift: ±10 μv./° C. referred to input on all three ranges.

(4) Maximum Noise: 1 μv./Hz. RMS above 1 Hz. 1/F noise with 3 db/octave slope below 1 Hz.

(5) Output range: −1 to +12 volts at 1 ma, min.

(6) Output impedance: 1 ohm max.

(7) Input impedance: $10^8$ ohms min.

(8) Input range: −1 to +12 volts (9) Range change signal: 2 bits, 0 to +3 volts

(10) Power supply: + 15 volts ±0.5 volt, −15 volts ±0.5 volt

The circuit is a simple modification of a standard Analog Devices (trademarks) Operational Amplifier.

The processor must be able to service at least six GC's and two teletypes simultaneously but, of course, at any given instant it is working with only one. To sort out and recognize the peripheral devices a "Device Address" is assigned to each device. The address is a coded set of eight bits and with this scheme, as many as 256 devices could theoretically be identified.

For six gas chromatographs the assigned code will be:

| Device | Signal | Control |
|---|---|---|
| GC #1 | 0000 0000 | 0000 0001 |
| GC #2 | 0000 0010 | 0000 0011 |
| GC #3 | 0000 0100 | 0000 0101 |
| GC #4 | 0000 0110 | 0000 0111 |
| GC #5 | 0000 1000 | 0000 1001 |
| GC #6 | 0000 1010 | 0000 1011 |

"Signal" and "Control" refers to the following I/O command table:

I/O COMMANDS

| Sync 1 | Sync 2 | Pnemonics |
|---|---|---|
| 000 | | |
| 001 | | |
| 010 | | |
| 011 | Read Digital Input | RDI |
| 100 | Write Digital Output | WRO |
| 101 | | |
| 110 | | |
| 111 | | |
| 000 | Test Flag | Clear Flag | SGFC |
| 001 | | | |
| 010 | Read Register | Clear Register | RCG |
| 011 | Read Register | | RG |
| 100 | | | |
| 101 | Test Pulse | | TPG |
| 110 | Set Gain | | WGGN |
| 111 | Set Mode | | GMD |

It will be noted that the least significant bit of the signal code is always zero and the control always one. The four most significant bits could have been hard wired because they are always zero with this code arrangement but it was decided to retain the flexibility of being able to change the code easily if required.

Referring to the System Block Diagram of FIG. 41 the Gas Chromatograph Data Handling System consists of at least one Analog Unit, one Processor and on Teletype, plus connecting cables. Two Gas Chromatographs can be serviced by each Digital board in the Processor.

All circuitry enclosed in the Analog Unit block of FIG. 41 is on an 11½ x 13" printed circuit board, which is mounted on standoffs in a steel case. Included in the steel case also are a cooling fan, a transformer for the power supply and a front panel with the command switches and status indicator lights. Connections between the Processor and Analog Unit are completed through a 13-twisted pair, shielded cable. Twenty-five foot lengths are standard, but lengths up to 500 feet can be used. In applications requiring more than 500 feet, an additional cable is required, permitting lengths up to 2000 feet. The Analog Unit has its own power cord which must be plugged into the same receptacle as the Gas Chromatograph in order to maintain the cases at the same potential. Analog signals are transmitted from the Gas Chromatograph to the Analog Unit by a shielded cable, 6 feet long.

It is believed that the interface of the Gas Chromatograph Data Handling System has several advantageous features.

In order to use the Processor efficiently, it must be possible for one Processor to service several Chromatographs which may be in different laboratories. To transmit the analog information from the gas chromatograph to the Processor over a long cable could increase the system noise appreciably because of the long cable itself and also because of the probable difference in case ground potential of the gas chromatograph and the Processor.

The System reduces the transmission line problem almost entirely by converting the Chromatograph analog signal to a digital signal at a point close to the gas chromatograph and transmitting only the digital signal to the Processor. Because the latter is a series of pulses at logic voltage levels, it is relatively unaffected by noise introduced along the line. Transmission distances up to 2000 feet are feasible using relatively inexpensive cable.

The single-ended and differential input systems were described earlier but a discussion of the reasoning behind the design might answer some questions before they are asked. Naturally, it would be simpler to have only one input system which would take care of all outputs. This system would be a floating differential input with input impedance of one megohm minimum. To do this well would have required a three-amplifier system plus the SGA, which would have been expensive and probably increased noise and temperature problems.

Increasing the resistance of the input resistors to the differential amplifier would have helped also, but with even 50,000 ohm resistors, the noise was approximately 20 μv. p—p, referred to the input, compared with the 2 μv. in the present design. Temperature effects were much greater also. Reducing the input resistors to 10,000 ohms helped the situation but noise was still in the area of 5 μv. and the input impedance was still not high enough.

For these reasons, it was decided to provide input configurations to suit the application. For bridge outputs, such as some hot wire detectors, the floating differential input can be used. These outputs are relatively low impedance, therefore, the input impedance can be low also in order to keep noise and drift at a minimum. This floating configuration also permits reversing input leads if required to maintain positive output polarity.

Flame detector amplifier outputs are normally 200 to 3000 ohms impedance and are grounded; therefore, a high impedance, single-ended input has been provided also so that variations in output impedance can be neglected.

If filtering were incorporated into the preamplifier, the capacitance required would be high (20 mfd.) because of the low value feedback resistors. It would not be practical to obtain this size in the non-electrolytic type. Therefore, a filter has been inserted between the Preamp and SGA. Filtering cannot be incorporated in the SGA because of the fast settling time required during gain switching.

The Power Supply, amplifiers and V-F Converter could be assembled on conventional size P.C. boards, plugged into receptacles and then wired together. However, this design introduces additional contacts between the circuits plus the possibility for wiring errors. Another factor considered was the variation in harness layout which, in a critical circuit such as this, could cause problems because of interaction between leads.

To include the amplifiers and V-F on one board with the Power Supply on another would have been a logical arrangement also. However, because the Processor was using a P.C. board large enough to accommodate all three sections, it was decided to take advantage of this and eliminate all interconnections between the boards. The result is that the only connections to the board are from the transformer to the power supply, control lines to select amplifier gain, and the output of the V-F Converter.

The large board permitted the package to be made narrow and the same cross-section as the gas chromatograph. This design enabled bench area to be kept at a minimum and presented a pleasing appearance, compatible with the gas chromatograph.

In designing the preamplifier for various input connections, particular attention was paid to avoiding use of switches and their associated contacts for changing connections to the input of the preamplifier. Such switches handling low microvolt signals are typical producers of unwanted noise and stability in the incoming signal. Changing of input conditions on the interface is done simply by changing the position of a fanning strip attached to a terminal board within the interface enclosure.

Filtering is provided at the output of the preamplifier to insure that the interface limits the bandwidth of the signal to only that value needed for retaining the intelligence of the incoming signals. All unwanted high frequency noise should be eliminated or attenuated in this filter.

If the incoming signal is of low amplitude, it is desirable to increase the amplitude of the analog signal prior to digital conversion such that the maximum dynamic range of the digital converter may be used without regard for quantizing errors. Quantizing errors in this instance is the indeterminancy of one digit of information as it relates to the analog digital conversion. It is desirable then to increase the signal level such that the digitization is always occurring in a high enough level to insure adequate count rate.

The selectable gain amplifier can be controlled by the processor itself by accepting signals it will change the gain of the amplifier upon command of the software program. That is to say, the software program will measure the level of signal it receives and determine at which gain setting the selectable gain amplifier will be positioned for best signal-to-noise. The switching is done entirely automatically and no intervention on the part of the user is required. The software program takes into account the gain changes since it itself is aware of the current amplification range.

VOLTAGE-TO-FREQUENCY CONVERTER

Once the analog signal has been amplified to its desired range, the signal is fed to a voltage-to-frequency converter. This converter has an input specification of 0 to 10 volts with an output specification of 0 to 1 mHz.–or $10^6$ pulses per second. The ability of the voltage-to-frequency converter to reproduce in digital form the incoming analog signal is an important step in the transfer process. Deterioration of the signal at this point must definitely be avoided particularly in regard to linearity of the conversion device. This point will be discussed further later in the paper.

Voltage-to-frequency conversion is necessary in the interface system because of the desirability to transfer meaningful information over long distances without the requirement of special signal cabling in grounding. The transfer of digital information rather than analog voltages insures negligible change in signal characteristic, regardless of external noise sources.

Input voltage is converted into pulses by means of a combination of circuits which provides stable, linear operation over a 10 volt input range with a conversion rate of 100,000 pulses per second per volt. 10 volts produces 1,000,000 counts per second and 10 microvolt produces 1 count per second. With ×64 gain, however, at low signal levels, 1 microvolt would produce 6.4 counts per second.

It was mentioned earlier that one of the advantages of this system is that it transmits faithfully to the Processor the true equivalent of the signal from the chromatograph. This is accomplished by feeding the pulses from the converter to a circuit which produces a set of complementary pulses with sufficient power so that even a long transmission line will not load it down enough to cause error. Each set of pulses is connnected to one wire of a 2-wire shielded transmission line. At the receiving end the pulses are fed to a differential amplifier so that common mode noise induced in the cable by external sources is ignored and only the information between the wires is accepted.

At the processor end of the transmission of analytical segments, a receiving device accepts the incoming digital signals from the V-F converter and stores the signals in an accumulator. The accumulator is in the form of the register that can be sampled by the processor at the prescribed sampling rate. At described intervals the register registers content for digital value is imposed upon the processor's databus and read into its core memory. The advantages of the accumulation process of the digital interface register is that of an integrating effect on the incoming digital signals rather than simply convert analog to digital signals and store their instantaneous value in memory. The counting register accumulates signals between sampling intervals. In this way, no information is lost and no quantizing errors are introduced into the system. In addition to performing the integrating function, the digital interface is capable of transmitting processor control functions in indicators back to the interface for elimination on the interface front panel. Similarly, information from contact closures at the interface front panel are also sensed on the digital interface, this information being transmitted to the processor's memory via the databus.

The analysis system of the invention converts the raw data produced by a chromatograph into results which include all the analytical data and all of the reports that it is possible for a person to produce from a chromatogram. It is a flexible, expandable system, and therefore practical to use with only one chromatograph, although it is capable of expanding to work with eight chromatographs.

The three unit system (FIG. 1) uses a simple interface unit mounted on the chromatograph, a data-processor-computer unit containing the analytical intelligence and a teletype unit for communication and data reporting. Initiating controls are contained in the interface, which also delivers an already digitalized chromatogram signal to the processor. This is an important function; it not only overcomes problems of signal transmission but also eliminates the need for an electronic digital integrator. Not using a conventional integrator means that the retention time and peak area can be leisurely determined by computation after the peak has fully emerged, rather than "on the fly" as in the case of a digital integrator. The Processor receives its simple instructions from the teletype and communicates back its results.

The heart of the system is the Processor. This unit truly performs as an "intelligent" black box to interpret the chromatogram and to assist in the work of calibration, analysis and other needed calculation. This is done by locking in a software package that has been prepared to incorporate the maximum of programming power into the smallest possible computer core. Its unique program allows an analyst complete analytical flexibility in developing his method without the need for programming ability. The pre-packaged program provides all the functional characteristics of peak detection, baseline correction, calibration, normalization, internal standard calculations, measurement of relative retention times, signal smoothing and automatic determination and adjustment of all these parameters. The analyst, through very simple conversational instructions, can completely control the program. Essentially, the intelligence required to interpret the chromatogram and produce analytic results, either in the presence or absence of instructions, resides in the Processor and its program. This factor and the existence of an interface requiring no preliminary modification to a chromatograph mean that a technician can begin using the system the day it is installed and obtain results comparable to those of very large computer systems.

Since the concept embodied in the Processor is so basic to this approach, it will be worthwhile to examine its functions in more detail. The basic design (FIG. 3) has slots to accept up to three memory units and five input/output cards. Each memory unit is 4,096 words, the basic system needing only one unit for the pre-packaged program and space for data from two gas chromatograph instruments. This small amount of memory is sufficient for the system because of the compact "state driven" program and the use of paper tape to store the analytical procedure developed. An anlyst performs a calibration much as he would in normal practice, except that he gives the Processor the few items of calibration information it requires while it analyzes the standard sample. The calculations necessary to set up an analytical method are then automatically performed. These calculations include computation of relative retention times and detector response factors. While this information is being typed out, a paper tape is punched to serve as a method stored device; then any further analyses of this type can be run automatically by reading in the tape prior to analysis. Alternatively, one can just plug in another memory unit and use it as a storage device in place of the paper tape.

Figures 4, 5:
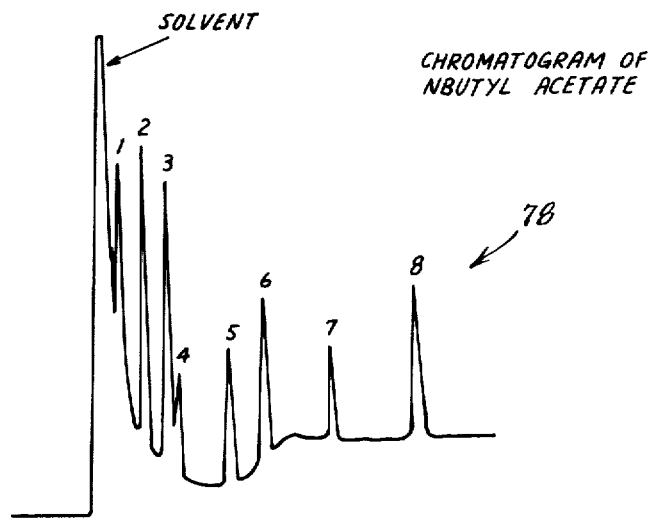
FIG. 4 is a chromatogram of N butyl acetate.
FIG. 5 is an analysis report produced by the system of FIG. 1 from the chromatogram of FIG. 4.

It is amazingly simple to run an unknown mixture. Using the method stored in memory (instead of paper tape) a 1 is typed to tell the computer to look at chromatograph 1 for its data. A typed 9 then tells the computer to use that established method. The sample is injected and the interface INJECT button pushed; a typed-out analysis, preceded by a list of the parameters used, will then be produced with no further human intervention (FIG. 5).

The computerized data processor has a great deal of intelligence built in which enables it to set the analytical parameters automatically. When the start button on the interface is pushed, a short period is initiated during which the computer, knowing no sample is present, regards the detector output as all random noise and sets a threshold below which it will not recognize a peak. The program contains DEFAULT provisions. Should information not be supplied during a method development or analysis run, default values will automatically be applied. In addition, the electrical power is continuously being monitored and if it fails, the computer uses a program to place everything back into memory where it stays until power is restored.

The most striking characteristic of this system is the absence of adjustment knobs and the absence of any need by an operator to further program the computer. The only visible controls are push-buttons and a key on the Processor; this key must be used in entering a pre-packaged program into the computer. The push-buttons on the interface have dual purposes. The START button lights when pushed, then reads READY when it is time to inject a sample.

This development embodies the best features and capabilities of all the present day systems, from those based on large computers to the simple hand-operated electronic digital integrators. It has done so with successful elimination of the inadequacies and problems of those systems, the result being a very simple operated, analytically powerful, flexible instrument. As such, it can provide a welcome tool for lightening the analytical load of the many laboratories using gas chromatographs.

The Gas Chromatography Data System of this invention is the first to be specified, designed, and built for the specific task of performing the analyses required by the gas chromatographer, and performing them, moreover, in the same manner and with the same techniques that he traditionally employs—with the exception that the system automatically performs all calibration, data reduction and interpretation. In this, it differs radically from systems which involve merely the adaptation of existing computers and peripheral equipment to the job of gas chromatography data reduction. The Gas Chromatography Data System provides full computer system capability for even a single gas chromatograph at an attractive price.

The Gas Chromatography Data System provides analytically meaningful results—component identification and component concentration—in the form of a finished report (FIG. 5). The system will calculate concentration in any units selected by the analyst. In calculating composition, the system will measure, and thereafter employ, relative times for a peak identification, using either preselected or calculated response factors to the identified peaks; in the expanded system, it wil give chemical names to the identified peaks. It will calculate, from a standard sample, the detector response factors to change area percent to concentration.

The Data System comprises three elements: A Gas Chromatograph Interface which can be easily installed on any gas chromatograph, a Processor which receives digital information from as many as eight chromatographs, applies the appropriate analytical method and performs the necessary computations, indicating via lights on each interface unit the status of the analysis, and finally a Data Terminal which may be part of the processor console or external to it. The analyst uses this terminal to communicate with the processor, manually or via method tapes.

Mounted at each gas chromatograph is an Analog Interface (FIG. 2). This interface, which can be used with the various detectors and their associated electronics, performs several important functions. It conditions the signal from the chromatograph by means of a preamplifier and a selectable gain amplifier whose gain is controlled by the software of the system. After conditioning, the signal is digitized by a voltage-to-frequency converter and transmitted from the gas chromatograph to the processor as a series of digital pulses, thus eliminating the problems of transmission of low level analog signals from the chromatograph to the computer via an analog multiplexer. This is one of several features which permit the system to be installed in a laboratory employing one or more gas chromatographs about as easily as a digital integrator. In particular, it obviates any need to install shielded conduits to house low level analog signal cables.

Several pushbuttons and lights on the interface permit the operator to communicate with the system and allows the system to inform the operator of the status of his analysis. For instance, it tells him when the system is ready for sample injection, when it is looking for baseline, and when a peak is emerging. Before injection of the sample, the system will examine the output of the gas chromatograph to determine the noise conditions so that the system may then adjust itself for maximum usuable sensitivity. It is interesting to note the absence of any external controls on the entire system other than the lights and switches on the interface(s).

The interface does not incorporate an integrator. This means that retention time and peak area can be computed in the processor after the peak has passed, rather than "on the fly," as in the case of a digital integrator.

The heart of the gas chromatography data system is the central processor, shown in FIG. 1. The front panel controls are limited to ON/OFF switches, a RUN button and a KEYLOADER for loading prepared programs via the tape reader on the teletype. The absence of front panel controls highlights the analyst's freedom from two tasks usually associated with computer systems—the need to make computer-type adjustments, and the more burdensome task of learning a computer language. Also absent from the system are the peripheral devices and equipment usually associated with a digital computer.

As mentioned earlier, the processor can accommodate as many as eight gas chromatographs. However, this capacity represents a modular expansion of the processor from its basic capacity of one gas chromatograph without making obsolete any of the previously purchased components.

The basic packaging concept is shown in FIG. 3. The central processor has slots to accept up to three memory units and five input/output cards. Each memory unit is 4,096 words (4K). The basic system in its minimum configuration operates with 4K of memory. To increase memory, additional 4K memory units may be added to a total of 12K of memory. The input/output (I/O) boards are instrument-related. One card handles either one or two gas chromatograph channels or one teletype. To expand the system, an additional Gas Chromatograph channel requires in hardware only the addition of an interface and an additional I/O card for each pair of gas chromatograph channels. To increase data capacity or analytical features, additional 4K memory units may be added. This expandability is available both at the factory level and in the field, that is, it can be installed on operating units.

Within the processor, all memory is core; no mass storage devices such as disc packs are used. A power failure will not put the system out of business. Electrical power is continuously monitored, and if there is a failure, the software program is safely returned to memory before all power disappears.

The third unit of hardware in the system is the Data Terminal, which provides processed data in the form of a finished analytical report. It also receives information from the operator, not in computer language, but in ordinary English, as to what the analytical method and specifically how to treat the data. The Data Terminal also incorporates a tape reader which can punch and read method tapes, thus retaining analytical methods for future use.

If used with an automatic sampler, the communication is between the system and the sampler rather than the operator, and the whole sequence or multiple analyses can proceed automatically.

Analytical programs are the operating programs that reside in the memory of the data system. All the software the analyst ever needs is contained here. The procedure on how to detect peaks, how to correct baseline, how to calculate relative retention times and concentrations are all pre-programmed for the user; and since this is in all aspects a real computer system, the basic Gas Chromatograph operations of peak detection and baseline correction are very sophisticated compared to such hard wired systems as digital integrators. Even more important, they can exploit the memory characteristic of a computer system to do a postmortem analysis of whether a peak really did exist before the decision is made to call it a peak. Also, true baselines are inserted in much the same manner that the analyst would do with the chromatogram sitting in front of him. Integrators or integrator based computer systems must make instantaneous decisions on peak detection and baseline correction because the decision is made within the integrator, not within the computer.

Two complete programs are disclosed. One uses the memory of the computer system to store the analytical method; the other uses punched paper tape for storage of the analytical method. The latter program requires less memory capacity. Two chromatographs can easily be handled by a basic 4K memory with this program.

The analytical method is the set of instructions that the gas chromatographer gives to the system to tailor it for the particular analysis he has at hand. The method consists of telling the system what should be the length of the run, the concentration of the internal standard if one is used, and what names to apply to the identified peaks as well as the response factors that should be individually applied to correct area percent into concentration. The system actually assists the user in determining the calibration required, and it does this employing the same techniques that the user would normally use in his everyday operations. For instance, if a standard sample is prepared with known concentrations, the system will, in its calibration mode, calculate all the relative retention times and response factors for the user. In fact, on expanded systems, it will use average values calculated from a series of calibration runs. The preparation of the analytical method is the same as good analytical procedure dictates in any case, and the system does the work for the user. Calibration factors then become easy to obtain and use, a factor which can be of significant help in improving the quality of the analysis.

Advanced design has gone into the software preparation and the knowledge of the gas chromatography analytical requirement is incorporated into the software to handle real gas chromatography analysis. An example of this is that, in imitation of the gas chromatographer who intuitively selects a point on the chromatogram as a baseline because he knows this is where it should be, this data system can also be instructed by the user to force a baseline to handle special cases of unresolved peaks or baseline shift that can occur in everyday gas chromatography.

To use the Gas Chromatographic Data System, the analyst prepares his analytical method in the usual way. The gas chromatograph parameters he selects are those he would normally select if no data system was being employed.

For routine analysis where the analytical method has been prepared and stored either in core or on paper tape, the operational procedure consists simply of informing the system that an analysis is to take place and identifying which gas chromatographic channel is being used. The system informs the operator when its completed its initialization period by lighting the indicating lamp at the interface. The sample is now injected and the inject button depressed. The analytical run is now in progress and the system accumulates the raw data from the chromatograph reducing it in volume as the run progresses. When the run is finished, the computer will now request the analytical method that has been stored on the method tape or in the core and will convert the reduced raw data obtained following the instructions contained in the analytical method. The finished report is then presented at the data terminal. The report will appear in the format shown here with time, area, relative retention time, response factor, concentration, and peak names or peak numbers.

The analyst employs the computational ability of the system to prepare the analytical method. In the conventional manner, he will either prepare a standard sample with known concentrations or will prepare a sample with a known concentration of internal standard and inform the system that this is to be a calibration run. This is done by answering a series of questions asked by the system regarding the weight of the standard sample and the concentrations of the components contained therein, and the peaks to be identified. From this information, the computer will calculate relative retention times to be used for identification purposes and the response factors required to change area percent into concentration. Other information such as how long will the analytical run be, where the baseline should be forced if required, should peaks on the solvent tail be skimmed or not, all are answered in straight forward English. The system will do all calculations required for the calibration, even averaging up to three calibration runs on the expanded systems. This method will be punched on a paper tape in the basic system or entered into computer memory in the expanded system. In the case of non-routine applications where no method is to be prepared for storage, the analyst can communicate with the system to tailor the individual run by using the same simple procedure he would normally use to prepare the method. Once methods are prepared, however, no further work is required when samples of the same type are run for subsequent analysis.

When an automatic sampling system is employed, the Data System will signal the sampler to inject the sample and receive the signal from the sampler that the sample has been injected. The analytical method will automatically be called in from storage and the automatic sequence will proceed completely unattended.

The Gas Chromatography Data System of the invention anc end the perplexing question of whether or not the gas chromatographer should consider a computer system for his gas chromatography data handling particularly if his laboratory only has one or two gas chromatographs which would not justify the expenditure of large amounts of money for a large computer system. If 1-2 electronic integrators would be financially attractive, then the Gas Chromatography Data System can compete in cost while providing all of the advantages and none of the disadvantages of large time sharing or on-line computer systems. Operation of the entire system can begin the day it is delivered and this includes all of the training of the operator required for a successful operation.

It will thus be seen that the objects set forth above, among those made apparent from the preceding description, are efficiently attained and, since certain changes may be made in practicing the disclosed methods and in the apparatus and system set forth without departing from the scope of the invention, it is intended that all matter contained in the description or shown in the accompanying drawings shall be interpreted as illustrative and not in a limiting sense.

It is also to be understood that the following claims are intended to cover all of the generic and specific features of the invention which, as a matter of language, might be said to fall therebetween. Particularly, it is understood that in said claims, elements or steps recited in the singular are intended to include compatible combinations of equivalent elements or steps whenever the sense permits.

Having described the invention what is claimed as new and desired to secure by Letters Patent is:

1. An analytical instrument system comprising:
   a plurality of analytical instruments that produce analog output signals having voltage peaks that extend from a baseline;
   a plurality of voltage-to-frequency converters, each coupled to a corresponding analytical instrument, for converting the output signals of corresponding analytical instruments to pulses having pulse repetition rates corresponding to the amplitudes of respective analog output signals;
   dedicated digital circuits including a plurality of storage buffers;
   means for coupling said voltage-to-frequency converters to corresponding ones of said storage buffers;
   a data processor for processing data stored in said storage buffers; and
   means included in said data processor for sampling said storage buffers at intervals to generate a sequence of sample signals corresponding to the analog outputs of said analytical instruments.

2. The system defined in claim 1 wherein said analytical instruments are gas chromatographic instruments.

3. The system defined in claim 2 wherein said means for sampling said storage buffers occurs at a fast rate at the initialization of said analytical instruments and at successively slower rates as said analytical instruments are operated.

4. The system defined in claim 3, wherein said buffers comprise digital counters for counting said pulses to generate said sample signals.

5. The system defined in claim 1 wherein said data processor includes a program stored in memory for causing the analyzing of said sample signals and for deriving the time of occurrence of the peaks in said analog signal.

6. The system defined in claim 5 further including a plurality of selectable gain amplifiers coupled between said analytical instruments and corresponding voltage-to-frequency converters for altering the gain of said amplifiers depending upon the amplitudes of said analog signals.

References Cited

UNITED STATES PATENTS

| | | | |
|---|---|---|---|
| 3,488,480 | 1/1970 | Stacy | 235—151.35 |
| 3,368,205 | 2/1968 | Hunter et al. | 340—172.5 |
| 3,337,722 | 8/1967 | Siess et al. | 235—151.35 X |
| 3,562,501 | 2/1971 | Mears | 235—151.35 |
| 3,470,367 | 9/1969 | Frisby et al. | 235—151.35 X |
| 3,551,665 | 12/1970 | Powers et al. | 235—175 |
| 3,551,663 | 12/1970 | Herron et al. | 235—156 |
| 3,592,045 | 7/1971 | Weiss | 235—151.35 X |
| 3,601,607 | 8/1971 | Wasserburg | 235—151.35 X |

FELIX D. GRUBER, Primary Examiner

U.S. Cl. X.R.

73—23.1; 235—150.51; 340—172.5; 444—001